US012756812B2

(12) United States Patent
Baran et al.

(10) Patent No.: US 12,756,812 B2
(45) **Date of Patent: *Oct. 6, 2026**

(54) MULTI-VIEW DISPLAYS AND ASSOCIATED SYSTEMS AND METHODS

(71) Applicant: Fathom Optics Inc., Somerville, MA (US)

(72) Inventors: Thomas Anthony Baran, Somerville, MA (US); Matthew Waggener Hirsch, Watertown, MA (US); Daniel Leithinger, Somerville, MA (US)

(73) Assignee: Fathom Optics Inc., Somerville, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/816,973

(22) Filed: Aug. 27, 2024

(65) Prior Publication Data

US 2025/0106377 A1 Mar. 27, 2025

Related U.S. Application Data

(63) Continuation of application No. 18/132,615, filed on Apr. 10, 2023, now Pat. No. 12,101,456, which is a (Continued)

(51) Int. Cl.

| | |
|---|---|
| ***H04N 13/351*** | (2018.01) |
| ***B41M 3/00*** | (2006.01) |

(Continued)

(52) U.S. Cl.

CPC .......... *H04N 13/351* (2018.05); *B41M 3/008* (2013.01); *B41M 3/06* (2013.01); *H04N 13/122* (2018.05); *H04N 13/302* (2018.05); *B44F 7/00* (2013.01)

(58) Field of Classification Search

CPC .. H04N 13/351; H04N 13/122; H04N 13/302; B41M 3/008; B41M 3/06; B44F 7/00

See application file for complete search history.

(56) References Cited

U.S. PATENT DOCUMENTS

| | | | |
|---|---|---|---|
| 5,004,669 | A | 4/1991 | Yamada et al. |
| 5,051,327 | A | 9/1991 | Osawa et al. |

(Continued)

FOREIGN PATENT DOCUMENTS

| | | | |
|---|---|---|---|
| CA | 2933450 | C | 6/2021 |
| CN | 105259664 | A | 1/2016 |

(Continued)

OTHER PUBLICATIONS

U.S. Appl. No. 18/132,615, filed Apr. 10, 2023, Baran et al.

(Continued)

*Primary Examiner* — Gims S Philippe
(74) *Attorney, Agent, or Firm* — Wolf, Greenfield & Sacks, P.C.

(57) ABSTRACT

Techniques for controlling optical behavior of a multi-view display apparatus comprising a first layer comprising first optical elements and a second layer comprising second optical elements. The techniques include obtaining a plurality of scene views; obtaining information specifying a model of the multi-view display apparatus; obtaining information specifying at least one blurring transformation; and generating actuation signals for controlling the multi-view display apparatus to concurrently display a plurality of display views corresponding to the plurality of scene views, the actuation signals comprising first actuation signals for controlling the first optical elements and second actuation signals for controlling the second optical elements, the generating comprising: generating the first actuation signals and the second actuation signals based, at least in part, on the plurality of scene views, the information specifying the (Continued)

model of the multi-view display apparatus, and the information specifying the at least one blurring transformation.

6 Claims, 30 Drawing Sheets

Related U.S. Application Data continuation of application No. 17/227,113, filed on Apr. 9, 2021, now Pat. No. 11,652,980, which is a continuation of application No. 16/847,553, filed on Apr. 13, 2020, now Pat. No. 10,999,572, which is a continuation of application No. 16/049,423, filed on Jul. 30, 2018, now Pat. No. 10,645,375, which is a continuation of application No. 15/267,874, filed on Sep. 16, 2016, now Pat. No. 10,070,118.

(60) Provisional application No. 62/339,830, filed on May 21, 2016, provisional application No. 62/245,620, filed on Oct. 23, 2015, provisional application No. 62/219,767, filed on Sep. 17, 2015.

(51) Int. Cl.

| | |
|---|---|
| ***B41M 3/06*** | (2006.01) |
| ***H04N 13/122*** | (2018.01) |
| ***H04N 13/302*** | (2018.01) |
| *B44F 7/00* | (2006.01) |

(56) References Cited

U.S. PATENT DOCUMENTS

| | | | |
|---|---|---|---|
| 5,206,707 | A | 4/1993 | Ott |
| 5,503,952 | A | 4/1996 | Suzuki et al. |
| 5,598,058 | A | 1/1997 | LaPointe |
| 5,663,312 | A | 9/1997 | Chaturvedula |
| 5,821,028 | A | 10/1998 | Maejima et al. |
| 6,549,308 | B1 * | 4/2003 | Camahort ................ G03H 1/08 359/9 |
| 6,906,762 | B1 | 6/2005 | Witehira et al. |
| 7,342,721 | B2 | 3/2008 | Lukyanitsa |
| 7,742,215 | B2 | 6/2010 | Hagood, IV |
| 7,973,972 | B2 * | 7/2011 | Takebe ................. H04N 1/4055 358/1.9 |
| 8,301,062 | B2 * | 10/2012 | Stelter ................ G03G 15/6585 399/223 |
| 8,651,678 | B2 | 2/2014 | Lanman et al. |
| 8,848,006 | B2 | 9/2014 | Wetzstein et al. |
| 8,865,374 | B2 | 10/2014 | Sarnataro |
| 10,070,118 | B2 | 9/2018 | Baran et al. |
| 10,498,939 | B2 * | 12/2019 | Ludwig .............. G01N 15/1433 |
| 10,645,375 | B2 | 5/2020 | Baran et al. |
| 10,999,572 | B2 | 5/2021 | Baran et al. |
| 11,007,772 | B2 | 5/2021 | Baran et al. |
| 11,577,504 | B2 | 2/2023 | Baran et al. |
| 11,652,980 | B2 | 5/2023 | Baran et al. |
| 2002/0163482 | A1 | 11/2002 | Sullivan |
| 2005/0030329 | A1 | 2/2005 | Sanger |
| 2006/0256385 | A1 | 11/2006 | Takebe et al. |
| 2006/0274066 | A1 | 12/2006 | Ying et al. |
| 2007/0146389 | A1 | 6/2007 | Distler |
| 2007/0177006 | A1 | 8/2007 | De Zwart et al. |
| 2008/0309756 | A1 | 12/2008 | Verburgh et al. |
| 2009/0003515 | A1 | 1/2009 | Naidu et al. |
| 2010/0079676 | A1 | 4/2010 | Kritt et al. |
| 2010/0086285 | A1 | 4/2010 | Sasaki et al. |
| 2011/0019056 | A1 | 1/2011 | Hirsch et al. |
| 2011/0236105 | A1 | 9/2011 | Noguchi et al. |
| 2011/0267558 | A1 | 11/2011 | Hsu et al. |
| 2011/0299761 | A1 | 12/2011 | Myokan |
| 2011/0304865 | A1 | 12/2011 | Ariga et al. |
| 2012/0009525 | A1 | 1/2012 | Clube et al. |
| 2012/0038957 | A1 | 2/2012 | Umezawa |
| 2012/0092634 | A1 | 4/2012 | Solak et al. |
| 2012/0099029 | A1 | 4/2012 | Nejat et al. |
| 2012/0140131 | A1 | 6/2012 | Lanman et al. |
| 2012/0162298 | A1 | 6/2012 | Rozenstein et al. |
| 2012/0293411 | A1 | 11/2012 | Leithinger et al. |
| 2012/0300041 | A1 | 11/2012 | Hamashima |
| 2013/0003090 | A1 | 1/2013 | Sato |
| 2013/0015778 | A1 | 1/2013 | Li et al. |
| 2013/0095418 | A1 | 4/2013 | Solak |
| 2013/0169677 | A1 | 7/2013 | Rosset et al. |
| 2013/0169896 | A1 | 7/2013 | Iwahashi et al. |
| 2013/0235434 | A1 | 9/2013 | Akiyama et al. |
| 2013/0335463 | A1 | 12/2013 | Chiang et al. |
| 2014/0092229 | A1 | 4/2014 | Ludwig |
| 2014/0098423 | A1 | 4/2014 | Uchimoto et al. |
| 2014/0146223 | A1 | 5/2014 | Eromaki et al. |
| 2014/0146388 | A1 | 5/2014 | Kautz et al. |
| 2014/0211451 | A1 | 7/2014 | Wang |
| 2014/0300869 | A1 | 10/2014 | Hirsch et al. |
| 2015/0234190 | A1 | 8/2015 | Schowengerdt |
| 2015/0248046 | A1 | 9/2015 | Schowengerdt |
| 2015/0294143 | A1 | 10/2015 | Wells et al. |
| 2016/0042501 | A1 | 2/2016 | Huang et al. |
| 2017/0054966 | A1 | 2/2017 | Zhou et al. |
| 2017/0085867 | A1 | 3/2017 | Baran et al. |
| 2017/0272737 | A1 | 9/2017 | Jacobs et al. |
| 2017/0300722 | A1 | 10/2017 | Foerster et al. |
| 2019/0054734 | A1 | 2/2019 | Baran et al. |
| 2019/0098290 | A1 | 3/2019 | Baran et al. |
| 2020/0244948 | A1 | 7/2020 | Baran et al. |
| 2021/0258562 | A1 | 8/2021 | Baran et al. |
| 2021/0370666 | A1 | 12/2021 | Baran et al. |
| 2023/0405988 | A1 | 12/2023 | Baran et al. |
| 2023/0412791 | A1 | 12/2023 | Baran et al. |

FOREIGN PATENT DOCUMENTS

| | | | |
|---|---|---|---|
| CN | 106494077 | A | 3/2017 |
| JP | S59-124550 | A | 7/1984 |
| JP | S62-234935 | A | 10/1987 |
| JP | H11-511702 | A | 10/1999 |
| JP | H11-327065 | A | 11/1999 |
| JP | 2002-137530 | A | 5/2002 |
| JP | 2003-101778 | A | 4/2003 |
| JP | 2007-098726 | A | 4/2007 |
| JP | 2011-230413 | A | 11/2011 |
| JP | 2012-003121 | A | 1/2012 |
| JP | 2013-010339 | A | 1/2013 |
| KR | 10-2014-0067156 | A | 6/2014 |
| WO | WO 96/23663 | A1 | 8/1996 |
| WO | WO 2010/101601 | A1 | 9/2010 |
| WO | WO 2015/100301 | A1 | 7/2015 |

OTHER PUBLICATIONS

U.S. Appl. No. 18/151,134, filed Jan. 6, 2023, Baran et al.
PCT/US2016/052166, Feb. 2, 2017, International Search Report and Written Opinion.
PCT/US2016/052166, Mar. 29, 2018, International Preliminary Report on Patentability.
PCT/US18/46107, Oct. 25, 2018, International Search Report and Written Opinion.
EP 16847403.9, Apr. 24, 2019, Extended European Search Report.
EP 18843258.7, Apr. 26, 2021, Extended European Search Report.
EP 16847403.9, Aug. 3, 2021, Communication pursuant to Article 94(3) EPC.
International Search Report and Written Opinion for International Application No. PCT/US2016/052166 dated Feb. 2, 2017.
International Preliminary Report on Patentability for International Application No. PCT/US2016/052166 dated Mar. 29, 2018.
International Search Report and Written Opinion for International Application No. PCT/US18/46107 dated Oct. 25, 2018.
Extended European Search Report for European Application No. 16847403.9 dated Apr. 24, 2019.
Extended European Search Report for European Application No. 18843258.7 dated Apr. 26, 2021.

(56) References Cited

OTHER PUBLICATIONS

Communication pursuant to Article 94(3) EPC dated Aug. 3, 2021 in connection with European Application No. 16847403.9.
Cusdin, Flexography: Principles & Practices. 1999. 5th edition. vol. 1. 940 pages.
Dey et al., Digital Pre-Compensation for Faulty D/A Converters: the "Missing Pixel" Problem. Proceedings, 2003 ICASSP. 4 pages.
Hirsch et al., Lumii: DIY Light Field Prints. ACM Siggraph 2016 Studio. Jul. 2016 ACT. 3 pages.
Ives, A Novel Stereogram. Journal of the Franklin Institute 153: 51-52. 1902.
Lanman et al., Content-Adaptive Parallax Barriers: Optimizing Dual-Layer 3D Displays Using Low-Rank Light Field Factorization. ACM Transactions on Graphics (TOG) 29.6 (2010): 163.
Liao et al., Perceptually Optimized Dual-layer Light Filed 3D Display Using a Moire-aware Compressive Factorization. SID 2016 Digest, 2016. 235-8.
Oppenheim et al., Discrete-Time Signal Processing, Third Edition. Upper Saddle River, NJ: Prentice-Hall, Inc., 2010. 4 pages.
Wetzstein et al., Layered 3D: Tomographic Image Synthesis for Attenuation-based Light Field and High Dynamic Range Displays. In ACM Transactions on Graphics (ToG), vol. 30, No. 4, p. 95. ACM, 2011.
Wetzstein et al., Tensor Displays: Compressive Light Field Synthesis using Multilayer Displays with Directional Backlighting. ACM Trans. Graph. 31.4 (2012): 80. 11 pages.
Wetzstein, Synthetic Light Field Archive. http://web.media.mit.edu/~gordonw/SyntheticLightFields/ Accessed Aug. 12, 2015. 7 pages.
Zwicker et al., Antialiasing for Automultiscopic 3D Displays. Rendering Techniques 2006: 17th Eurographics Workshop on Rendering, Jun. 2006, pp. 73-82.

* cited by examiner

300

$$
\begin{aligned}
\underset{\underline{\mathrm{x}}_1,\ldots,\underline{\mathrm{x}}_M}{\text{minimize}} \quad & g(\underline{\mathrm{e}}_1,\ldots,\underline{\mathrm{e}}_N) \\
\text{subject to} \quad & \underline{\mathrm{e}}_1 = f_1(\underline{\mathrm{x}}_1,\ldots,\underline{\mathrm{x}}_M) \\
& \vdots \\
& \underline{\mathrm{e}}_N = f_N(\underline{\mathrm{x}}_1,\ldots,\underline{\mathrm{x}}_M) \\
& \ell_1 \leq \underline{\mathrm{x}}_1 \leq u_1 \\
& \vdots \\
& \ell_M \leq \underline{\mathrm{x}}_M \leq u_M
\end{aligned}
$$

FIG. 3

$$
\begin{aligned}
\underset{\underline{x}_j}{\text{minimize}} \quad & g(\underline{e}_1, \ldots, \underline{e}_N) \\
\text{subject to} \quad & \underline{e}_1 = f_{j,1}(\ldots, \underline{x}_j, \ldots) \\
& \vdots \\
& \underline{e}_N = f_{j,N}(\ldots, \underline{x}_j, \ldots) \\
& \ell_j \leq \underline{x}_j \leq u_j
\end{aligned}
$$

Parameter (t) of Nonlinear curve C(t)

Coordinates (x,y) in cartesian space

MULTI-VIEW DISPLAYS AND ASSOCIATED SYSTEMS AND METHODS

CROSS REFERENCE TO RELATED APPLICATIONS

This application is a continuation of and claims priority under 35 U.S.C. § 120 to U.S. patent application Ser. No. 18/132,615, filed Apr. 10, 2023, titled "MULTI-VIEW DISPLAYS AND ASSOCIATED SYSTEMS AND METHODS", which is a continuation of and claims priority under 35 U.S.C. § 120 to U.S. patent application Ser. No. 17/227,113, filed Apr. 9, 2021, titled "MULTI-VIEW DISPLAYS AND ASSOCIATED SYSTEMS AND METHODS", which is a continuation of and claims priority under 35 U.S.C. § 120 to U.S. patent application Ser. No. 16/847,553, filed Apr. 13, 2020, titled "MULTI-VIEW DISPLAYS AND ASSOCIATED SYSTEMS AND METHODS", which is a continuation of and claims priority under 35 U.S.C. § 120 to U.S. patent application Ser. No. 16/049,423, filed Jul. 30, 2018, titled "MULTI-VIEW DISPLAYS AND ASSOCIATED SYSTEMS AND METHODS", which is a continuation of and claims priority under 35 U.S.C. § 120 to U.S. patent application Ser. No. 15/267,874, filed Sep. 16, 2016, titled "MULTI-VIEW DISPLAYS AND ASSOCIATED SYSTEMS AND METHODS", which claims the benefit under 35 U.S.C. § 119 of U.S. Provisional Patent Application No. 62/219,767, filed on Sep. 17, 2015, titled "TECHNIQUES FOR OPTIMIZED DISPLAYS," and of U.S. Provisional Patent Application No. 62/245,620, filed on Oct. 23, 2015, titled "ON OPTIMIZED DISPLAYS," and of U.S. Provisional Patent Application No. 62/339,830, filed on May 21, 2016, titled "PRINTED LIGHT FIELD DISPLAYS AND ASSOCIATED SYSTEMS AND METHODS," each of which is hereby incorporated by reference in its entirety.

BACKGROUND

Displays that are capable of creating the illusion of depth have long fascinated viewers. While a conventional two-dimensional display shows objects that appear at the physical distance of the display, a three-dimensional (3D) display can create visual effects that appear to extend beyond the display itself, both in front of and behind the physical location of the screen.

One category of 3D displays is "glasses-based" 3D displays, which require a viewer to wear special-purpose eyewear (e.g., 3D glasses) in order to provide the viewer with a sense of depth. The special-purpose eyewear mediates the light arriving from a more distant display or is able to form an image itself. The eyewear provides stereo pairs of images to a viewer's eyes, which in turn provides the viewer with an illusion of depth.

Another category of 3D displays are "glasses-free" 3D displays, which can create the illusion of depth without requiring that a viewer of a 3D display wear special-purpose eyewear or other hardware while viewing the 3D display. A glasses-free 3D display may project multiple views of a scene into space in front of the 3D display in one or multiple directions. A glasses-free 3D display may simultaneously display multiple views of a scene (e.g., 2 views, tens of views, hundreds of views, etc.) to increase the range of viewable locations, increase perceived display quality, and/or allow a viewer to look "around" displayed objects. Examples of glasses-free 3D displays include parallax barrier displays that have a fixed barrier pattern on one layer and sub-images or integral images on another layer, lenticular displays that have an arrangement of cylindrical lenses on one layer and sub-images or integral images on another layer, and computational displays that generate content-dependent patterns to display using two or more layers in order to display a 3D scene.

A multi-view 3D display may be capable of simultaneously showing multiple (two or more) images corresponding to respective multiple views at corresponding viewing locations. A viewer may see different perspectives of a scene from each of the viewing locations. A glasses-free multi-view 3D display is called an automultiscopic 3D display. An automultiscopic display may allow a viewer to see around virtual objects as the viewer's viewpoint to the scene changes. As a viewer's head moves from one side of an automultiscopic 3D display to another, the viewer's eyes may travel through the regions where various images are projected from the automultiscopic 3D display. The images generated by an automultiscopic 3D display may represent various perspectives of a virtual scene, and through these various perspectives the viewer may observe the virtual scene with full motion parallax and stereoscopic depth. An automultiscopic 3D display may generate multiple views (the particular view seen by a viewer depending on position of the viewer relative to the 3D display), may exhibit binocular disparity, and/or may exhibit motion parallax in both horizontal and vertical directions.

SUMMARY

Some embodiments provide for a system for generating actuation signals to control optical behavior of a multi-view display apparatus, the multi-view display apparatus comprising at least two different layers including a first layer comprising a first plurality of optical elements and a second layer comprising a second plurality of optical elements. The system comprises: at least one processor; at least one non-transitory computer-readable storage medium storing processor-executable instructions that, when executed by the at least one processor, cause the at least one processor to perform: obtaining a plurality of scene views; information specifying a model of the multi-view display apparatus; obtaining information specifying at least one blurring transformation; and generating a plurality of actuation signals for controlling the multi-view display apparatus to concurrently display a plurality of display views corresponding to the plurality of scene views, the plurality of actuation signals comprising a first plurality of actuation signals for controlling the first plurality of optical elements and a second plurality of actuation signals for controlling the second plurality of optical elements, the generating comprising: generating the first plurality of actuation signals and the second plurality of actuation signals based, at least in part, on the plurality of scene views, the information specifying the model of the multi-view display apparatus, and the information specifying the at least one blurring transformation.

Some embodiments provide for a method for generating actuation signals to control optical behavior of a multi-view display apparatus, the multi-view display apparatus comprising at least two different layers including a first layer comprising a first plurality of optical elements and a second layer comprising a second plurality of optical elements. The method comprises using at least one processor configured to perform: obtaining a plurality of scene views; information specifying a model of the multi-view display apparatus; obtaining information specifying at least one blurring transformation; and generating a plurality of actuation signals for controlling the multi-view display apparatus to concurrently display a plurality of display views corresponding to the plurality of scene views, the plurality of actuation signals comprising a first plurality of actuation signals for controlling the first plurality of optical elements and a second plurality of actuation signals for controlling the second plurality of optical elements, the generating comprising: generating the first plurality of actuation signals and the second plurality of actuation signals based, at least in part, on the plurality of scene views, the information specifying the model of the multi-view display apparatus, and information specifying the at least one blurring transformation.

Some embodiments provide for at least one non-transitory computer-readable storage medium storing processor-executable instructions that, when executed by at least one processor, cause the at least one processor to perform a method for generating actuation signals to control optical behavior of a multi-view display apparatus, the multi-view display apparatus comprising at least two different layers including a first layer comprising a first plurality of optical elements and a second layer comprising a second plurality of optical elements. The method comprises: obtaining a plurality of scene views; obtaining information specifying a model of the multi-view display apparatus; obtaining information specifying at least one blurring transformation; and generating a plurality of actuation signals for controlling the multi-view display apparatus to concurrently display a plurality of display views corresponding to the plurality of scene views, the plurality of actuation signals comprises a first plurality of actuation signals for controlling the first plurality of optical elements and a second plurality of actuation signals for controlling the second plurality of optical elements, the generating comprising: generating the first plurality of actuation signals and the second plurality of actuation signals based, at least in part, on the plurality of scene views, the information specifying the model of the multi-view display apparatus, and information specifying the at least one blurring transformation.

Some embodiments provide for a system for generating actuation signals to control optical behavior of a multi-view display apparatus, the multi-view display apparatus comprising at least two different layers including a first layer comprising a first plurality of optical elements and a second layer comprising a second plurality of optical elements. The system comprises: at least one processor; at least one non-transitory computer-readable storage medium storing processor-executable instructions that, when executed by the at least one processor, cause the at least one processor to perform: obtaining a plurality of scene views; obtaining information specifying a model of the multi-view display apparatus; and generating, based at least in part on the plurality of scene views and the information specifying the model of the multi-view display apparatus, a plurality of actuation signals for controlling the multi-view display apparatus to concurrently display a plurality of display views corresponding to the plurality of scene views, the plurality of actuation signals comprising a first plurality of actuation signals for controlling the first plurality of optical elements and a second plurality of actuation signals for controlling the second plurality of optical elements, wherein at least two of the plurality of actuation signals each has a Sobel-based high-frequency content measure that is greater in value than 0.2 in at least one color or intensity channel, and wherein the plurality of actuation signals is updated at a rate of less than 120 Hz (e.g., no greater than 60 Hz).

Some embodiments provide for a system for generating signals to control optical behavior of a multi-view display apparatus, the multi-view display apparatus comprising at least two different layers including a first layer comprising a first plurality of optical elements and a second layer comprising a second plurality of optical elements. The system comprises: at least one processor; at least one non-transitory computer-readable storage medium storing processor-executable instructions that, when executed by the at least one processor, cause the at least one processor to perform: obtaining a plurality of scene views; information specifying a model of the multi-view display apparatus; obtaining information specifying at least one blurring transformation; and generating a plurality of signals for controlling the multi-view display apparatus to concurrently display a plurality of display views corresponding to the plurality of scene views, the plurality of signals comprising a first plurality of signals for controlling the first plurality of optical elements and a second plurality of signals for controlling the second plurality of optical elements, the generating comprising: generating the first plurality of signals and the second plurality of signals based, at least in part, on the plurality of scene views, the information specifying the model of the multi-view display apparatus, and the information specifying the at least one blurring transformation. A signal may comprise an actuation signal such that the first plurality of signals may comprise a first plurality of actuation signals and the second plurality of signals may comprise a second plurality of actuation signals.

Some embodiments provide for a multi-view display apparatus comprising: a first layer comprising a first plurality of optical elements; a second layer comprising a second plurality of optical elements, the second layer being separated from the first layer by a distance; and control circuitry comprising: first circuitry configured to control the first plurality of optical elements; and second circuitry configured to control the second plurality of optical elements, wherein the control circuitry is configured to: receive a first plurality of actuation signals and a second plurality of actuation signals generated, based at least in part on a plurality of scene views, information specifying a model of the multi-view display apparatus and information specifying at least one blurring transformation, control the multi-view display apparatus to concurrently display a plurality of views corresponding to the plurality of scene views at least in part by: controlling the first plurality of optical elements to display first content using the first plurality of actuation signals, and controlling the second plurality of optical elements to display second content using the second plurality of actuation signals.

Some embodiments provide for a method of manufacturing a light field print, the light field print comprising at least two different transparent layers including a front transparent layer and a back transparent layer. The method comprises: obtaining content to be rendered using the light field print, the content comprising a plurality of scene views; obtaining printing process information; generating, based at least in part on the content and the printing process information, a first target pattern for the front transparent layer and a second target pattern for the back transparent layer; printing the first target pattern on the front transparent layer by depositing printing material on the front transparent layer in accordance with the first target pattern; and printing the second target pattern on the back transparent layer by depositing printing material on the back transparent layer in accordance with the second target pattern, wherein the front transparent layer is spaced in depth at a distance from the back transparent layer, which distance is less than or equal to a greater of six millimeters and L/60, wherein L is a maximum linear extent of a larger one of the front transparent layer and the back transparent layer, when the front transparent layer and the back transparent layer are different sizes, and a maximum linear extent of the front transparent layer when the front transparent layer and the back transparent layer are a same size.

The foregoing is a non-limiting summary of the invention, which is defined by the attached claims.

BRIEF DESCRIPTION OF DRAWINGS

Various aspects and embodiments will be described with reference to the following figures. It should be appreciated that the figures are not necessarily drawn to scale.

FIG. 3 shows an example optimization problem that may be solved as part of generating actuation signals for controlling a multi-view display and/or as part of generating patterns for printing on one or more layers of a light field print, in accordance with some embodiments of the technology described herein.

DETAILED DESCRIPTION

Figure 1A:
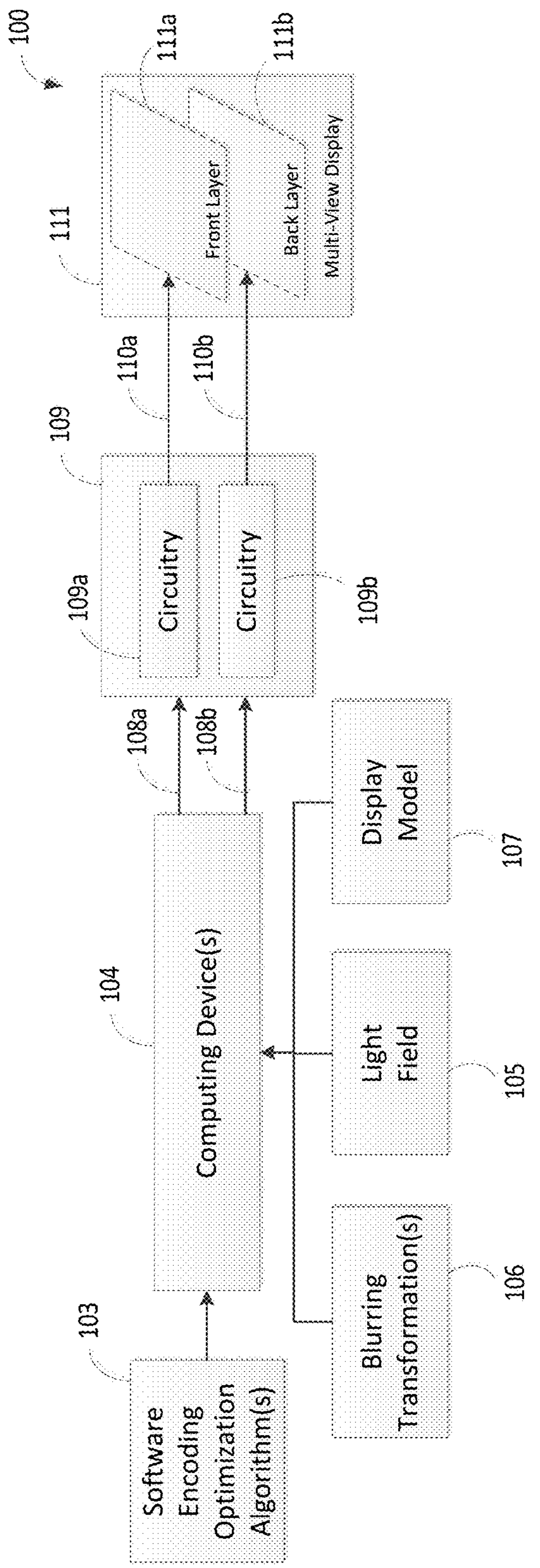
FIG. 1A shows an illustrative system for generating actuation signals for controlling a multi-view display and controlling the multi-view display using the generated actuation signals, in accordance with some embodiments of the technology described herein.

The inventors have recognized and appreciated that conventional automultiscopic 3D displays may be improved upon. Conventional automultiscopic 3D displays do not allow for both high spatial resolution and high angular resolution the manufacturer must trade-off these two display characteristics even though both of them are desirable to consumers. On the one hand, images displayed by an automultiscopic 3D display will appear blurry or jagged when the automultiscopic 3D display does not have sufficient spatial resolution. On the other hand, when an automultiscopic 3D display does not have sufficient angular resolution, the 3D effect of regions that appear to pop in or out of an automultiscopic display will degrade quickly the further the image appears to float from the physical plane of the display. For example, images displayed by an automultiscopic 3D display having insufficient angular resolution may appear increasingly blurry with distance from the physical plane of the 3D display.

The inventors have recognized and appreciated that conventional automultiscopic 3D displays do not allow for dynamically trading off spatial and angular resolution in order to efficiently use the available resolution of a 3D display by dynamically matching the demands of a scene to be displayed. For example, a single scene may have regions that require high spatial resolution (e.g., one or more regions that has a rapidly varying pattern) and regions that require high angular resolution (e.g., one or more regions that appears to pop-out far from the physical plane of the display). However, for a conventional automultiscopic 3D display, the trade-off between spatial and angular resolution of the display must be selected when the 3D display is being manufactured, and it must remain constant across the entire display surface (i.e., it cannot be dynamically adjusted based on the nature of the content to be displayed by the 3D display). As a result, a conventional automultiscopic 3D display can achieve high angular resolution (e.g., for displaying large pop-out effects) only by trading away spatial resolution, which will make all images more blurry, including in the regions that do not appear to pop out of the display and, therefore, do not require high angular resolution.

The inventors have recognized and appreciated that another shortcoming of conventional automultiscopic 3D displays is that their manufacture often requires using optical elements that can be costly to manufacture and challenging to calibrate. Current technology available for manufacturing automultiscopic 3D displays does not provide a sufficiently high spatio-angular resolution relative to their high cost and difficulty of manufacture. Although attempts were made to use computational displays to address some of these problems, the resulting displays are thicker than conventional automultiscopic displays, suffer from narrow viewing angles, are challenging to manufacture, and are optically inefficient with conventional display hardware.

The inventors have developed a new class of automultiscopic 3D displays that allow for dynamically trading off spatial and angular resolution to match the demands of a scene to be displayed. The new automultiscopic 3D displays are computational 3D displays comprising multiple layers controlled by content-dependent actuation signals to display a 3D scene. Using computation to dynamically achieve a desired balance between spatial and angular resolution in an automultiscopic 3D display provides the ability to have sharp in-plane text and graphics and also have large degrees of perceived pop-out in the same display and the same scene, which is something that is not possible with conventional automultiscopic 3D displays.

The inventors have recognized and appreciated that considering the capabilities of the human visual system to resolve individual points on the surface of an automultiscopic 3D display provides additional degrees of freedom in designing the automultiscopic 3D display. Such additional degrees of freedom may be used to dynamically tradeoff spatial resolution and angular resolution and to represent 3D scenes with greater depth, while shrinking the thickness of the automultiscopic 3D display itself.

Accordingly, in some embodiments, the actuation signals used for controlling automultiscopic 3D displays are generated at least in part by using one or more blurring transformations that may be designed and/or selected based on perceptual capabilities of the human visual system. For example, in some embodiments, by shifting reconstruction error in each of the views generated by an automultiscopic 3D display outside the bandwidth of the human vision system, crosstalk between the views can be significantly reduced, resulting in improved performance from the perspective of the viewer. The perceived bandlimited behavior may arise as a result of various factors, including but not limited to the finite resolution of the human retina, focus blur, higher-order optical effects, and diffractive effects in the display hardware or human vision system. Although, perceptually-inspired weighting has been used in some multi-layer displays as a weighting constraint on individual rays, the blurring transformations used in some of the embodiments described herein may impose a bandwidth constraint on the ensemble of rays in each view of the display, which gives rise to a new optimization problem that the techniques described herein may be used to solve.

The inventors have also recognized and appreciated that using one or more blurring transformations designed and/or selected based on perceptual capabilities of the human visual system to dynamically generate signals for controlling multiple layers of an automultiscopic 3D display may also result in a significant brightness increase as compared to conventional parallax barrier based automultiscopic 3D displays. For example, a conventional parallax barrier based automultiscopic 3D display producing a total of N views would result in 1/N factor in overall brightness, potentially reducing brightness substantially. By contrast, some embodiments provide for automultiscopic 3D displays having a much higher overall brightness for the same number of views. Indeed, any increase in brightness over a conventional parallax-based technique for an equivalent number of generated views, in combination with the utilization of one or more blurring transformations, may be indicative of the utilization of the techniques developed by the inventors.

The inventors have also recognized and appreciated that by adjusting basic class of the underlying optical modulators, automultiscopic 3D displays can be made less costly, and can be made to perform better in terms of optical efficiency. In comparison to lenticular printed displays, one important contribution by the inventors is to create a thin and light efficient method to create glasses-free 3D printed displays that does not require any refractive optical element.

Some embodiments of the technology described herein address some of the above discussed drawbacks of conventional automultiscopic 3D displays. However, not every embodiment addresses every one of these drawbacks, and some embodiments may not address any of them. As such, it should be appreciated that aspects of the technology described herein are not limited to addressing all or any of the above discussed drawbacks of conventional automultiscopic 3D displays.

Accordingly, some embodiments provide for a novel class of automultiscopic multi-view 3D displays, developed by the inventors, and techniques for controlling such displays to generate desired scene views. The automultiscopic 3D displays developed by the inventors are computational displays in that they are controlled by actuation signals dynamically determined using the content to be displayed. In some embodiments, the actuation signals may be determined based, at least in part, using one or more blurring transformations. The blurring transformations may be designed and/or selected based on characteristics of the human visual system. Non-limiting examples of blurring transformations are provided herein.

In describing blurring transformations, we generally refer to the limited spatial, temporal, and spatiotemporal bandwidth associated with two-dimensional static and moving images corresponding to individual views of an optimized multi-layer display. This is different from and is in contrast to limiting bandwidth in ray space. Qualitatively, limiting bandwidth in ray space results in increased blurring in a particular view, whereas the techniques described herein decreases effective blurring in a particular view. The described techniques achieve this goal by recognizing that some band-limited blurring naturally occurs in each view due to perceptual effects, and this allows for additional degrees of freedom, which can be used in reducing blurring due to inter-view crosstalk.

I. Controlling Optical Behavior of a Multi-View Display Using One or More Blurring Transformations Some embodiments provide for techniques for generating actuation signals to control optical behavior of a multi-view display apparatus including a first layer comprising first optical elements and a second layer comprising second optical elements. In some embodiments, the techniques include: (1) obtaining scene views (e.g., obtaining a set of scene views corresponding to a respective set of positions of one or more viewers of the multi-view display apparatus, for example, relative to the display apparatus); (2) obtaining information specifying a model of the multi-view display apparatus; (3) obtaining information specifying at least one blurring transformation (e.g., obtaining information specifying a blurring transformation for each of the scene views); (4) generating actuation signals for controlling the multi-view display apparatus to concurrently generate display views corresponding to the scene views, the actuation signals comprising first actuation signals for controlling the first optical elements and second actuation signals for controlling the second optical elements; and (5) controlling the multi-view display apparatus using the generated actuation signals (e.g., by providing the first and second actuation signals to circuitry for controlling the multi-view display apparatus and using the circuitry to control the first optical elements using the first actuation signals and the second optical elements using the second actuation signals).

In some embodiments, generating the actuation signals used for controlling the multi-view display apparatus may include generating the first actuation signals and the second actuation signals based, at least in part, on the scene views, the information specifying a model of the multi-view display apparatus, and the information specifying the at least one blurring transformation.

In some embodiments, the actuation signals may be generated using an iterative optimization technique. In some embodiments, generating the actuation signals includes: (1) generating an initial set of actuation signals; (2) iteratively updating the initial set of actuation signals to produce a sequence of intermediate sets of actuation signals; and (3) and outputting a last set of actuation signals in the sequence of intermediate sets of actuation signals as the actuation signals to use for controlling the optical behavior of the multi-view display apparatus.

In some embodiments, iterative updating the initial set of actuation signals may be performed based, at least in part, on the scene views, the information specifying the model of the multi-view display, and information specifying the at least one band-limiting transformation. Iteratively updating the first set of actuation signals may include: (1) determining, using the information specifying the model of the multi-view display apparatus and the first set of actuation signals, a first set of display views corresponding to display views that would be generated by the multi-view display apparatus if the first set of actuation signals were used to control the multi-view display apparatus; (2) determining, using the at least one blurring transformation, a measure of error between the first set of display views and the plurality of scene views; and (3) updating the first set of actuation signals based on the measure of error between the first set of display views and the plurality of scene views. In some embodiments, the updating may be performed multiplicatively and subject to non-negativity constraints on the actuation signals.

In some embodiments, the multi-view display apparatus may generate grayscale content on one layer and color content on another layer. Accordingly, in some embodiments, first and second actuation signals are generated such that, when the first actuation signals are used to control the first layer, the first layer displays color content and, when the second actuation signals are used to control the second layer, the second layer displays grayscale content.

As described herein, in some embodiments, one or more blurring transformations may be used to generate actuation signals for controlling optical behavior of a multi-view 3D display. In some embodiments, for example, such blurring transformations may be applied to one or more scene views and/or display views when iteratively identifying the actuation signals to use for driving the multi-view 3D display. However, blurring transformations may be used in any other suitable way when generating actuation signals for controlling optical behavior of a multi-view 3D display, as the utilization of blurring transformations is not limited to the application of such transformations to scene views and/or display views (e.g., in some embodiments, blurring transformations may be applied to error views, as described in greater detail below).

In such embodiments, applying a blurring transformation to an image (e.g., a scene view or any other suitable image) may include convolving the image with the band-limiting transformation in the spatial domain or multiplying the 2D Fourier transform (or other frequency transform) of the band-limiting transformation with a corresponding transformation of the image.

In some embodiments, a blurring transformation may comprise a band-limiting function. The band-limiting function may be a 2D function. In some embodiments, a band-limiting function may have a 2D Fourier transform whose magnitude, on average or asymptotically, may decrease with increasing spatial frequency. For example, one illustrative class of image transformations takes the following form:

$$y[u, v] = \sum_{s=-\infty}^{\infty} \sum_{t=-\infty}^{\infty} h[u-s, v-t]x[s, t],$$

where the input image is denoted by x, the output image is denoted by y, x[u,v] is the intensity of the input image x evaluated at horizontal location u and vertical location v, and y[u,v] is the intensity of the output image y evaluated at horizontal location u and vertical location v. Then the h[u,v] may specify parameters of a band-limiting function for processing input image x to obtain output image y if it has a 2D Fourier transform whose magnitude, on average or asymptotically, decreases with increasing spatial frequency. Illustrative non-limiting examples of such band-limiting functions include:

$$y[u, v] = (x[u+1, v-1] + x[u+1, v] + x[u+1, v+1] + x[u, v-1] + x[u, v] + x[u, v+1] + x[u-1, v-1] + x[u-1, v] + x[u-1, v+1])/9;$$

$$y[u, v] = \frac{x[u+1, v] + x[u-1, v] + x[u, v-1] + x[u, v+1] + x[u, v]}{5};$$

$$y[u, v] = \frac{x[u+1, v] + x[u-1, v] + x[u, v-1] + x[u, v+1] + 4x[u, v]}{8};$$

$$y[u, v] = (0.25x[u+1, v-1] + 0.5x[u+1, v] + 0.25x[u+1, v+1] + 0.5x[u, v-1] + x[u, v] + 0.5x[u, v+1] + 0.25x[u-1, v-1] + 0.5x[u-1, v] + 0.25x[u-1, v+1])/4; \text{ and}$$

$$y[u, v] = (0.25x[u+1, v-1] + 0.5x[u+1, v] + 0.25x[u+1, v+1] + 0.5x[u, v-1] + x[u, v] + 0.5x[u, v+1] + 0.25x[u-1, v-1] + 0.5x[u-1, v] + 0.25x[u-1, v+1] + 0.25x[u-1, v+2])/4.25.$$

In some embodiments, a blurring transformation may be any linear or non-linear function that, when applied to an image, reduces the amount of high-frequency content and/or fine detail in the image.

In some embodiments, a blurring transformation may be any function that applies a model of the human visual system to an image. For example, a blurring transformation may be any function that applies a model of human visual acuity to an image. As another example, a blurring transformation may be any function that applies a model of human contrast sensitivity to an image.

In some embodiments, a blurring transformation may comprise a spatial and/or temporal band-limiting function representing an approximation of the band-limited behavior of the human vision system. For example, a blurring transformation may comprise a band-limiting function tailored to the long term vision characteristics of a specific individual (e.g., the specific vision deficiencies of the individual). As another example, a blurring transformation may comprise a band-limiting function tailored to the short-term vision characteristics of an individual viewer (e.g., taking into account the viewer's specific viewing position or instantaneous accommodation focal length).

In some embodiments, applying a blurring transformation to an image comprises spatially convolving (or performing any equivalent calculation in the spatial or other domain such as, for example, multiplication in the Fourier domain) the image with another function. For example, applying a blurring transformation to an image may comprise spatially convolving the image with a point spread function of an optical system (e.g., a camera, optics of a human eye, optical effects of sending light through a very small home the size of a pixel). As a specific example, applying a blurring transformation to an image may comprise spatially convolving the image with a kernel representing a shape of an aperture or a frequency-domain representation of the shape of the aperture. As another example, applying a blurring transformation to an image may comprise spatially convolving the image with a two-dimensional, spatially discrete point spread response, for which the sum of the response, taken over all discrete entries, is greater than or equal to the $l_2$-norm of the response, taken over all discrete entries. As yet another example, applying a blurring transformation to an image may comprise spatially convolving the image with a two-dimensional Gaussian function.

In some embodiments, applying a blurring transformation to an image may comprise applying a binary morphological transformation (e.g., an erosion, a dilation, a morphological opening, and a morphological closing) to the image. In some embodiments, applying a blurring transformation to an image may comprise applying a rank filter (e.g., a median filter, a majority filter, etc.) to the image.

In some embodiments, a blurring transformation may be specified as a cost function in a transformed color space (e.g., utilizing distinct spatio temporal band-limited response characteristics for luminance and chrominance channels) or using other color decompositions.

In some embodiments, a blurring transformation may represent the effects due to diffractive interactions between layers of a multi-view display device (or layers of a light field print) and/or effects due to one or more optical diffusers or other passive layers.

Regardless of the particular form of blurring transformation(s) used to generate actuation signals for controlling a layers of a multi-view 3D display, the actuation signals obtained using the blurring transformations will generally have a significant amount of high frequency content. To make this notion precise, we introduce a so-called Sobel edge detector, which is an edge detection filter that may be used to assess the amount of high-frequency content in an image.

Given a two-dimensional image representing a single color or intensity channel of an actuation signal, denoted $x_k$, its Sobel magnitude image $\hat{x}_k$ may be computed by first computing the Sobel gradients $$G_k^{(x)}$$

and $$G_k^{(y)}$$

according to:

$$G_k^{(x)} = \begin{bmatrix} -1 & 0 & +1 \\ -2 & 0 & +2 \\ -1 & 0 & +1 \end{bmatrix} * x_k \text{ and } G_k^{(y)} = \begin{bmatrix} -1 & -2 & -1 \\ 0 & 0 & 0 \\ +1 & +2 & +1 \end{bmatrix} * x_k,$$

where * denotes the 2-dimensional signal processing convolution operation, and then computing the Sobel magnitude image according to:

$$\hat{x}_k = \frac{1}{\sqrt{32}} \sqrt{G_k^{(x)^2} + G_k^{(y)^2}},$$

where the square root function, summation and squaring functions are performed on a pixel-by-pixel basis. The scale factors used in computing the Sobel magnitude image $\hat{x}_k$ are consistent with the implementation of the Sobel-based edge detection algorithm appearing in the open-source graphics package GIMP.

In addition, we introduce a Sobel-based high frequency content measure $\phi_k$, defined as the ratio of the average pixel value of the Sobel magnitude image $\hat{x}_k$ to the average pixel value of the corresponding pattern image (actuation signal) $x_k$. Accordingly, the Sobel-based high frequency content measure $\phi_k$ may be obtained according to:

$$\phi_k = \frac{AVGPX(\hat{x}_k)}{AVGPX(x_k)},$$

where AVGPX($\hat{x}_k$) denotes the average pixel value of $\hat{x}_k$ and AVGPX($x_k$) denotes the average pixel value of $x_k$. All mathematical operations for computing a Sobel magnitude image and the Sobel-based high frequency content measure are performed in continuous value space and independently of whether the actuation signal is binary valued. For multichannel actuation signals, the Sobel magnitude image and high-frequency content measure may be obtained by operating on each channel individually.

As described herein, the actuation signals obtained using the blurring transformations in accordance with some embodiments of the technology described herein may have a significant amount of high frequency content. For example, two or more of the plurality of actuation signals may each have a Sobel-based high-frequency content measure that is greater in value than 0.2 (e.g., between 0.2 and 1.0) in at least one color or intensity channel. By contrast, natural image s may have values in the range of (0.001-0.06).

It should also be appreciated that aspects of the technology described herein are not limited to explicitly using one or more blurring transformations to generate actuation signals for controlling optical elements in multi-view 3D displays. In some embodiments, actuation signals may be generated using algorithms that do not explicitly contain a blurring transformation, but otherwise generate actuation signals consistent with the overall approach (e.g., having at least a threshold value for a Sobel-based high frequency content measure). As one example, in some embodiments, any heuristic technique for shaping the error in display images generated by a multi-view 3D display to be out of band of the human visual system may be employed.

II. Multi-View Display Arrangements

The techniques for generating actuation signals for controlling a multi-view display apparatus may be used with numerous types of multi-view 3D displays described herein. In some embodiments, the multi-view 3D display may be an automultiscopic display. In some embodiments, the multi-view 3D display may be a computational display.

In some embodiments, the multi-view 3D display may be a multi-layer display comprising multiple (e.g., two, three, four, five, etc.) layers of optical elements. A layer in the multi-view 3D display may be a passive optical layer, an active optical layer, or a layer having both passive and active elements. Examples of passive optical layers include, but are not limited to, polarizers, diffusers, brightness-enhancing films, wave retarders, color filters, holographic layers, parallax barriers, and lenslet arrays. Examples of active optical layers include, but are not limited to, single- and multi-layer liquid crystal display screens, a layer comprising light emitting diodes (LEDs), fluorescent backlight, organic LED (OLED) backlight, an OLED layer, a layer comprising electronically focusable lenses, and multilayer polarization rotators.

In some embodiments, a multi-view display apparatus may include a first layer comprising first optical elements, a second layer comprising second optical elements and separated from the first layer by a distance, and control circuitry configured to control the first layer and the second layer. The control circuitry may comprise first circuitry configured to control the first optical elements and second circuitry configured to control the second optical elements. The control circuitry may be configured to: (1) receive first actuation signals and second actuation signals that were generated, based at least in part on scene views, information specifying a model of the multi-view display apparatus and information specifying at least one blurring transformation; and (2) control the multi-view display apparatus to concurrently display views corresponding to the scene views at least in part by: controlling the first optical elements to display first content using the first actuation signals, and controlling the second optical elements to display second content using the second actuation signals. Examples of blurring transformations are provided herein.

In some embodiments, controlling the first plurality of optical elements comprises controlling the first optical elements using the first actuation signals to display grayscale content; and controlling the second optical elements comprises controlling the second optical elements using the second actuation signals to display color content. In some embodiments, controlling the first optical elements comprises controlling the first optical elements using the first actuation signals to display content that is binary in each of intensity or color channels; and controlling the second optical elements comprises controlling the second optical elements using the second plurality of actuation signals to display content that is binary in each intensity or color channel.

In some embodiments, the first and second layers may both be active layers. For example, the first and second layers may each include LCD panels. As another example, the first layer may include an array of LEDs and the second layer may include an LCD panel. In other embodiments, one of the first and second layers may be an active layer and the other layer may be a passive layer. In yet other embodiments, both the first and second layers may be passive layers. In some embodiments, at least one of the first and second layers may be reflective and/or transmissive. In some embodiments, at least one of the first and second layers may include a transflective LCD. In some embodiments, at least one of the first layer and the second layer has a contrast of less than 1:100. In some embodiments, the pitch of optical elements in the first and/or second layers of optical elements may be less than or equal to 0.005 inches.

In some embodiments, the first layer may include a first color filter array and the second layer may include a second color filter array. Each of the first and second color filter arrays may include color filters having at least at threshold full-width halfmax response (e.g., at least 50 nm, at least 60n, at least 70 nm, at least 80 nm, at least 90 nm, at least 100 nm, etc.). In some embodiments, color channels of the multi-view apparatus may be optimized jointly.

In some embodiments, the first layer may be spaced in depth at a distance of less than six millimeters from the second layer. In some embodiments, the first layer may be spaced in depth at a distance from the second layer that is no more than the greater of the following two quantities: six millimeters, and 1/60th of the maximum linear extent of the larger of the first layer and the second layer.

In some embodiments, the multi-view display apparatus may include one or more layers and/or components in addition to the first and second layers. For example, in some embodiments, the multi-view display apparatus may include one or more diffusers (e.g., a diffuser placed between the first and second layers). As another example, in some embodiments, the multi-view display apparatus may include a backlight unit. In some embodiments, at least 90% of the light emitted by the backlight unit may be emitted over an angular region containing expected viewing locations (by one or more viewers) of the multi-view apparatus. Additionally or alternatively, the multi-view apparatus may include one or more vertically-oriented diagonally-oriented, or horizontally-oriented lens sheets, one or more lenslet arrays, angle-expanding film, light concentrating film, one or more polarizers, one or more diffractive elements, one or more holographic elements, one or more optical diffusers, one or more reflective elements including specular and diffuse reflective elements, one or more optical films, one or more wave retarders (e.g., ½ wave plates).

In some embodiments, the multi-view display apparatus may be designed to be viewed from a distance of no more than one foot from an eye of the viewer. Some embodiments provide for a fixture comprising the multi-view display apparatus that positions the multi-view display apparatus at a distance of less than six inches from an eye of the viewer. For example, the multi-view display apparatus may be part of a wearable (e.g., virtual reality) headset worn by a viewer.

III. Techniques for Manufacturing Light Field Prints

The inventors have developed techniques of printing on transparent media for the purpose of presenting 3D information to viewers. The resulting prints are layered passive 3D display arrangements, having multiple passive layers, and are referred to as "light field prints" herein. Described herein are techniques for rapid, robust, and precise manufacturing of light field prints.

The inventors have recognized and appreciated that the process of creating printed patterns intended for light field rendition is more demanding than that of creating printed patterns for conventional 2D printing. In light field printing, for example, features well below the visual acuity of the human eye may create effects that alter the visible performance of a multi-layer light field print. Recognizing this fact, it is necessary to develop techniques to improve the performance of printing techniques at all levels of the technology stack, from the software representation of the patterns to be printed, to the physical methods of printing, to the alignment and calibration of the printer and the printed results.

It should be appreciated that generating a glasses-free 3D light field print is entirely different "3D printing." In 3D printing, physical structures of a desired shape are produced directly, for example, by additive manufacturing (e.g., sequentially depositing layers of melted materials to build up the desired structure). In glasses-free 3D light field printing, two or more flat printed layers are produced and stacked on top of one another, such that when observed from a range of angles the viewer perceives a physical object to be floating in the vicinity of the printed layers. The physical extent of the layers is generally much smaller than that of the perceived object. By way of example, if a 5 cm×5 cm×5 cm cube were to be 3D printed, it would require specialized hardware capable of depositing physical material in a volume, and the object would occupy a volume of 5 cm×5 cm×5 cm upon completion of the print. On the other hand, a light field print of the same 5 cm×5 cm×5 cm cube would require a printer substantially similar to a standard office printer to print patterns on two 0.1 mm thick sheets, which when separated by 0.8 mm will produce a virtual image of the same cube, such that the total physical volume of the print is 5 cm×5 cm×1 cm.

Some embodiments provide for a method of manufacturing a light field print comprising at least two different transparent layers including a front transparent layer and a back transparent layer. The method includes: (1) obtaining content to be rendered using the light field print, the content comprising a plurality of scene views; (2) obtaining printing process information; (3) generating, based at least in part on the content and the printing process information, a first target pattern for the front transparent layer and a second target pattern for the back transparent layer; (4) printing the first target pattern on the front transparent layer by depositing printing material (e.g., ink or toner) on the front transparent layer in accordance with the first target pattern at a desired dot pitch (e.g., less than 0.0025 inches); (5) printing the second target pattern on the back transparent layer by depositing printing material (e.g., ink or toner) on the back transparent layer in accordance with the second target pattern at a desired dot pitch (e.g., less than 0.0025 inches); and (6) assembling (e.g., using adhesives in some embodiments) the light field print from the front transparent layer and the back transparent layer such that the front transparent layer is spaced in depth at a distance from the back transparent layer. This distance may be less than or equal to a greater of six millimeters and L/60, wherein L is a maximum linear extent of a larger one of the front transparent layer and the back transparent layer, when the front transparent layer and the back transparent layer are different sizes, and a maximum linear extent of the front transparent layer when the front transparent layer and the back transparent layer are a same size.

In some embodiments, the method for manufacturing the light field also includes obtaining information specifying at least one blurring transformation (examples of which are provided herein) and generating the first and second target patterns by using the information specifying the at least one blurring transformation.

In some embodiments, generating the first target pattern may be performed by: (1) generating, based at least in part on the content and the printing process information, an initial first target pattern for the front printed layer and an initial second target pattern for the back printed layer; (2) modifying the initial first target pattern to compensate for effects of print and/or medium dynamics to obtain the first target pattern; and (3) modifying the initial second target pattern to compensate for effects of print and/or medium dynamics to obtain the second target pattern.

In some embodiments, compensating a target pattern for print and/or medium dynamics may include compensating the target pattern for effects of dot gain, for example, by applying spatial linear filtering to the target pattern or in any other suitable way. In some embodiments, compensating a target pattern for print and/or medium dynamics may include compensating the target pattern for effects of printing material bleed and/or maximum allowable printing material density of the front transparent layer, for example, by eliminating pixels in the target pattern so that printing material is not deposited on the front transparent layer at locations of the eliminated pixels or in any other suitable way.

In some embodiments, assembling the light field print comprises first printing the second target pattern on the back transparent layer, then placing the front transparent layer on the back transparent layer before printing the first target pattern on the front transparent layer, and then printing the first target pattern on the front transparent layer.

It should be appreciated that the techniques introduced above and discussed in greater detail below may be implemented in any of numerous ways, as the techniques are not limited to any particular manner of implementation. Examples of details of implementation are provided herein solely for illustrative purposes. Furthermore, the techniques disclosed herein may be used individually or in any suitable combination, as aspects of the technology described herein are not limited to the use of any particular technique or combination of techniques.

IV. Further Descriptions of Techniques for Controlling Optical Behavior of a Multi-View Display Using One or More Blurring Transformations FIG. 1A shows an illustrative system 100 for generating actuation signals for controlling a multi-view display and controlling the multi-view display using the generated actuation signals, in accordance with some embodiments of the technology described herein. As shown in FIG. 1A, computing device(s) 104 is/are configured to generate actuation signals and provide the generated actuation signals to electro-optic interface circuitry 109, which uses the provided actuation signals (sometimes termed "actuation patterns") to generate display interface signals and drive the multi-view display 111 using the generated display interface signals.

As shown in the illustrative embodiment of FIG. 1A, multi-view display 111 comprises a front layer 111*a* and a back layer 111*b*. In some embodiments, layers 111*a* and 111*b* may both be active layers. In other embodiments, front layer 111*a* may be an active layer and back layer 111*b* may be a passive layer or vice versa. Non-limiting examples of an active layer include a single layer LCD screen, a multi-layer LCD screen, a layer comprising light emitting diodes (LEDs), a fluorescent or organic LED (OLED) backlight, an OLED layer, a layer comprising one or more electronically focusable lenses, and multilayer polarization rotators. An active layer may include one or multiple active optical elements that may be electronically controlled. Non-limiting example of such active optical elements include pixels, transistors, light emitting diodes, color filters, liquid crystals, and/or any other electronically actuated components configured to emit and/or aid in emitting light or configured to selectively block and/or aid in selectively blocking light. Non-limiting examples of a passive layer includes a polarizer, a diffuser, a brightness-enhancing film, a layer having a coating, a wave retarders, a color filter, a holographic layer, a parallax barrier layer, and a lenslet array. It should be appreciated that the front and back layers 111*a* and 11*b* may include any other arrangement of optical elements creating a linear or nonlinear parameterization of ray space. In embodiments where the layers 111*a* and 111*b* are active layers, the layers 111*a* and 111*b* may comprise the same number of active optical elements or a different number of active optical elements, as aspects of the technology described herein are not limited in this respect.

As shown in FIG. 1A, computing device(s) 104 generate(s) actuation signals 108*a* and 108*b* used for controlling the optical behavior of layers 111*a* and 111*b* of multi-view display 111. Computing device(s) 104 provide(s) actuation signals 108*a* to first electro-optic interface circuitry 109*a* that, in response to receiving actuation signals 108*a*, generates display interface signals 110*a* to drive the front layer 111*a*. The display interface signals 110*a* may comprise a display interface signal for each of one or more (e.g., all) of the optical elements in front layer 111*a*. Actuation signals 108*a* may comprise an actuation signal for each of one or more (e.g., all) of the optical elements in front layer 111*a*. Computing device(s) 104 also provide actuation signals 108*b* to second electro-optic interface circuitry 109*b* that, in response to receiving actuation signals 108*b*, generates display interface signals 110*b* to drive the back layer 111*b*. The display interface signals 110*b* may comprise a display interface signal for each of one or more (e.g., all) of the optical elements in back layer 111*b*. Actuation signals 108*b* may comprise an actuation signal for each of one or more (e.g., all) of the optical elements in front layer 111*b*.

A multi-view display is not limited to including only two layers, as illustrated in the illustrative embodiment of FIG. 1A and may include any suitable number of layers including any suitable number of active layers (e.g., 0, 1, 2, 3, 4, 5, etc.) and/or any suitable number of passive layers (e.g., 0, 1, 2, 3, 4, 5, etc.), as aspects of the technology described herein are not limited in this respect. In embodiments where a multi-view display includes N active layers (where N is an integer greater than two), the computing device(s) 104 may be configured to generate N sets of actuation signals and provide them to electro-optical circuitry 109 that, in response generates N sets of display interface signals and uses the generated sets of display interface signals to drive the N active layers of the multi-view display.

In some embodiments, computing device(s) 104 may include one or multiple computing devices each being of any suitable type. Each computing device may include one or multiple processors. Each processor may be a central processing unit (CPU), a graphics processing unit (GPU), a digital signal processor (DSP), an FPGA, an ASIC, any other type of hardware processor, or any suitable combination thereof. When computing device(s) 104 include multiple computing devices, the multiple computing devices may be located at one physical location or may be distributed among different physical locations. The multiple computing devices may be configured to communicate with one another directly or indirectly.

In some embodiments, including the illustrative embodiment shown in FIG. 1A, computing device(s) 104 may be configured the generate actuation signals (e.g., actuation signals 108*a* and 108*b*) based on: (a) information 105 specifying a desired light field to be reproduced by multi-view display 111; (b) information 106 specifying of one or more blurring transformations; and (c) information 107 specifying a model of the multi-view display 111. The computing device(s) 104 may generate actuation signals based on these inputs by using software 103 encoding one or more optimization algorithms for solving one or more optimization problems to obtain actuation signals based on these inputs. The software 103 may comprise processor instructions that, when executed, solve the optimization problem(s) to obtain actuation signals based on the above-described inputs. The software 103 may be written in any suitable programming language(s) and may be in any suitable format, as aspects of the technology described herein are not limited in this respect.

Accordingly, in some embodiments, the actuation signals 108*a* and 108*b* may be obtained as solutions to an optimization problem that is formulated, at least in part, by using: (a) information 105 specifying a desired light field to be reproduced by multi-view display 111; (b) information 106 specifying of one or more blurring transformations; and (c) information 107 specifying a model of the multi-view display 111. Examples of such optimization problems and techniques for generating solutions to them are described herein including with reference to FIGS. 2-15.

Accordingly, in some embodiments, the content generated by multi-view display 111 may be obtained by solving at least one optimization problem (e.g., by one or more optimization algorithms including, for example, one or more iterative optimization algorithms). As such, multi-view display 111 may be referred to as an "optimized display." An optimized display may be any display that generates content obtained by solving at least one optimization problem.

In some embodiments, information 105 specifying a desired light field to be reproduced by multi-view display 111 may include one or multiple scene views. The scene views may be of a natural scene or synthetic scene, and may be representative of a naturally occurring light field or of a light field that may not bear much resemblance to a naturally occurring light field. The latter case could correspond, by way of example and not limitation, to a scene having multiple distinct views showing essentially independent two-dimensional content in each view. In some embodiments, each scene view may correspond to a respective position of a viewer of the multi-view display apparatus.

In some embodiments, the information 105 specifying one or more scene views may include an image (e.g., a PNG file, a JPEG file, or any other suitable representation of an image) for each of one or more (e.g., all) of the scene views. The image may be a color image or a grayscale image and may be of any suitable resolution. In some embodiments, the image of a scene view may be generated by 3D generation software (e.g., AUTOCAD, 3D STUDIO, SOLIDWORKS, etc.). The information 105 specifying the scene views may specify any suitable number of views (e.g., at least two, at least ten, at least fifty, at least 100, at least 500, between 2 and 1000, between 10 and 800, or in any other suitable combination of these ranges), as aspects of the technology provided herein are not limited in this respect.

In some embodiments, information 106 specifying of one or more blurring transformations may comprise any suitable data (e.g., numerical values) embodying the blurring transformation. The data may be stored in one or more data structure(s) of any suitable type, which data structure(s) may be part of the representation. Additionally or alternatively, the information specifying a blurring transformation may include processor-executable instructions (e.g., software code in any suitable programming language, one or more function calls to one or more application programming interfaces and/or software libraries, etc.) that, when executed, apply the blurring transformation to an image (e.g., by operating on a data structure encoding the image). It should be appreciated that information 106 may specify one or multiple blurring transformations in any suitable way, as aspects of the technology described herein are not limited in this respect. The information 106 may specify blurring transformations of any suitable type including any of the types of blurring transformations described herein.

In some embodiments, information 107 specifying a model of the multi-view display 111 may include information characterizing one or more physical characteristics of the multi-view display 111. Information 107 may include information about any physical characteristics of the multi-view display 111 that influence the way in which the multi-view display generates images. For example, in some embodiments, information 107 may include information indicating a distance between the front layer and the back layer, a relative location of the front layer to the back layer, resolution of the front layer, resolution of the back layer, size of the front layer, size of the back layer, information about the response of any color filters in the front layer and/or the back layer, a representation of spectral cross-talk between color channels of the front layer and the back layer and/or any other suitable information characterizing one or more physical characteristics of the multi-view display.

In some embodiments, multi-view display 111 may include one or more multiplicative panel layers (e.g., one or more LCD panels with integrated polarizers, as well as liquid crystal on silicon (LCOS) and digital micro-mirror devices (DMD) or other electromechanical devices), and information 107 may include information indicating the effect of the multiplicative panel layer(s) on light passing through layers of the multi-view display 111. In some embodiments, multi-view display 111 may include one or more additive panel layers (e.g., optically combined LCDs, OLEDs, and LED elements), and information 107 may include information indicating the effect of the additive panel layer(s) on light passing through layers of the multi-view display 111. In some embodiments, multi-view display 111 may include one or more polarization-rotating layers (e.g., LCD panels without polarizers), and information 107 may include information indicating the effect of the polarization-rotating layers on light passing through layers of the multi-view display 111.

In some embodiments, information 107 may include information indicating the effect of one or multiple projection systems part of multi-view display 111. In some embodiments, information 107 may include information indicating perspective effects of multi-view display 111, which effects may be representable as on-axis and off-axis projections. In some embodiments, information 107 may include a representation of generally non-uniform sub-pixel tiling patterns, associated with reproducing various color channels in various layers. In some embodiments, information 107 may include a representation of spectral cross talk between red, green, blue, or other color channels. In some embodiments, information 107 may include a representation of the effective minimum and maximum intensity levels attainable by the display elements. In some embodiments, information 107 may include information characterizing non-linear response characteristics (if any) of any multiplicative and/or additive display elements in multi-view display 111. In some embodiments, information 107 may include information about perturbations in position of one or more components of multi-view display 111 (e.g., as a consequence of manufacturing). In some embodiments, information 107 may include information about physical movements of display element positions (e.g., when the multi-view display 111 includes one or more motorized elements). In some embodiments, information 107 may include a representation of the time-domain dynamics of optical elements in the multi-view display 111. By way of example and not limitation, said time-domain dynamics may characterize pixel state rise and fall time.

In some embodiments, information 107 may include a representation of constraints in the electro-optical interface circuitry 109 associated with transforming the actuation signals provided to display interface signals. By way of example and not limitation, the constraints represented may reflect the allowable subsets of pixel states that may be updated in a given clock cycle. By way of example and not limitation, it is possible to use a subset of row and column drivers, so that a subset of pixels can be updated at a rate that is higher than the equivalent full-refresh frame rate of the display element. Further non-limiting examples of display driver circuitry constraints that may be represented include constraints reflecting the allowable precision with which values may be assigned to a particular pixel or set of pixels. By way of example and not limitation, said pixel states may be specified as some number of bits per color channel per pixel.

In some embodiments, information 107 may include information characterizing one or more passive optical phenomena associated with the multi-view display 111. For example, in some embodiments, multi-view display 111 may include one or more passive layers (different from layers 111$a$ and 111$b$), and information 107 may include information characterizing the effects of the passive layer(s) on light passing through layers of the multi-view display 111. Such passive layers may include one or more optical diffusers, one or more reflective elements including specular and diffuse reflective elements, one or more optical films, one or more lenslet arrays, one or more holographic layers (e.g., diffractive holographic backlights). Such passive layers may be located in front of, in between two of, or behind any of the active layers in the multi-view display 111. Additionally or alternatively, information 107 may include information characterizing diffractive effects between optical elements, for example, due to pixel aperture patterns, wavelength-dependent effects of any optical films, wavelength-dependent effects of wave retarders (e.g., ½ wave plates), angle-dependent intensity responses including, for example, angle-dependent brightness, and contrast and/or gamma characterizations.

In some embodiments, information 107 may comprise a mapping between actuation signals used to drive a multi-view display and the display views generated by the multi-view display in response to the actuation signals. The mapping may be generated using (and, as such, may represent and/or reflect) any of the information described above as being part of information 107. For example, the mapping may be generated using: information characterizing one or more physical characteristics of the multi-view display 111; information indicating a distance between the front layer and the back layer, a relative location of the front layer to the back layer, resolution of the front layer, resolution of the back layer, size of the front layer, size of the back layer, information about the response of any color filters in the front layer and/or the back layer, a representation of spectral cross-talk between color channels of the front layer and the back layer; information indicating the effect of the multiplicative, additive, and/or polarization rotating panel layer(s) on light passing through layers of the multi-view display 111; information indicating the effect of one or multiple projection systems part of multi-view display 111; information indicating perspective effects of multi-view display 111; representation of generally non-uniform subpixel tiling patterns, associated with reproducing various color channels in various layers; a representation of spectral cross talk between red, green, blue, or other color channels; a representation of the effective minimum and maximum intensity levels attainable by the display elements; information characterizing non-linear response characteristics of any multiplicative and/or additive display elements in multi-view display 111; information about perturbations in position of one or more components of multi-view display 111; information about physical movements of display element positions (e.g., when the multi-view display 111 includes one or more motorized elements; a representation of the time-domain dynamics of optical elements in the multi-view display 111; constraints in the electro-optical interface circuitry 109 associated with transforming the actuation signals provided to display interface signals; information characterizing one or more passive optical phenomena associated with the multi-view display 111; information characterizing diffractive effects between optical elements; and/or any information about any physical characteristics of the multi-view display 111 that influence the way in which the multi-view display generates images.

In some embodiments, the mapping between actuation signals used to drive a multi-view display and the display views generated by the display may be generated (e.g., computed), and stored for subsequent use, and accessed when they are to be used. In such embodiments, the mappings may be stored in any suitable format and/or data structure(s), as aspects of the technology described herein are not limited in this respect. In some embodiments, the mapping may be generated and used right away, without being stored.

In some embodiments, the mapping may be generated using one or more software packages. The software package(s) may take as input and/or parameters any of the above described information 107 to generate display views from actuation signals. For example, in some embodiments, the mapping may be generated using a rendering package or framework (e.g., 3D Studio, Blender, Unity, ThreeJS, NVIDIA Optix, POVRay, or custom or other packages, which may make use of various graphics frameworks such as OpenGL, OpenGL ES, WebGL, Direct3D, CUDA, or general-purpose CPU libraries) in rendering a model of the display in the state corresponding to the use of the actuation signals, using a camera projection to obtain the view from the particular view location of interest. The projection may be a perspective projection, an off-axis projection, or an orthographic projection.

In embodiments where the actuation signals result in light being selectively emitted from the rear layer and light being selectively attenuated in the front layer, the rear layer may be rendered as a plane textured with a first actuation signal, followed by a rendering of the front layer as a plane textured with a second actuation signal, blended with the rendering of the rear layer using multiplicative blending. In such embodiments, performing a rendering of the scene using a camera projection whose viewpoint coincides with the desired location of the display viewpoint may result in the computation of the associated display view. In some embodiments where the display model is more complex (e.g., involving a model of reflective layers, diffuse layers, spectral cross-talk between color channels, diffractive effects, or internal reflections between layers) the mapping from the actuation signals to the display views may be generated using optics modeling routine or software (e.g., NVIDIA Optix, Maxwell, or custom-written software).

Figure 1B:
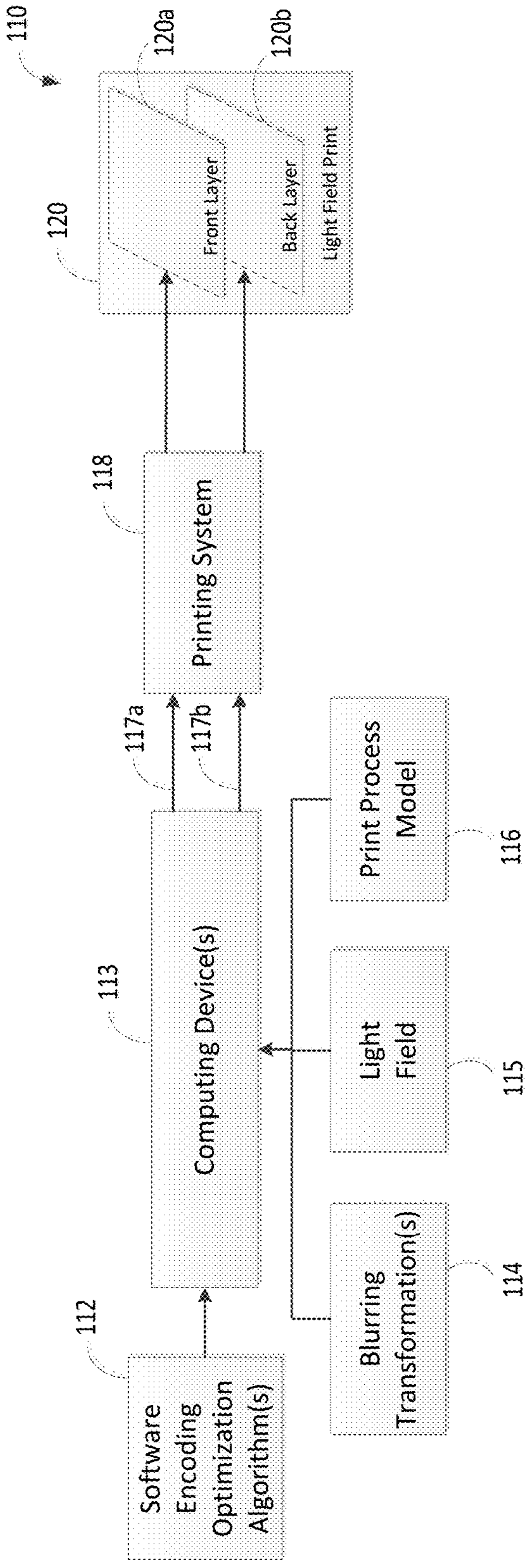
FIG. 1B shows an illustrative system for generating patterns to be printed on layers of a light field print and printing the generated patterns on the layers of the light field print, in accordance with some embodiments of the technology described herein.

FIG. 1B shows an illustrative system 110 for generating patterns to be printed on layers of a light field print and printing the generated patterns on the layers of the light field print, in accordance with some embodiments of the technology described herein. As shown in FIG. 1B, computing device(s) 113 is/are configured to generate actuation signals and provide the generated actuation signals to a printing system 118, which prints the provided actuation signals (sometimes termed "actuation patterns" or "target patterns") on layers printed media, which are arranged into a layered passive display arrangement such as light field print 120.

As shown in the illustrative embodiment of FIG. 1B, light field print 120 comprises a front layer 120*a* and a back layer 120*b*. Each of these layers may include one or more transparent film and/or other transparent materials on which generated actuation patterns may be printed by printing system 118. Additionally, in some embodiments, light field print 120 may include one or more other layers including, but not limited to, one or more optical spacers, one or more diffusers, one or more lenslet arrays, one or more holographic layers, one or more color filters, and/or one or more active backlights.

As shown in FIG. 1B, computing device(s) 113 generate(s) target patterns 117*a* and 117*b* for depositing onto layers 120*a* and 120*b*. Computing device(s) 113 provide(s) the generated target patterns to printing system 118, which prints the target patterns onto the layers 120*a* and 120*b*. The printing system 118 may be a laser toner-based printing system, laser drum-based printing system, an inkjet printing system, a chromogenic or other photographic printing system, digital offset printing system, and/or any other type of printing system that may be used to print target patterns on one or more layers used to assemble a light field print.

A light field print is not limited to having only two layers, as illustrated in the illustrative embodiment of FIG. 1B, and may include any suitable number of layers (e.g., 2, 3, 4, 5, 6, 7, etc.), as aspects of the technology described herein are not limited in this respect. In embodiments where a light field print includes N layers (where N is an integer greater than two), the computing device(s) 113 may be configured to generate N target patterns and provide them to printing system 118, which prints the generated target patterns on the N layers, which layers may be subsequently assembled into a light field print.

In some embodiments, computing device(s) 113 may include one or multiple computing devices each being of any suitable type. Each computing device may include one or multiple processors. Each processor may be a central processing unit (CPU), a graphics processing unit (GPU), a digital signal processor (DSP), an FPGA, an ASIC, any other type of hardware processor, or any suitable combination thereof. When computing device(s) 113 include multiple computing devices, the multiple computing devices may be located at one physical location or may be distributed among different physical locations. The multiple computing devices may be configured to communicate with one another directly or indirectly.

In some embodiments, including the illustrative embodiment shown in FIG. 1B, computing device(s) 113 may be configured the generate target patterns (e.g., target patterns 117*a* and 117*b*) based on: (a) information 115 specifying a desired light field to be reproduced by light field print 120; (b) information 114 specifying of one or more blurring transformations; and (c) information 116 specifying a model of the printing process performed by printing system 118. The computing device(s) 113 may generate target patterns based on these inputs by using software 112 encoding one or more optimization algorithms for solving one or more optimization problems to obtain target patterns based on these inputs. The software 112 may comprise processor instructions that, when executed, solve the optimization problem(s) to obtain target patterns based on the above-described inputs. The software 112 may be written in any suitable programming language(s) and may be in any suitable format, as aspects of the technology described herein are not limited in this respect.

Accordingly, in some embodiments, the target patterns 117*a* and 117*b* may be obtained as solutions to an optimization problem that is formulated, at least in part, by using: (a) information 115 specifying a desired light field to be reproduced by light field print 120; (b) information 114 specifying of one or more blurring transformations; and (c) information 116 specifying a model of the printing process performed by printing system 118. Examples of such optimization problems and techniques for generating solutions to them are described herein including below with reference to FIGS. 2-15.

In some embodiments, information 115 specifying a desired light field to be reproduced by a light field print may include one or multiple scene views and, for example, may include any of the information described above in connection with information 105 in FIG. 1A. In some embodiments, information 114 specifying of one or more blurring transformations may include any of the information described above in connection with information 106 in FIG. 1A.

In some embodiments, information 116 specifying a model of the printing process performed by printing system 118 may include information characterizing the printing process including, but not limited to, layer geometry information, color model information, print resolution information, information specifying the type of printing system used, information characterizing how much ink bleed results from the printing process, information characterizing how much dot gain results from the printing process, information indicating the maximum allowable ink density of the printing medium, information indicating the dot pitch of the prints generated by the printing process.

As may be appreciated from the foregoing discussion of FIGS. 1A and 1B, the techniques described herein may be applied to generating actuation patterns for controlling active displays and to generating target patterns for passive displays (including printed and CNC manufactured materials). Non limiting examples of applications of the techniques described herein are listed below. Applications of generating actuation signals for controlling active elements include, but are not limited to, providing electronic displays that may be used at positions far from the viewer's eyes (e.g., producing an illusion of depth without requiring special eyewear or other hardware, producing multiple independent views of a scene, correcting for vision deficiencies of a viewer); providing electronic displays that may be used at positions close from the viewer's eyes with or without an optical system combining display output with the surrounding existing light field (e.g., reproducing accommodation cues in virtual reality or augmented reality applications); providing electronic displays that may be used at positions far from the viewer's eyes superimposed on the surrounding existing light field using an optical system (e.g., a heads up display system). Any of these types of displays may be used as part of mobile devices (e.g., mobile phones, wearable devices and tablets), entertainment systems (e.g., home television displays, in-flight entertainment systems, and automotive entertainment systems), data visualization systems, general-purpose computation systems and computer user interfaces, digital signage including advertisement and information kiosks, architectural preview displays, CAD workstation displays, automotive and avionics instrumentation displays, and any other suitable types of displays. Applications of generating actuation patterns for passive display elements include, but are not limited to, producing furniture, cabinetry, architecture and architectural decoration, stage and television sets, signage, advertisements and promotional materials, including signage with passive or active backlights, generating printed material, for example, of less than 0.02 inches in thickness, CNC machined, and multi-layer items.

As described herein, in some embodiments, an optimization-based approach may be used to generate actuation signals for controlling one or more active layers and/or for generating target patterns for printing onto one or more layers of transparent materials. In some embodiments, the optimization-based approach may be iterative.

In some embodiments, the approach may be as follows. First, at an initialization stage, a first set of actuation signals (or target patterns in the printing context) is generated. This set of actuation signals may be generated fresh or based on using one or more previously-obtained actuation signals. The first set of actuation signals is then used to determine a first set of display views that would be generated by a multi-view display if it were driven by the first set of actuation signals, and the display views are compared to the scene views (which specify the desired light field to be produced by the multi-view display) to generate error views. A display view may be generated for each scene view. The display views may be determined using information about the physical characteristics of the multi-view display (e.g., information 107 described with reference to FIG. 1A). In the printing context, the views may be determined using information about the printing process (e.g., information 116 described with reference to FIG. 1B).

Figure 2:
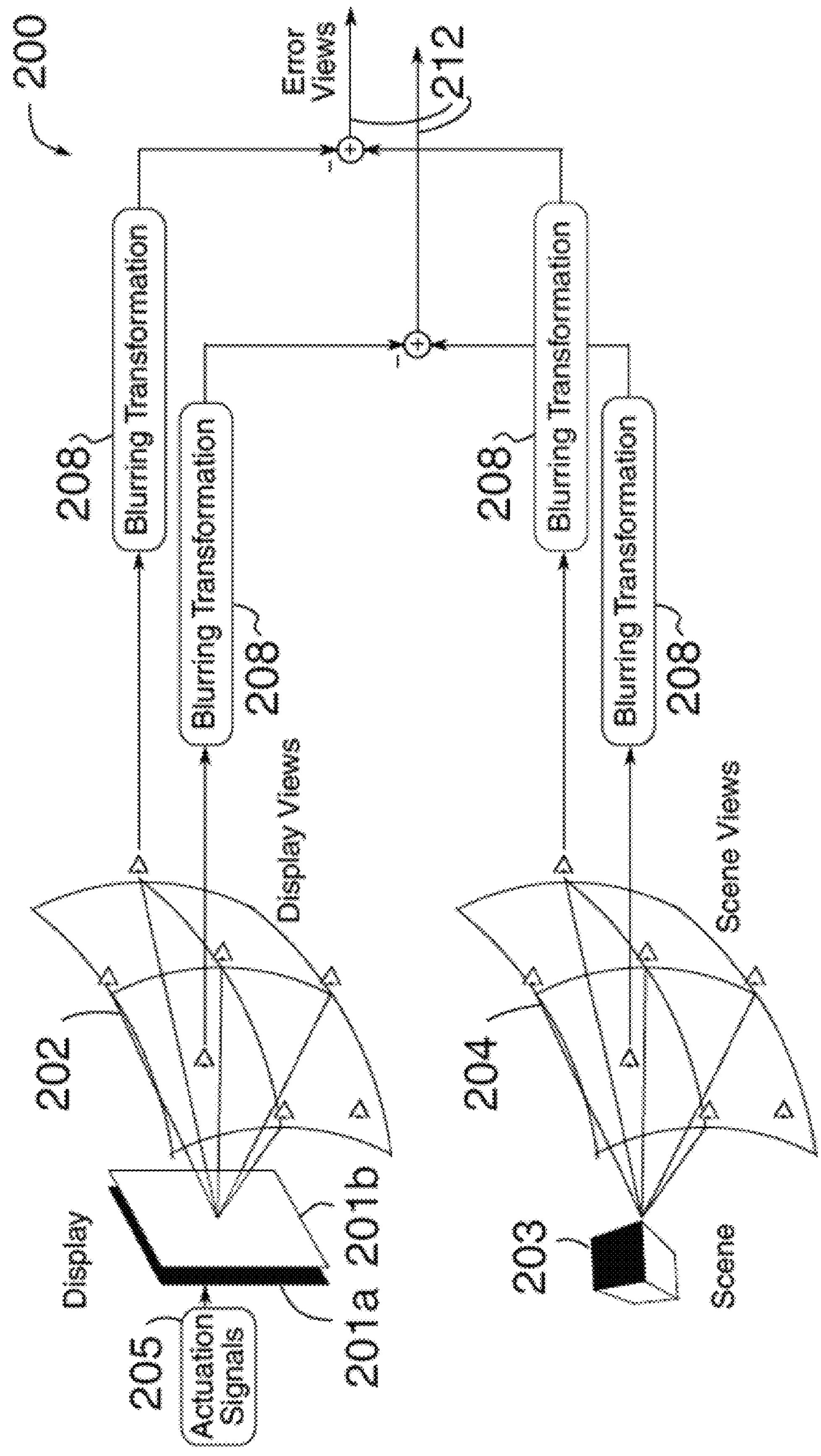
FIG. 2 is an illustrative block diagram of the processing performed to generate actuation signals for controlling a multi-view display, in accordance with some embodiments of the technology described herein.

In some embodiments, the error views may be generated further based upon using one or more blurring transformations (e.g., the same blurring transformation for pairs of display and scene views). In some embodiments, prior to being compared to generate the error views, each of the display views and scene views may be transformed by a suitable blurring transformation (e.g., as shown in FIG. 2). In some embodiments, when the blurring transformations applied to the display and scene views are identical and linear, the blurring transformation may be applied to the error views instead of being applied to the display views and scene views.

In turn, the error views may be used to determine how to update the values of the first set of actuation signals to obtain a second set of actuation signals (in order to reduce the error between the display views and the scene views). The second set of actuation signals are then used to determine a second set of display views that would be generated by a multi-view display if it were driven by the second set of actuation signals, and a second set of error views is generated by comparing the second set of display views with the scene views. The second set of error views is then used to determine how to update the values of the second set of actuation signals to obtain a third set of actuation signals in order further reduce the error between the display vies and the scene views. This iterative process may be repeated until the error between the display views and the scene views falls below a predetermined threshold, a threshold number of iterations has been performed, a threshold amount of time has elapsed, or any other suitable stopping criteria has been satisfied.

Although the above illustrative iterative optimization technique was described with respect to generating actuation signals for controlling active displays, it should be appreciated that analogous techniques may be used to generate target patterns for printing onto transparent layers used to assemble light field prints. Similarly, in descriptions below, the optimization techniques described with reference to FIGS. 2-14 may be applied to generating not only actuation signals for active displays, but also for generating target patterns for manufacturing light field prints.

FIG. 2 is an illustrative block diagram 200 of the processing performed to generate actuation signals for controlling a multi-view display, in accordance with some embodiments of the technology described herein. In particular, FIG. 2 illustrates a step of an iterative optimization technique for identifying the set of actuation signals based on a comparison between a set of display views 202 of a multi-view display 201 having layers 201*a* and 201*b*, which display views are denoted by $d_k$ (k=1, . . . , N) with N representing the number of views, and a set of corresponding scene views 204, which are denoted by $s_k$ (k=1, . . . , N), of a virtual scene 203. The scene views may of any suitable type including the types described herein. For example, the scene views may be of a natural scene or synthetic scene, and may be representative of a naturally occurring light field or of a light field that may not bear much resemblance to a naturally occurring light field. The latter case could correspond, by way of example and not limitation, to a scene having multiple distinct views showing essentially independent two-dimensional content in each view.

In some embodiments, there may be a one-to-one correspondence between the display and scene views. In other embodiments, there may not be such a one-to-one correspondence. For example, the scene views may correspond to the display views when moving in the horizontal direction only, whereas moving in the vertical direction, an ensemble of display views may correspond to a single scene view. As another example, when comparing scene and display views by moving in the horizontal direction, the scene view location may advance at some fraction of (e.g., half) the rate as the rate of the display view location.

As shown in FIG. 2, blurring transformation(s) 208 may be applied to the display views 202 and the scene views 204 and the resulting blurred display views and blurred scene views may be compared to generate error views 212, denoted by $e_k$ (k=1, . . . , N). In some embodiments, the same blurring transformation may be applied to all display views and all scene views. In other embodiments, one blurring transformation Ti may be applied to a display view di and a corresponding scene view $s_i$ and a different blurring transformation $T_j$ may be applied to another display view $d_j$ and its corresponding scene view $s_j$. The blurring transformation(s) 208 may include any of the types of blurring transformations described herein.

The display views may be generated using a set of actuation signals 205, denoted by $x_k$ (k=1, . . . , M), where M indicates the number of actuation signals. The actuation signals 205 may be used in assigning state to various layers of the multi-layer display 201 and/or a simulation of a multi-layer display 201 to generate the display views $d_k$ 202 based on information specifying a model of the multi-layer display 201, which information may include any of the information 107 described with reference to FIG. 1A and, in some embodiments, may include one or more mappings (previously generated and stored or specified in software for "on-line" use) between actuation signals and display views. Accordingly, in some embodiments, one or more mappings may be used to assign state to various layers of the multi-layer display 201 based on actuation signals 205. In this sense, the mappings from actuation signals 205 (i.e., $x_k$ (k=1, . . . , M)) to display views 202 (i.e., $d_k$ (k=1, . . . , N)) may be formulated using characterizations of the overall multi-layer display 201 including its physical light transport and passive or active display elements. Accordingly, the mappings from the actuation signals 205 to the display views 202 may depend on any information characterizing one or more physical characteristics of the multi-view display 111 including, for example, any of the information 107 described with reference to FIG. 1A.

In some embodiments, as may be appreciated from FIG. 2, at each iteration of an optimization algorithm, the goal may be to update the actuation signals 205 based on the error views 212 to reduce the overall amount of error between blurred versions of the display views and blurred versions the scene views. This means that, the non-blurred display view can (and in practice will) have a large amount of high-frequency content, which is removed via the application of the blurring transformations 208. Put another way, an error function that weights low-frequency content more significantly, may encourage the actuation signals to cause the multi-view display to generate high-frequency content since the high frequency content will not count toward the error function as significantly. In some embodiments, the blurring transformation(s) 208 may encourage this by weighting low-frequency content so that the error penalty is higher at in lower frequencies, and so that the error penalty is smaller at higher frequencies.

Additional aspects of the optimization techniques which may be used to generate actuation signals for controlling an active display (e.g., multi-view display 111) or target patterns for manufacturing a light field print (e.g., light field print 120) are described below with reference to FIGS. 3-13.

FIG. 3 shows an example optimization problem 300 that may solved as part of generating actuation signals for controlling a multi-view display and/or as part of generating patterns for printing on one or more layers of a light field print, in accordance with some embodiments of the technology described herein.

As shown in FIG. 3, the optimization problem 300 may be used to determine the actuation signals $x_k$ by minimizing (exactly or approximately) the cost function g ($e_1$, . . . , $e_N$), subject to the listed constraints, which include upper bounds $u_k$ and lower bounds $l_k$ on the actuation signals. Such constraints would be enforced element-wise. In the optimization problem 300, the functions $f_k$( . . . ), k=1, . . . , N, represent the mapping from the actuation signals $x_k$ to the view error signals $e_k$, such as the view error signals shown in FIG. 2. In this sense, the functions $f_k$( . . . ) generally incorporate, for example, (1) the implicit mappings from the actuation signals $x_k$ to the display views $d_k$; (2) the values of the desired scene views $s_k$; and (3) the blurring transformations and differencing functions shown in FIG. 2.

Figure 4:
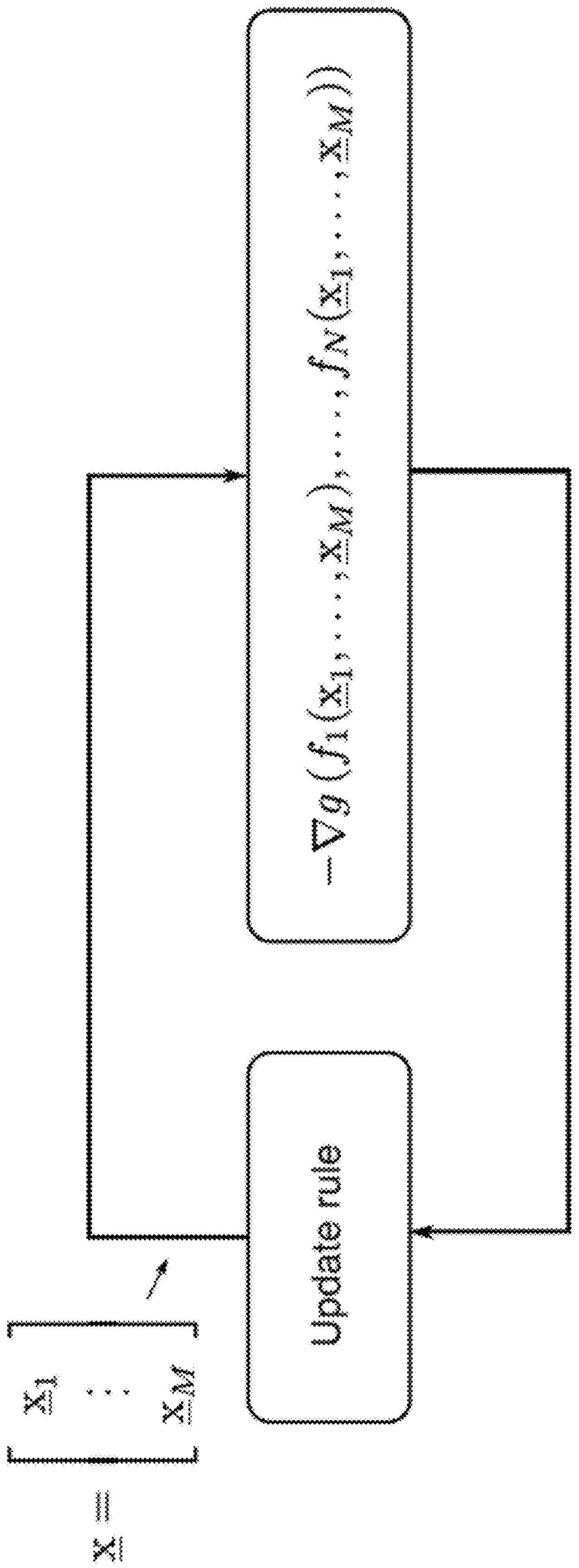
FIG. 4 illustrates aspects of a gradient descent technique for generating one or more solutions to the optimization problem shown in FIG. 3, in accordance with some embodiments of the technology described herein.

In some embodiments, the optimization problem 300 may be solved using an iterative gradient-based technique to obtain the actuation signals $x_k$, as is depicted schematically in FIG. 4. As illustrated, the gradient technique comprises using a gradient of the functions $f_k$( . . . ) to iteratively update values of the actuation signals using an update rule.

Figure 5:
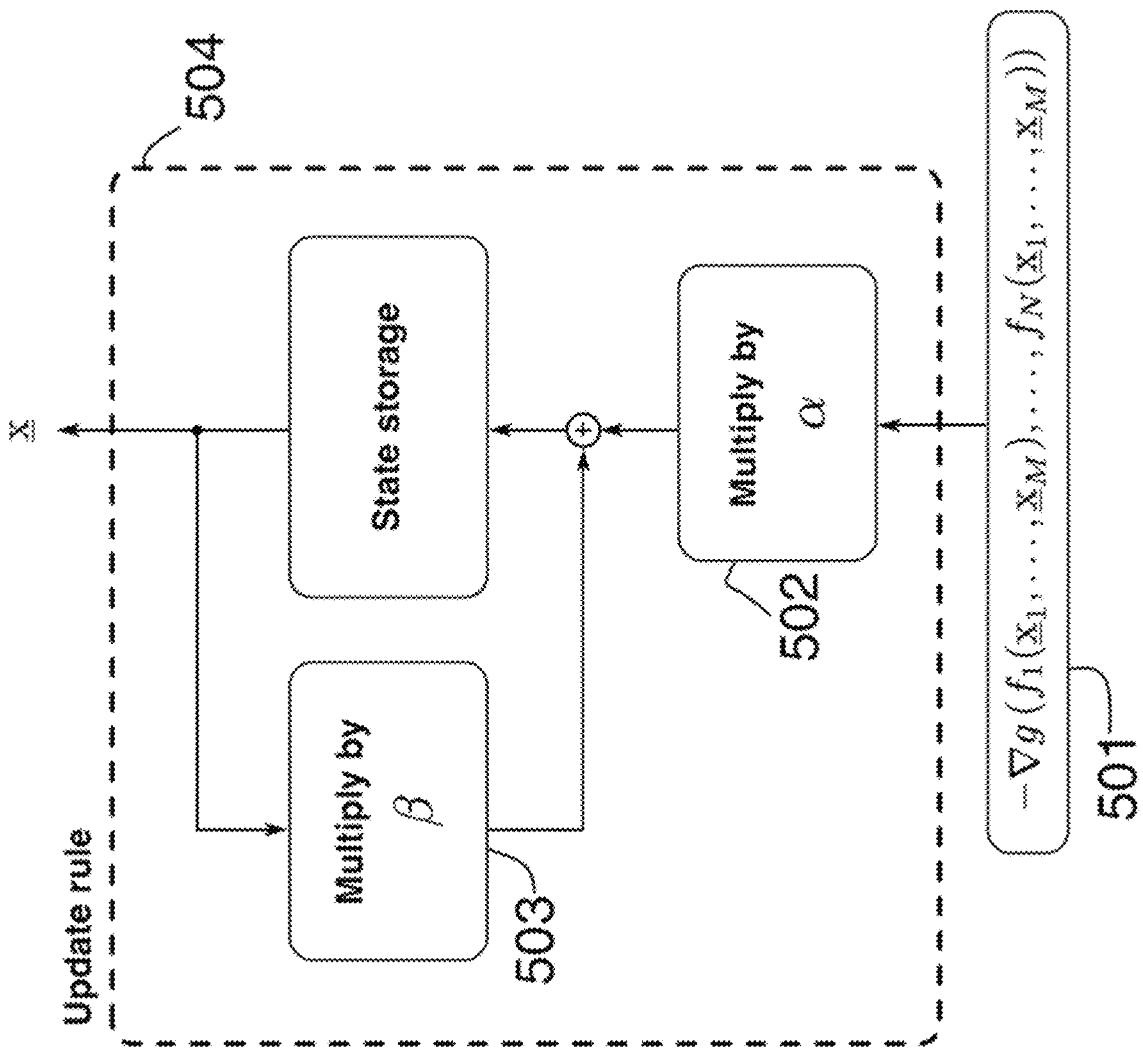
FIG. 5 illustrates an example of an update rule that may be used for generating one or more solutions to the optimization problem shown in FIG. 3, in accordance with some embodiments of the technology described herein.

FIG. 5 illustrates an example of an update rule 504 that may be used as part of the gradient-based technique of FIG. 4 in some embodiments. The upper and lower bounds $u_k$ and $l_k$ shown in FIG. 3, which constrain the actuation signals $x_k$, may be enforced by the update rule 504 by beginning with a set of variables $x_k$ 501 that are known to meet the constraints, and dynamically selecting values α 502 and β 503 that result in a state evolution always satisfying these constraints.

Figure 6:
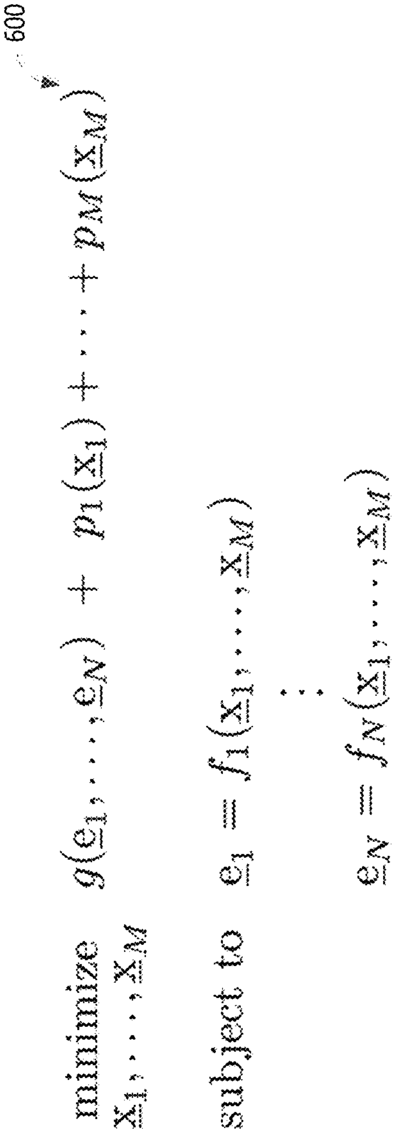
FIG. 6 shows another example of an optimization problem that may be solved as part of generating actuation signals for controlling a multi-view display and/or as part of generating patterns for printing on one or more layers of a light field print, in accordance with some embodiments of the technology described herein.

FIG. 6 shows another optimization problem 600 that may solved as part of generating actuation signals for controlling a multi-view display and/or as part of generating patterns for printing on one or more layers of a light field print, in accordance with some embodiments of the technology described herein. The optimization problem 600 may be obtained by replacing the upper and lower bounds in the optimization problem 300 by penalty terms in the cost function. The penalty terms would be selected so that the constraints are met as the state evolves or as the system reaches steady-state. In the illustrative optimization problem 600, the penalty terms are the penalty functions $p_k$ ($x_k$).

Figure 7:
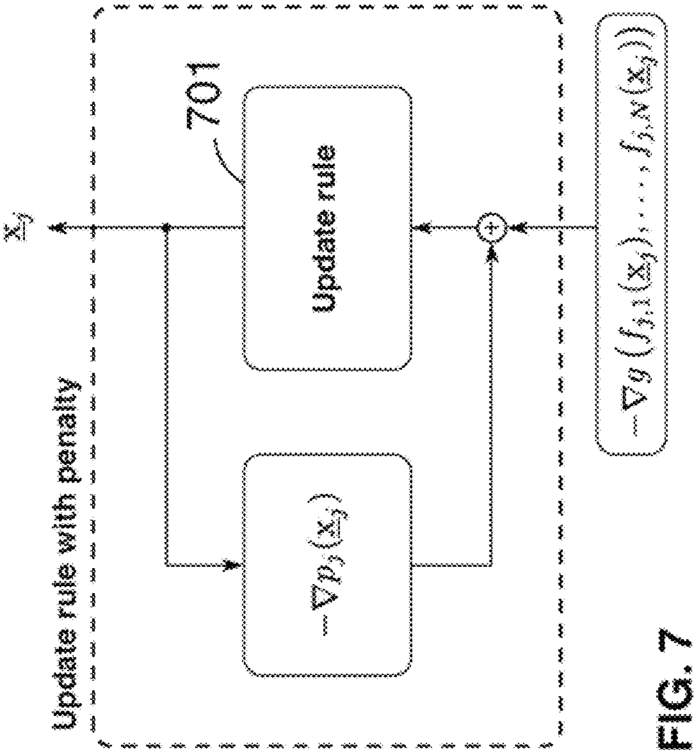
FIG. 7 illustrates aspects of a gradient descent technique for generating one or more solutions to the optimization problem shown in FIG. 6, in accordance with some embodiments of the technology described herein.

In some embodiments, the optimization problem 600 may be solved by a gradient-based iterative technique illustrated in FIG. 7. As shown in FIG. 7, this technique makes use of an update rule 701 and incorporates a gradient of the penalty term. The update rule 701 may be any suitable update rule and, for example, may be the update rule 504 shown in FIG. 5.

Still referring to FIG. 7, the following defines our notation for the functions $f_{j,k}$( . . . ):

$$f_{j,k}(x_j) = f_k( \ldots , x_j, \ldots ).$$

Accordingly, each $f_{j,k}$( . . . ) is defined as being that function obtained by beginning with $f_k$( . . . ) and holding all but the argument in position j fixed. The particular fixed values of those variables not in position j would retain the previously-defined values of those variables, as defined elsewhere within the global problem scope. This definition is used without loss of generality and facilitates discussion in the following section.

In some embodiments, the processing required for determining values of actuation signals by solving one or more optimization problems (e.g., by finding an exact or an approximate solution) may be performed in a distributed manner by multiple computing devices. Discussed below are techniques, developed by the inventors, in which the optimization algorithms developed by the inventors may be distributed, in some embodiments. The topology of the distributed hardware and software is implied by these descriptions.

In some embodiments, an optimization problem (e.g., such as optimization problems 300 and 600) may be "partitioned" (that is, a technique for solving the optimization problem may be designed in a way that facilitates its implementation in a distributed environment) by holding a subset of the actuation signals $x_k$ constant and performing some number of iterations to optimizing the values of remaining subset of actuation signals. After this point, a different subset of the actuation signals $x_k$ may be selected, and the process would be repeated until desired values for the actuation signals are obtained.

Figures 8, 9:
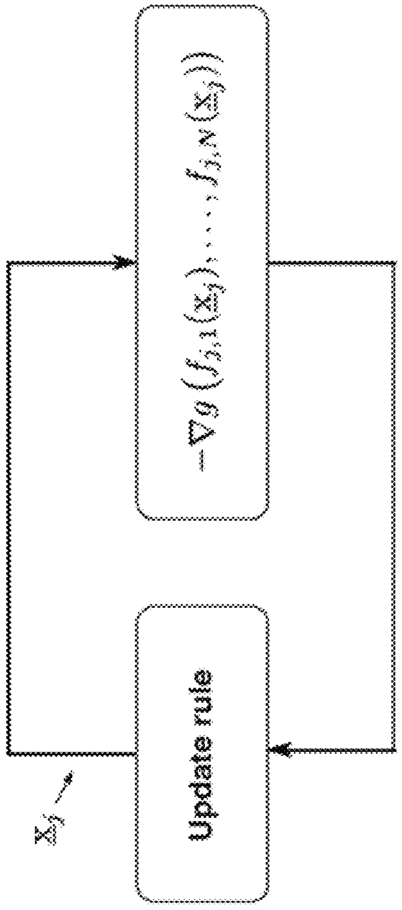
FIG. 8 shows another example of an optimization problem that may be solved as part of generating actuation signals for controlling a multi-view display and/or as part of generating patterns for printing on one or more layers of a light field print, in accordance with some embodiments of the technology described herein.
FIG. 9 illustrates aspects of a gradient descent technique for generating one or more solutions to the optimization problem shown in FIG. 8, in accordance with some embodiments of the technology described herein.

FIG. 8 illustrates an optimization problem 800 formulated so as to facilitate the distribution implementation of a gradient-based iterative optimization technique for solving the optimization problem 300. In some embodiments, a solution (exact or approximate-finding the global or a local minimum) of the optimization problem 300 may be obtained by sequentially updating each of the actuation signals as shown in Table 1.

TABLE 1

| Iterative technique for identifying a solution to optimization problem 300. |
|---|
| 1. Choose j = 1. |
| 2. Select initial values $x_j$ consistent with the upper and lower constraints listed in FIG. 3. |
| 3. Find a global or local minimum of the optimization problem listed in FIG. 8 using any of the techniques described herein, or compute a finite number of iteration steps toward an acceptable solution. The obtained value of $x_j$ would be used implicitly by all other functions $f_{j,k}(x_j)$ until the value of $x_j$ is otherwise re-defined. |
| 4. Choose the next integer value of j between 1 and M, returning eventually from M to 1. |
| 5. Go to step 3. |

An iterative gradient-based optimization algorithm that could be used, in some embodiments, to finding a local or global minimum of the optimization problem 800 shown in FIG. 8, or alternatively that could be used in taking a finite number of iteration steps toward such a solution, is depicted schematically in FIG. 9.

Figure 10:
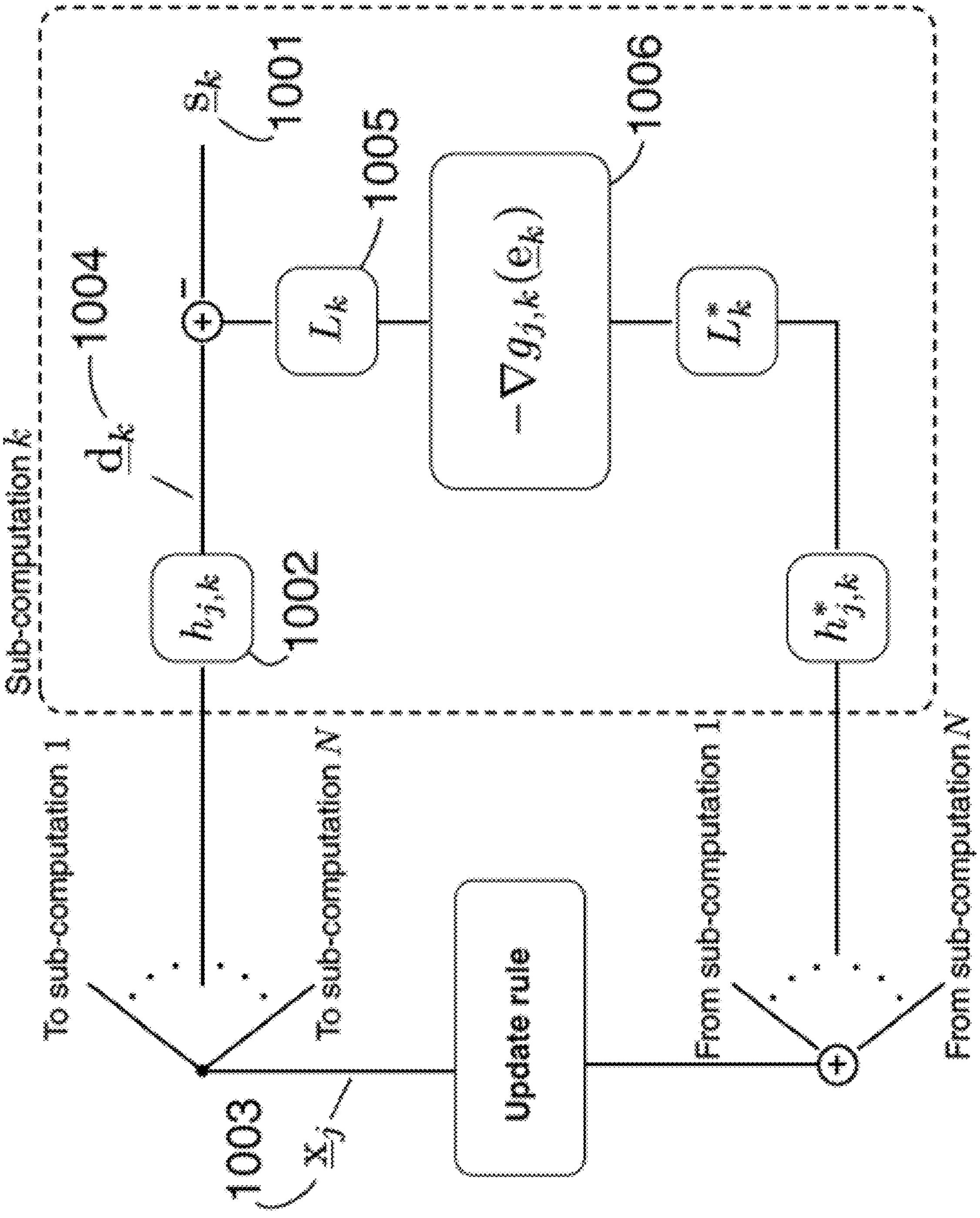
FIG. 10 illustrates aspects of another technique that may be used to generate one or more solutions to the optimization problem shown in FIG. 8, in accordance with some embodiments of the technology described herein.

In some embodiments, to further partition and distribute computation, additional mathematical structure in the formulation of the optimization problem 800 may be utilized. For example, with reference to FIG. 8, selecting the functions $f_{j,k}(x_j)$ as $$f_{j,k}(x_j) = L_k(h_{j,k}(x_j) - s_k),$$

with each function $h_{j,k}(\ldots)$ and $L_k(\ldots)$ being a linear map, would result in the further decomposition of the optimization algorithm, as shown schematically in FIG. 10.

In FIG. 10, a superscript asterisk denotes the adjoint map, which in the case of matrices would reduce to the matrix transpose. Note that in this formulation, the variables $s_k$ 1001 may represent the scene views, the functions $h_{j,k}(\ldots)$ 1002 may represent the mappings from the actuation signals $x_j$ 1003 to the display views $d_k$ 1004, and the functions $L_k(\ldots)$ 1005 may represent the linear maps implementing a blurring transformation (which, in some embodiments, may be realized explicitly as convolution with a blur kernel). Linearity of $h_{j,k}(\ldots)$ and $L_k(\ldots)$, for example, arises naturally in optimizing actuation signals in a multi-layer display consisting of multiplicative layers, wherein the overall mapping from the set of all actuation signals 1003 to the individual display views $d_k$ 1004 is a multi-linear map.

As shown in FIG. 10, the functions $g_{j,k}(e_k)$ (1006) are taken to individually sum to an overall cost term as listed in the optimization problem 800 of FIG. 8, where:

$$g(e_1, \ldots, e_N) = g_{j,1}(e_1) + \ldots + g_{j,N}(e_N).$$

In this sense, the individual functions $g_{j,k}(e_k)$ may be linear or nonlinear penalty functions, whose gradients would be computed as depicted in FIG. 10. It is straightforward to show, for example, that choosing $$g_{j,k}(e_k) = \|e_k\|_\gamma^\gamma$$

would result in an algorithm where a local minimum of $$\|g_{j,k}(e_k)\|_\gamma^\gamma$$

is obtained, with $\|\ldots\|_\gamma$ indicating the y-norm.

In some embodiments, quadratic penalty functions $g_{j,k}(e_k)$ may be employed. When the functions $$g_{j,k}(e_k) = \|e_k\|_\gamma^\gamma$$

are quadratic (e.g., γ=2) and if the intent is to enforce a lower bound on the actuation signals x; corresponding to non-negativity, a multiplicative update rule may be used in some embodiments. On the surface, this appears similar to multiplicative update rules that are sometimes used in solving nonnegative matrix factorization problems. However, the techniques described in such embodiments utilize the more general property of linearity in the functions composing $f_{j,k}(x_j)=L_k(h_{j,k}(x_j)-s_k)$, which corresponds to multi-linearity in the mappings from the ensemble of actuation signals $x_j$ for the ensemble of display layers to error views $e_k$. This is a far less restrictive assumption than is used with weighted or un-weighted nonnegative matrix factorization, and it is specifically useful for formulating algorithms for taking advantage of blurring transformations.

Figure 11:
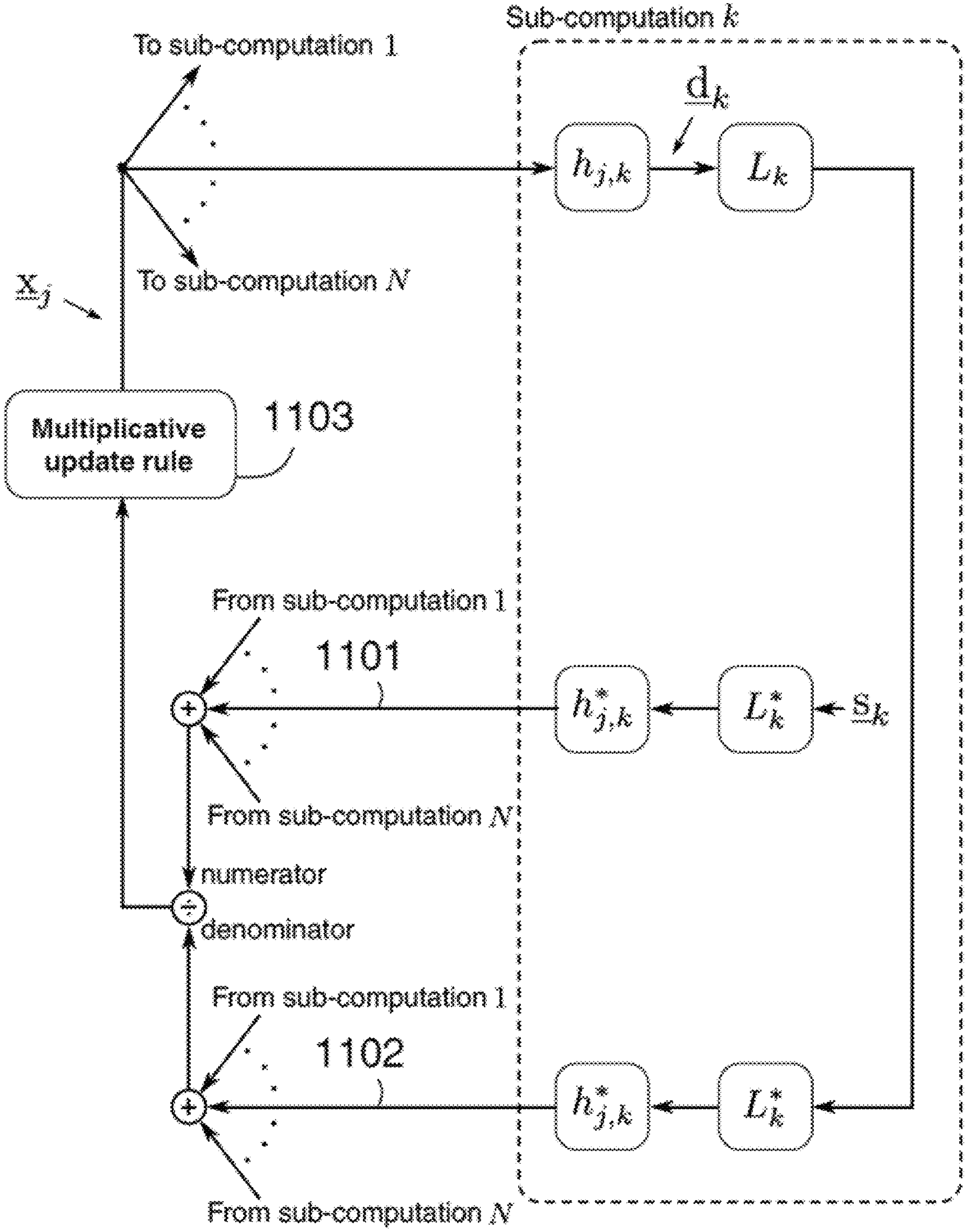
FIG. 11 illustrates aspects of a technique that may be used to generate one or more solutions to the optimization problem shown in FIG. 8 in which a multiplicative update rule enforcing non-negativity of the actuation signals is employed, in accordance with some embodiments of the technology described herein.
Figure 12:
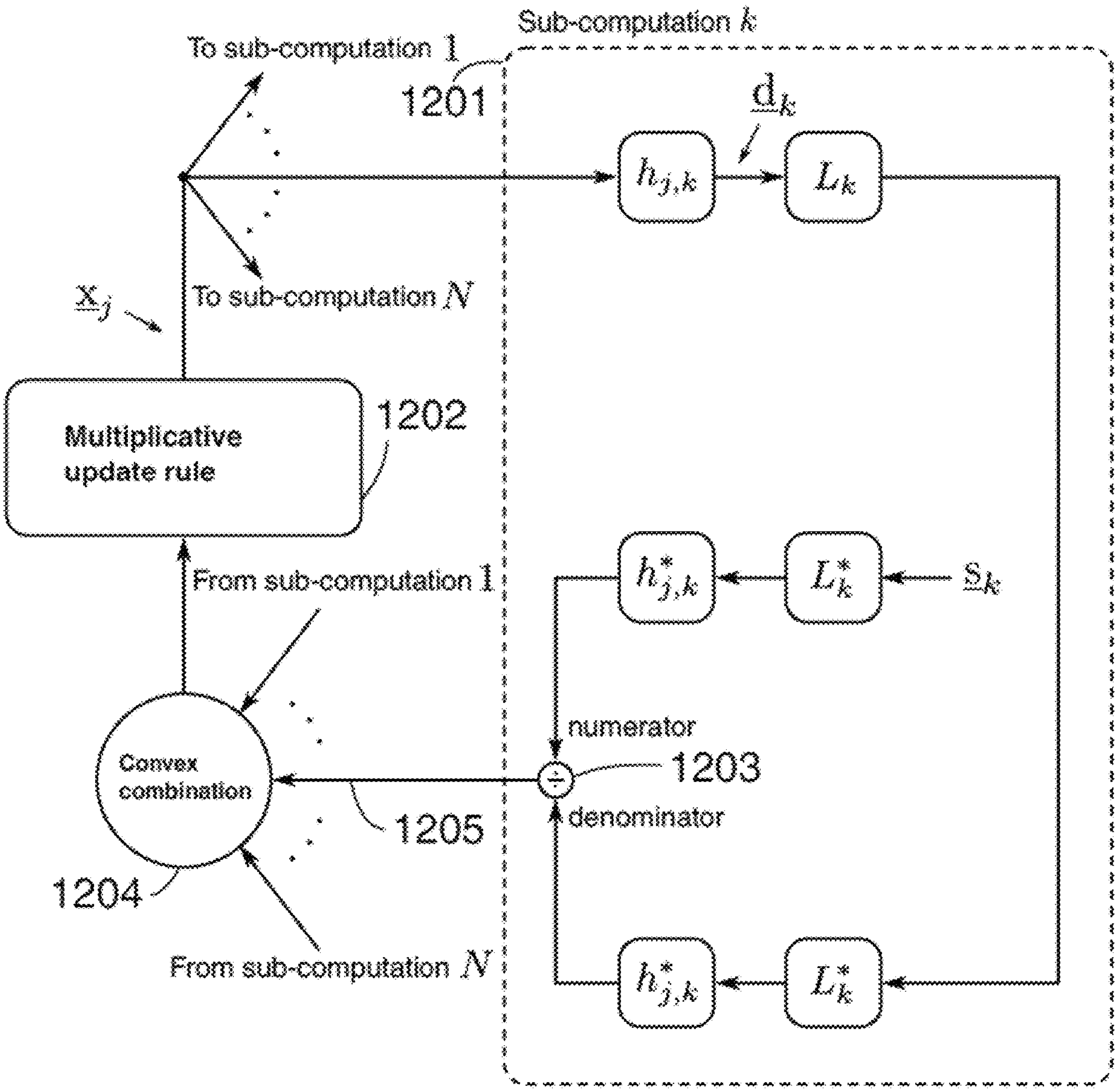
FIG. 12 illustrates aspects of another technique that may be used to generate one or more solutions to the optimization problem shown in FIG. 8 in which a multiplicative update rule enforcing non-negativity of the actuation signals is employed, in accordance with some embodiments of the technology described herein.

FIGS. 11 and 12 illustrate two techniques, which may be used in some embodiments, for finding a local or global minimum (or taking one or more steps toward such a solution) of the optimization problem 800 shown in FIG. 8, utilizing a multiplicative update rule enforcing non-negativity of the actuation signals $x_j$. As shown in FIG. 11, the numerator term 1101 and the denominator 1102 terms resulting from various sub-computations are combined additively and the individual sums are divided. As shown in FIG. 12, in each sub-computation 1201, a division 1203 among various signals is performed first, and a convex combination 1204 of the results of the individual sub-computations 1205 is taken, by way of example and not limitation, corresponding to a weighted average with the weights being nonnegative and summing to 1. A general form of the multiplicative update rules 1103 and 1202 utilized in FIGS. 11 and 12, respectively, is depicted schematically in FIG. 13.

Figure 13:
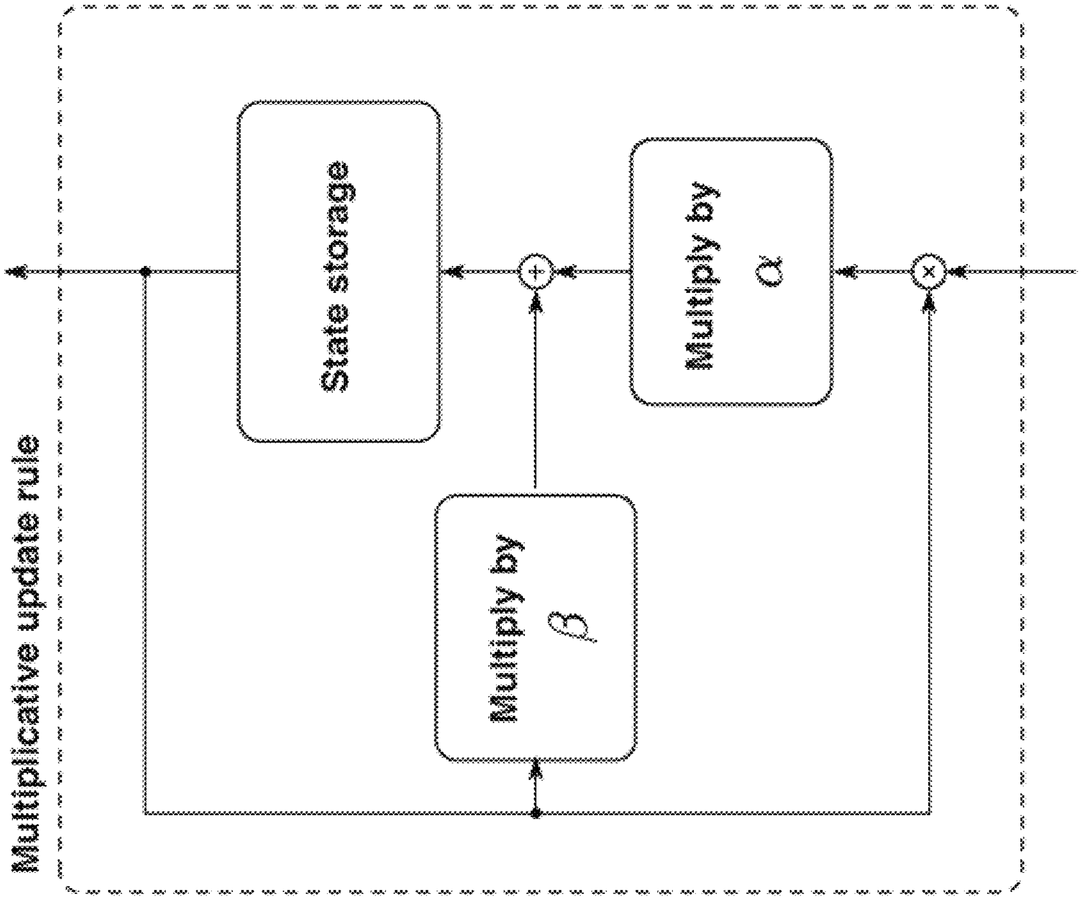
FIG. 13 illustrates a general form of the multiplicative update rule shown in FIGS. 11 and 12, in accordance with some embodiments of the technology described herein.

Additional aspects of the FIGS. 2-13 may be appreciated through the following further explanation of certain diagram notations used therein. Arrows may represent the direction of signal flow with time. Signal flow may correspond to the synchronous or asynchronous passing of variables, which may generally take scalar values, or vector values denoting for example the flow of image data or collections of image data. The circled ÷ symbol indicates generally vector addition or subtraction of input signals (e.g., as shown in FIG. 2). For any inputs to a circled + symbol having negative signs written at the input, these input signals are negated. After possible negation, all signals are summed to form the output signal. A dot on a signal line indicates signal duplication (e.g., as indicated after the output of "State storage" in FIG. 5). The symbol ∇ denotes the gradient of a function (e.g., in FIG. 10 the square block that contains this symbol refers to applying the negative of the gradient of the functional $g_{j,k}(\ldots)$ to the signal $e_k$, which is the input to that block). In FIGS. 11 and 12, the circled ÷ symbol indicates element-wise division of generally vector-valued signals and the boxed symbols indicate application of the labeled linear map to the associated input signal. In FIG. 13, the circled X symbol indicates element-wise multiplication of generally vector-valued signals.

Table 2 illustrates pseudo-code that describes aspects of an iterative gradient-based optimization technique may be used to obtain a local or a global solution to an optimization problem in order to generate values for actuation signals, in accordance with some embodiments.

TABLE 2

| Pseudo-code describing aspects of an iterative gradient-based optimization technique for generating actuation signals, in accordance with some embodiments. |
|---|
| 0. (Initialize) |

We denote the vector of actuation signals for a first layer as $x_1$ and the vector of actuation signals for a second layer as $x_2$. Each set of actuation signals has a corresponding lower bound vector $l_i$ and upper bound vector $u_i$. Perform the following initialization:

a. Initialize the elements of $x_1$ to a value greater than 0 for which $l_1 \leq x_1 \leq u_1$.
b. Initialize the elements of $x_2$ to a value greater than 0 for which $l_2 \leq x_2 \leq u_2$.

1. (Compute gradient step for a first layer)

For each view image, indexed k = 1, . . . , N:

a. Compute view k of current display state, denoted $d_k$. The view of the display state $d_k$ will generally depend on the actuation signals $x_1$ and $x_2$.
b. Compute corresponding view k of scene, denoted $s_k$.
c. Compute error view as $e_k = BL_s(s_k) - BL_d(d_k)$. The functions $BL_s$ and $BL_d$ are band-limiting transformations as discussed above.
d. Compute the gradient step contribution $q_k^{(1)}$ due to view kas:
$q_k^{(1)} = \alpha\,[PROJ^{(k)}_{v_k \to x_1}(BL^*_d(e_k))] * [PROJ^{(k)}_{x_2 \to x_1}(x_2)]$.
Referring to this equation:
(1) $PROJ^{(k)}_{x_2 \to x_1}(x_2)$ denotes the perspective projection of $x_2$ from the coordinate system of a second layer to the coordinate system of a first layer, with the camera center for the projection being the location of viewpoint k.
(2) $BL^*_d$ denotes the adjoint operator corresponding to the band-limiting transform $BL_d$.
(3) $PROJ^{(k)}_{v_k \to x_1}(BL^*_d(e_k))$ denotes the perspective projection of $BL^*_d(e_k)$ from the coordinate system of error view k to the coordinate system of a first layer, with the camera center for the projection being located at viewpoint k.
(4) The symbol * denotes element-wise multiplication.
(5) The variable α denotes the step size.

2. (Update actuation signals for a first layer)

a. Perform the following assignment:

$$x_1 := x_1 + \sum_{k=1}^{N} q_k^{(1)}$$

b. Enforce equality constraints, hard-limiting $x_1$ to fall in the range $l_1 \leq x_1 \leq u_1$.

3. (First layer loop) Go to step 1, and loop some finite number of times.
4. (Compute gradients for a second layer)

For each view image, indexed k = 1, . . . , N:

e. Compute view k of current display state, denoted $d_k$. The view of the display state $d_k$ will generally depend on the actuation signals $x_1$ and $x_2$.
f. Compute corresponding view k of scene, denoted $s_k$.
g. Compute error view as $e_k = BL_s(s_k) - BL_d(d_k)$. The functions $BL_s$ and $BL_d$ are band-limiting transformations as discussed above.
h. Compute the gradient step contribution $q_k^{(2)}$ due to view kas:
$q_k^{(2)} = \alpha\,[PROJ^{(k)}_{v_k \to x_2}(BL^*_d(e_k))] * [PROJ^{(k)}_{x_1 \to x_2}(x_2)]$.
Referring to this equation:
(1) $PROJ^{(k)}_{x_1 \to x_2}(x_1)$ denotes the perspective projection of $x_1$ from the coordinate system of a first layer to the coordinate system of a second layer, with the camera center for the projection being the location of viewpoint k.
(2) $BL^*_d$ denotes the adjoint operator corresponding to the band-limiting transform $BL_d$.
(3) $PROJ^{(k)}_{v_k \to x_2}(BL^*_d(e_k))$ denotes the perspective projection of $BL^*_d(e_k)$ from the coordinate system of error view k to the coordinate system of a second layer, with the camera center for the projection being located at viewpoint k.
(4) The symbol * denotes element-wise multiplication.
(5) The variable α denotes the step size.

TABLE 2-continued

| Pseudo-code describing aspects of an iterative gradient-based optimization technique for generating actuation signals, in accordance with some embodiments. |
|---|
| 5. (Update actuation signals for a second layer) |
| a. Perform the following assignment: |
| $$x_2 := x_2 + \sum_{k=1}^{N} q_k^{(2)}$$ |
| b. Enforce equality constraints, hard-limiting $x_2$ to fall in the range $l_2 \leq x_2 \leq u_2$. |
| 6. (Second layer loop) Go to step 4, and loop some finite number of times. |
| 7. (Overall loop) Go to step 1, and loop the overall iteration some finite number of times until completion. |

Figure 14:
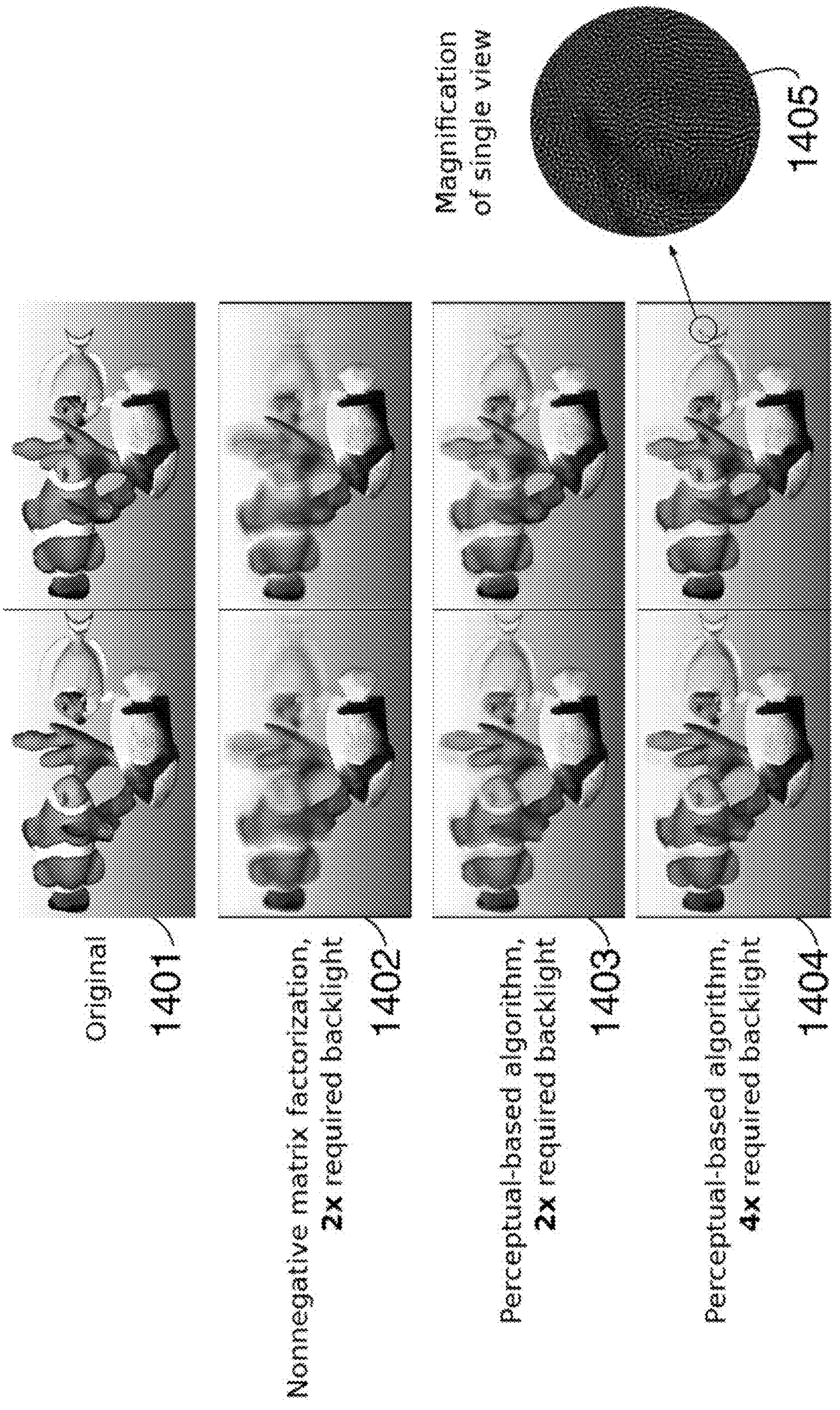
FIG. 14 illustrates simulated views generated by a multi-view display in accordance with some embodiments of the technology described herein.

FIG. 14 illustrates simulated views generated by a multi-view display in accordance with some embodiments of the technology described herein. Images 1401 show two views of a multi-view light field image comprising 15 views, which 15 views are specified as the input to all compared methods. Images 1402 show the results from running methods previously known to those skilled in the art which utilize nonnegative matrix factorization (NMF), or methods that reduce to NMF in the case of two layers. Images 1403 and 1404 show the performance achieved by some using techniques described herein, which utilize a perceptually-inspired cost function taking advantage of finite view bandwidth. Shown in 1403 and 1404 are simulations of two extreme views along the horizontal parallax direction of a 3×5 (15 view) light field with 10 degree horizontal FOV, presented on a simulated 47 cm×30 cm, two-layer display with a layer separation of 1.44 cm, at a viewer distance of 237 cm. Images 1403 and 1404 compare the performance of one embodiment of the disclosed methods as the scene brightness is varied. Light field data and display configuration were obtained from [G. Wetzstein. Synthetic Light Field Archive. http://web.media.mit.edu/~gordonw/SyntheticLightFields/. Accessed Aug. 12, 2015.]. For each approach 1402-1404, the required increase in display backlight brightness is listed, indicating that a large increase in backlight efficiency can be achieved as compared to a traditional barrier-based parallax display. Note that all presented results show performance for single-frame, non-time-multiplexed displays, in contrast to time multiplexed work that has been previously demonstrated. Depicted results are filtered to simulate observation by the human visual system, excluding magnified detail view 1405.

Figure 15:
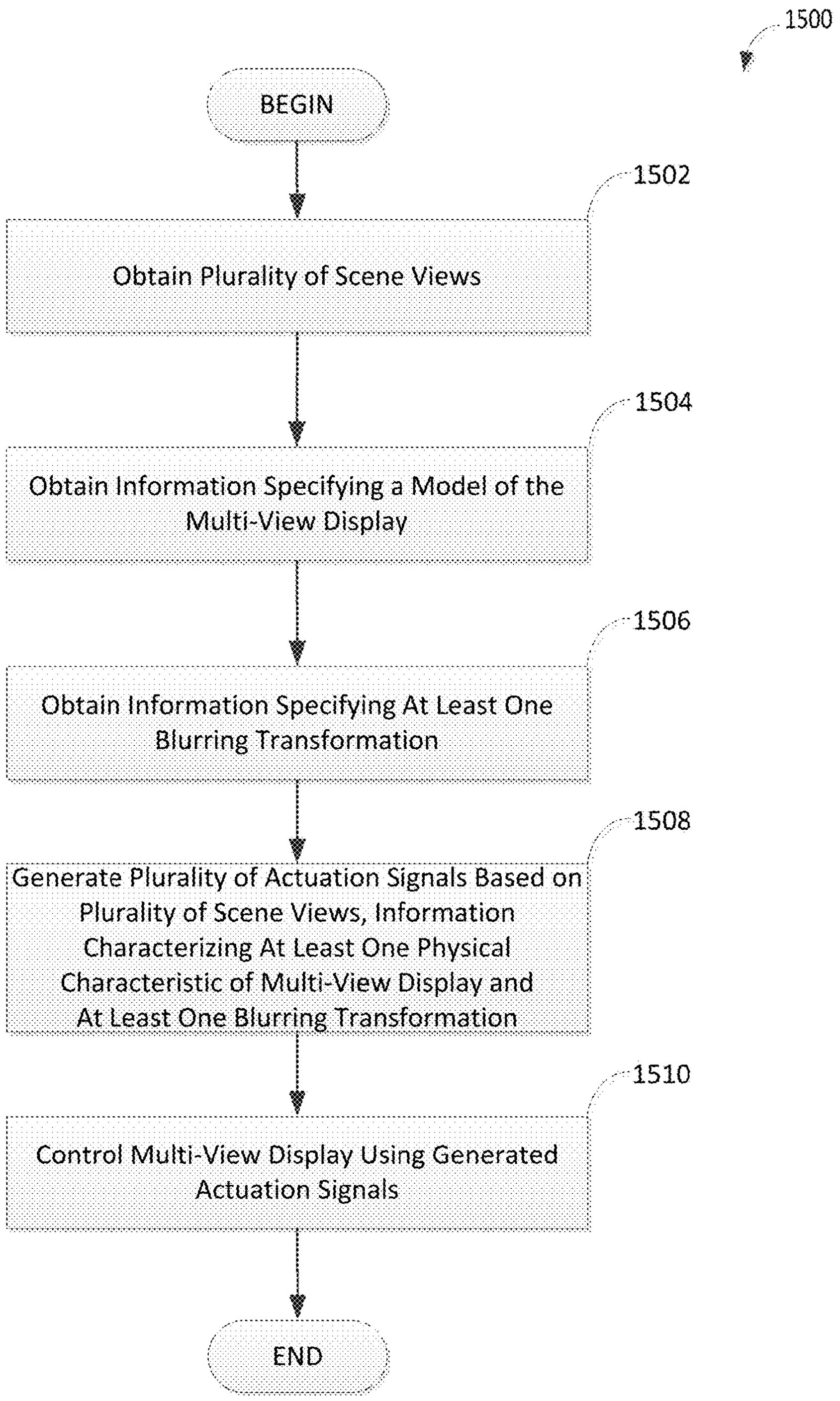
FIG. 15 is a flowchart of an illustrative process 1500 for generating actuation signals to control optical behavior of a multi-view display apparatus in accordance with some embodiments of the technology described herein.

FIG. 15 is a flowchart of an illustrative process 1500 for generating actuation signals to control optical behavior of a multi-view display apparatus in accordance with some embodiments of the technology described herein. Process 1500 may be performed by any suitable device(s). For example, process 1500 may be performed by one or computing device(s) coupled to and/or part of the multi-view display. For example, process 1500 may be performed by computing device(s) 104 described with reference to FIG. 1A.

Process 1500 begins at act 1502, where a plurality of scene views may be obtained. Each of the plurality of scene views may correspond to a location of a viewer of the multi-view display. The scene views may specify a desired light field to be generated by the multi-view display. As described herein, the scene views may be of a natural or a synthetic scene. Each scene view may comprise a grayscale and/or a color image of any suitable resolution for each of one or more (e.g., all) of the scene views. Any suitable number of scene views may be obtained at act 1502 (e.g., at least two, at least ten, at least fifty, at least 100, at least 500, between 2 and 1000, between 10 and 800, or in any other suitable combination of these ranges), as aspects of the technology provided herein are not limited in this respect.

In some embodiments, the scene views may be obtained by accessing and/or receiving one or more images from at least one image source (e.g., accessing stored images, receiving images from another application program or remote computing device). In some embodiments, the scene views may be obtained by first obtaining a description of a 3D scene (e.g., a 3D model of a scene) and then generating, as part of process 1500, the scene views based on the obtained description of the 3D scene.

Next, process 1500 proceeds to act 1504, where information specifying a model of the multi-view display may be obtained. This information may include any information about any physical characteristics of the multi-view display apparatus, which may influence the way in which the multi-view display generates images. The information obtained at act 1504 may include, for example, any of information 107 described with reference to FIG. 1A.

In some embodiments, the information obtained at act 1504 may include data specifying physical characteristics of the multi-view display numerically (e.g., using one or more values stored in one or more data structures of any suitable type) such that these data may be used to generate display views based on a set of actuation signals as part of an iterative optimization technique for identifying actuation signals (e.g., as described with reference to FIGS. 2-13). In some embodiments, the information obtained at act 1504 may be encoded in software code. The software code may also be used to generate display views based on a set of actuation signals as part of an iterative optimization technique for identifying actuation signals. In some embodiments, when such software code is executed it may be used to transform parameters (e.g., actuation signals, display views or other images, other variables) based on the physical characteristics embodied in the software code.

Next, process 1500 proceeds to act 1506, where information specifying at least one blurring transformation may be obtained. The information specifying the at least one blurring transformation may specify one or multiple blurring transformations and may include information of any suitable type including, for example, any of information 106 described with reference to FIG. 1A.

Next, process 1500 proceeds to act 1508, where a plurality of actuation signals may be generated based on the plurality of scene views obtained at act 1502, information specifying a model of the multi view display apparatus obtained at act 1504, and information specifying at least one blurring transformation obtained at act 1506. This may be done in any of the ways described herein and, for example, by using an iterative optimization techniques described with reference to FIGS. 2-13.

Next, process 1500 proceeds to act 1510, where the actuation signals generated at act 1508 may be used to control the multi-view display. This may be done in any suitable way. For example, in some embodiments, the generated actuation signals may be provided to electro-optical interface circuitry (e.g., circuitry 109 described with reference to FIG. 1A), and the electro-optical interface circuitry may drive the multi-view display based on the provided actuation signals. After act 1510, process 1500 completes.

It should be appreciated that the techniques described herein that use blurring transformations may be used in applications where the blurring transformation(s) do not relate to a perceptual effect (e.g., that of the human visual system) but rather relate to some band-limited effect in the medium receiving the light or other electromagnetic wave output from the display. In such applications, the light or electromagnetic wave emitted from the display might not typically be designed for consumption by a human eye, but rather by another physical medium or biological tissue. Non-limiting examples of such applications include:

- The use of band-limitedness in optimized displays for photolithography and stereolithography in 3D printing (e.g., where an optimized display may be used for emitting into a photosensitive resin). Here the band-limitedness would embody the lower limit on resolvable dot size in the resin.
- The use of band-limitedness in optimized displays for photographically exposing two-dimensional materials (e.g., used in a photogenic printing process or other photographic printing device). Here the band-limitedness would embody the lower limit on the resolvable dot size on the photographic medium.
- The use of band-limitedness in optimized displays for radiating biological tissue using light or other energy electromagnetic waves. The band-limitedness may embody the minimum volume of tissue that can independently be affected by radiation due to thermal or other effects.

V. Further Descriptions of Multi-View Display Arrangements

The techniques for generating actuation signals for controlling multi-view displays may be used with numerous types of multi-view 3D displays described herein. The following includes a description of some types of multi-view 3D displays developed by the inventors, and related techniques. Some of these 3D displays may have favorable characteristics for synthesizing light fields in accordance with some of the optimization techniques described herein including, for example, any of the techniques described with reference to FIGS. 1-15.

The goal of an optimized light field display is essentially to exploit redundancy caused by both the structure of the data to be displayed and external factors including the response of the human visual system and display optics, in order to represent light field images optically for a human observer. When considered through simple linear analysis such systems seem, at first glance, to violate simple counting arguments-in the case of light field synthesis the display appears to create more independent rays than there are independent image elements.

In fact, such displays produce an output with the same number of degrees of freedom as the display hardware. The bandwidth or algebraic rank of the output will be limited by the degrees of freedom of the display hardware. Another way to see this is by observing that the number of free parameters in the display system scales with the number of image elements, but the parameter space of the display system can be large when a suitable non-linear mapping between pixel states (or equivalently the actuation signals driving the pixel states) and output light ray intensities is created. This insight gives us a new means for identifying display systems that will be amenable to driving with optimization. Systems with this property may be referred to as parametric display systems.

Figure 16B:
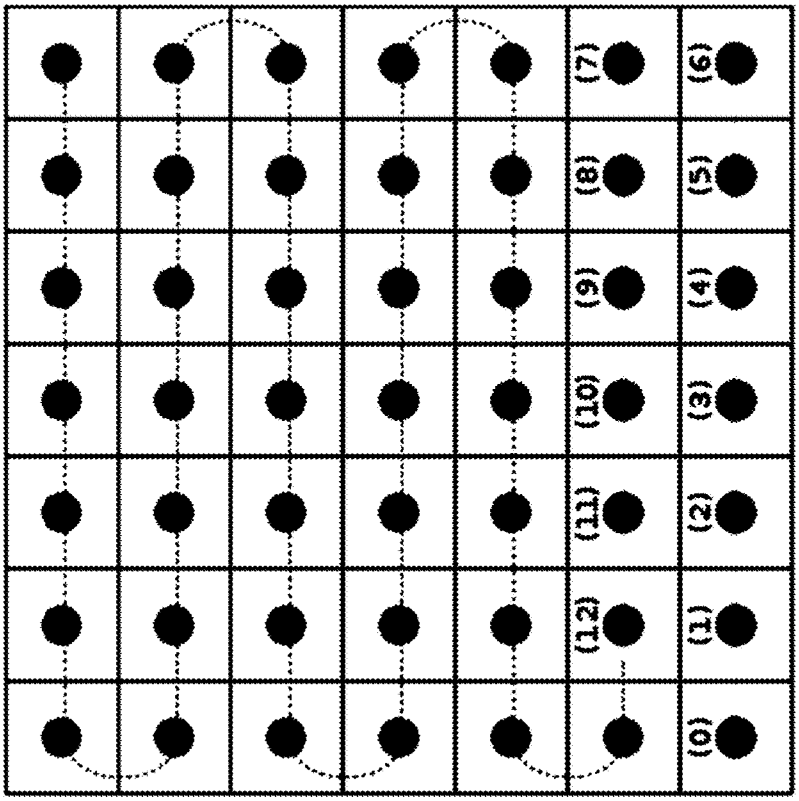
FIGS. 16A and 16B illustrate pixel orderings in a display system respectively with and without a non-linear mapping between pixel indices and the locations of the associated output light ray intensities, in accordance with some embodiments of the technology described herein.
Figure 16A:
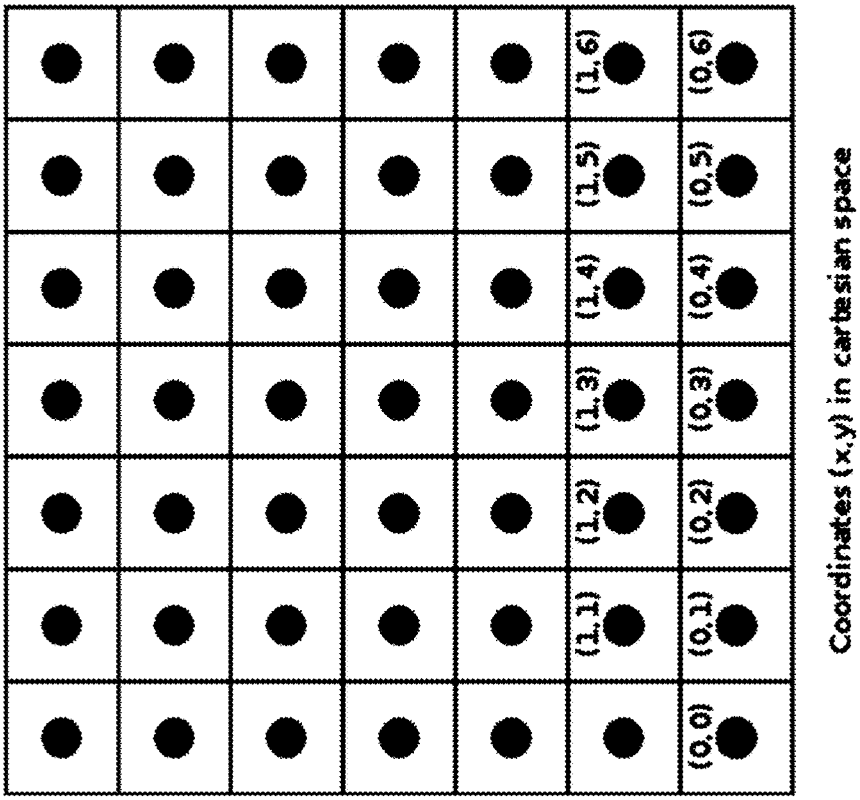

This insight is further illustrated in FIGS. 16A and 16B, which represent means of addressing a linear space. In the depicted schematic, boxes may represent pixels on a screen, light rays in a light field, or other abstract addressable quantities. FIG. 16A shows a direct addressing scheme wherein boxes are addressed by a Cartesian coordinate. In this addressing scheme the number of parameters required to address the space is equal to the number of dimensions of the space. FIG. 16B shows an indirect, or parameterized addressing scheme wherein a nonlinear function C(t) is used to address boxes. In this addressing scheme the number of parameters required to address the space is fewer than the number of dimensions of the space. This advantageous situation motivates some embodiments of the technology described herein.

An important benefit of optimized light field displays is that the available degrees of freedom may more flexibly be used to represent a desired light field under varying viewing conditions and tailored to specific display hardware and scene content. However, the benefits of optimized light field displays may be best realized when there exists a 1-to-many mapping between image element states and output ray states. Displays that constrain image element states in a 1-to-1 relationship with ray states impose a preconceived and unvarying mapping between image elements and output rays, which cannot be adapted to varying scenes and viewing conditions. This leads to low resolution representations of light fields, and in some cases the loss of image brightness. We call this 1-to-many mapping entanglement of the image element states and ray states. It should also be appreciated that a nonlinear mathematical mapping between pixel states and ray space can exist even in the case of linear optical interactions. Nonlinear optics provide a means of creating nonlinear interaction, but not an exclusive means.

As described herein, an optimized light field display may be any display that generates content obtained by solving at least one optimization problem (e.g., using an iterative optimization algorithm or any other type of optimization algorithm). In some embodiments, when an image is desired from the display, an optimization problem may be posed, given the current state of the display, current state of the viewer, and current knowledge of the desired display appearance, which optimization problem, when solved either explicitly or implicitly, by a computer or other means, will result in a display state that causes the display to output an image, which image may be an optimal approximation of the desired display appearance. In this case an image is often a 4D light field, but does not have to be. (The desired output image can be a 3D light field, 2D image, 5D light field, vision correcting light field, accommodation cue light field, or many other desired display functions).

Optimized displays may employ the real-time or on-line content-based optimization techniques described herein. For pre-recorded images that will be viewed under predictable circumstances, it is possible for the optimization problem to be posed in advance, and the solution to the optimization problem may be generated (e.g., computing by solving the optimization problem using an iterative gradient-based or other optimization algorithm) and stored for later retrieval and display. Because the output of such displays is also the result of an optimization algorithm we consider displays that function in this way to be optimized displays. In contrast, many lay-people use the term "optimized" to mean "tuned" or "adjusted" by some human-in-the-loop or open-loop method. For example, a technician might be said to "optimize" the gamma value of a television display for a customer, when in practice the technician is adjusting a parameter in a predetermined gamma correction software module to a value referenced in a service manual. This does not mean that the television is an optimized display in the sense of the way in which this term is used herein, because there is no optimization problem is solved to produce the output of the television. As another example, a display manufacturer might solve a formal optimization problem to determine the values of a color lookup table, or even the parameters of an algorithm, both for the purpose of converting a 96-bit high-dynamic-range (HDR) image to a 16-bit HDR image to be shown on a HDR display. Such an HDR is not an optimized display in the sense of the way in which this term is used herein, because the output of the display is not itself determined through formal optimization, even though an optimization technique was used to tune a function of the display.

One compelling reason to use an optimized display, from a hardware design perspective, is that the display gains flexibility of form and function with respect to traditional, fixed pipeline designs. Accordingly, in some embodiments, an optimized display may be treated as a system with a number of degrees of freedom, wherein the degrees of freedom can be applied, through optimization methods, to create synthetic light fields with desired properties, such as high spatio-angular resolution, wide field of view, high display brightness, high temporal refresh rate, and good perceptual image quality (or fidelity). Moreover, a display driven by real-time optimization can adapt to changing viewing conditions as said viewing conditions change. Non-limiting examples of conditions to which the display may wish to adapt includes viewer position, ambient light intensity, ambient light direction, number of viewers changing display content (such as a real-time light field video stream), defects of the viewer's visual system, device power consumption requirements, device orientation, and viewer eye spacing.

How various factors in combination influence the quality of the image shown on an optimized display is complex to predict. Another of the key benefits of optimized displays described herein is that as desired the factors that influence display quality can be traded-off against one another to maintain a desired level of display quality. Though each type of display hardware will have its own set of factors that influence display quality, the case of an optimized two-layer multiplicative light field display is typical of optimized displays. In the case of the optimized two-layer multiplicative light field display the following factors may influence the displayed image quality for physical light field image[1]: view disparity, layer positioning (e.g., the proximity of a virtual object in the desired scene to the physical location of a display layer), scene brightness (e.g., how bright is the overall scene being displayed as a fraction of the maximum display brightness), computational time (e.g., the time available after rendering a scene to determine the display layer patterns), and available power (e.g., the amount of device power available for computation and backlight).

View disparity may be influenced by the field-of-view of the display (e.g., the viewing cone over which images are intended to be viewed), scene depth (e.g., the amount that objects in the scene extend into the display away from the viewer or out of the display towards the viewer), and depth of field (DOF). The failure of a display to render the correct view disparity in physical scenes manifests as a spatial blur that occurs in regions of the scene that extend far from the plane of the screen. This is known as DOF as the effect mimics the effect of the same name in camera systems. Though all automultiscopic displays have some degree of DOF, optimized displays in accordance with some embodiments of the technology described here may achieve better DOF for a given operating point than conventional displays. Rendering views with a closer angular spacing is one way to increase the perceived quality of the DOF blur.

Following below are some illustrative and non-limiting examples of how an optimized display, implemented in accordance with the some embodiments of the technology described herein, may be configured to dynamically trade between different features to support changing viewing conditions. In these examples it is typically assumed that the display has information about the location of viewers in front of the display, which can comprise head location information and eye location information. In some embodiments, such tracking information may be obtained through a standard camera system, a stereo camera system, a multi-view camera system, or a depth camera system.

In one example, a user may take her device from a darkly lit room into a daylight environment. In some embodiments, the optimized display in the device may begin to operate closer to its maximum achievable brightness in order to compete with the environmental lighting. As a result, the degree of 3D pop-out may decreases slightly, and the displayed image may exhibit some additional artifacts.

In another example, a first user may be viewing an immersive light field movie on a tablet device with an optimized light field display implemented in accordance with some embodiments. A second user may sits down next to the first user to also view the movie. In some embodiments, the display may adapt to provide each viewer with unique, physically correct, views of the light field. In order to achieve the extra degrees of freedom necessary to expand the field of view for both users, the image may become slightly dimmer, the depth in the scene may be compressed, and the image quality may be slightly reduced.

In another example, a user may be viewing stereo content on an optimized light field display implemented in accordance with some embodiments. A second user sits down next to her to also view the movie. In order to conserve degrees of freedom and avoid the need to extrapolate from the provided content, the display may replicate the same stereo views to the eyes of both viewers.

Figure 17:
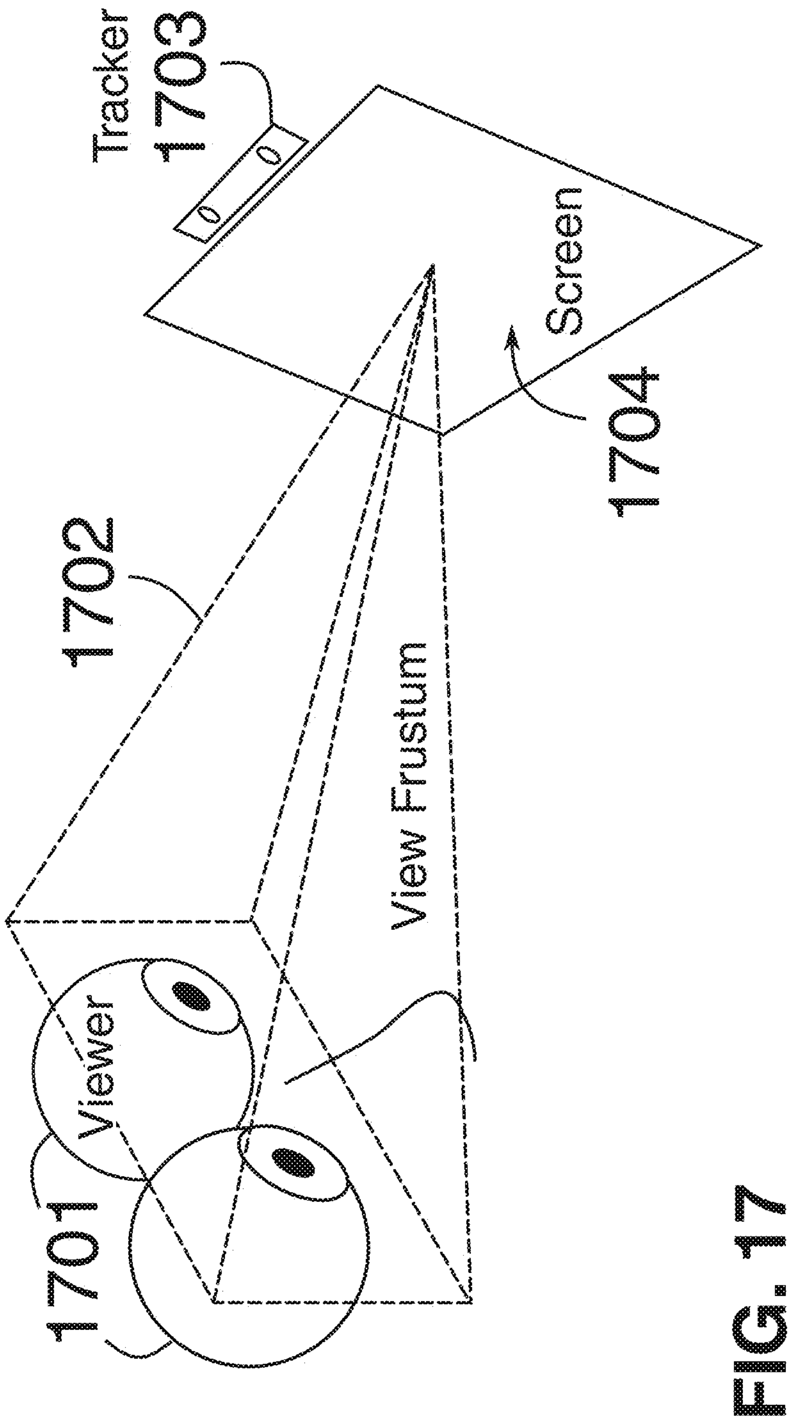
FIG. 17 illustrates a view cone for a viewer observing a multi-view display, in accordance with some embodiments of the technology described herein.

In another example, illustrated in FIG. 17, a viewer 1701 may be observing a multi-view display 1704 implemented in accordance with some embodiments. In the pictured embodiment a single view frustum 1702 (also described as a view cone) denotes the angular region in which viewers may view a 3D scene. In some embodiments of the technology described herein, a tracking device 1703 may be used in order to track viewer 1701, and adjust the view frustum 1702 in accordance with the spatial location of the viewer 1701 in relation to the multi-view display 1704, as measured by the tracker 1703. The view frustum 1702 may be adjusted to enclose both eyes of the viewer 1701. In this way, the

[1] Non-physical light fields, which represent light ray paths inconsistent with physical light propagation, have a related set of quality influencing factors.

display 1704 may measure the eye positions of the viewer and adapt the size and direction the output views to display only those views that are necessary for the content to appear correct for the current viewer. This can be done for multiple viewers. By displaying a view cone 1702 that covers a box just around the viewer's eyes 1701 the degrees of freedom of the display may be conserved for increased display brightness, extended depth-of-field, and other desirable properties available in the above trade-space. The degree to which the display is able to target a viewer's eyes depends on the accuracy and latency of the tracker 1703 employed to track the viewer's eyes. In applications with very low tracker latency and very high tracker accuracy it is also possible to direct separate view cones to each of a viewer's two eyes.

In applications with higher tracker latency or lower tracker accuracy, it may be advantageous to expand the view cone around the viewer's eyes, such that tracker inaccuracy or update time does not produce an observable visual defect. In other words, even if the tracker were off by a small amount, and the viewer moves before the tracker, renderer, and optimizer can update the optimal viewing location of the display, the viewer will still be within a valid, well defined, high-quality viewing zone. If the primary source of inaccuracy is tracker latency, then the viewing cone should be expanded by a small amount in real-world physical units—for example the size of the view cone at the viewer's eye plane should be 2 cm wider than the viewer's eye separation distance. In this situation the source of error (user movement) will not be affected by the distance of the viewer from the display. If the primary source of inaccuracy is tracker noise or misalignment, the view cone should be expanded by a fixed angular increment, such as 1.5 degrees wider than the cone subtended by the viewer's eye box. In this case the source of error is the tracker itself, and the error will be magnified in real-world coordinates as the viewer moves away from the screen.

In another example, a mobile device may include an optimized display implemented in accordance with some embodiments. As the battery reserves of the mobile device are depleted, the display may be configured to conserve power at the expense of brightness and display quality. In some embodiments, the device may dim the backlight, while keeping the display intensity the same at the cost of introducing image artifacts. Alternatively, the device may dim the overall intensity of the screen, or a combination of both. In some embodiments, the device may reduce the amount of processing done to solve the optimization problem, causing the image quality to be reduced, or the device frame rate to be reduced, or the convergence speed of the algorithm to be reduced. The latter approach may be appropriate for content that rarely changes.

In another example, a monitor of a general purpose computer may include an optimized display implemented in accordance with some embodiments. A user may run applications which present content on the display that is primarily flat with small regions that pop-out to accentuate elements of the graphical user interface. In such instances, the display may run in a low-power mode, updating regions of the screen selectively, and using a wide FOV so that the results displayed in the application can be shared among multiple viewers. As the user switches from desktop applications to a game with dynamic graphics requiring larger 3D pop-out effects (larger DOF), the display may narrow the FOV, and may increase the display backlight brightness. This gives the display more degrees of freedom to represent light field content, at the expense of increased power consumption and a personal, single-viewer gaming experience.

In another example, an optimized light field display implemented in accordance with some embodiments may be positioned in a hotel lobby to give patrons a glasses-free 3D map experience. When a single viewer is looking at the map, the experience is a bright, dynamic 3D scene with an impressive amount of 3D pop-out (large DOF). When a second patron approaches the map, the display reduces the amount of 3D pop-out, and becomes dimmer to allow for additional degrees of freedom required to represent multiple view cones. As the display becomes surrounded by viewers it seamlessly falls back to a 2D viewing mode so that everyone can clearly read the information on the screen.

V.A Far-Field Light Field Displays

Some embodiments described herein provide for far-field light field displays. Some embodiments provide for a number of variations of far-field light field displays and are discussed herein.

Display Spatial Resolution

Conventional multi-layer displays are always composed of layers with equal spatial sampling. The inventors have appreciated that this is not a necessary condition for optimized multilayer light field displays. To the contrary, the inventors have identified many reasons to choose layers with different spatial sampling patterns or frequencies. For example, in order to reduce optical Moire interference between the high frequency sampling grids of two layered displays, it may be advantageous, in some embodiments, to place an optical diffuser sheet between the layers. Many of the benefits of choosing different display resolutions may be derived from achieving greater efficiency (e.g., lower rendering costs, reduced power consumption) when confronting optical blur introduced intentionally by diffusers, or unintentionally by diffraction or optical properties of display devices.

In some embodiments, in order to reduce the required strength of the diffuser used to attenuate Moire interference, the display sample spacing may be adjusted to account for perspective projection from an expected viewing location. If the viewer is expected to be distance d from the front layer of the display, and the displays are separated by a distance s, with the pixel spacing of the front display $p_f$, then the pixel spacing of the rear display may be determined as $$p_r = p_f + \frac{p_f s}{d}.$$

This works because moire is effectively the beat frequency between the sampling grids of the different layers as projected into the viewer's eye plane. In some embodiments, modification by the above amount may cause both screens to project to the same spatial frequency at the targeted viewing distance, d. A weaker diffuser may be used to attenuate the resulting Moire pattern for viewing distances close to d, primarily because small differences in spatial frequency at the projected eye plane will result in low frequency Moire patterns, which are less noticeable to human viewers.

Alternatively, in some embodiments, displays with large differences in spatial frequency as projected to the viewer's eye will create high frequency moire, which may be invisible or less visible to the viewer. Moire interference in a multiplicative space such as an attenuation-based multilayer display may lead to new perceived frequencies: the sum and difference of the spatial sampling frequencies of the two panels as projected to the viewer's eye.

There are many possible advantageous configurations of displays having large differences in spatial frequency. In one illustrative embodiment, two panels may be separated by a distance of 3 mm, one with a spatial resolution of 1000 dpi (25.4 micron pixel), and the other with a spatial resolution of 500 dpi (50.8 micron pixel). If a viewer is standing at 60 cm directly in front of the screen, establishing an optical projection through both screens to the viewer's eye, the pixels of the rear screen, projected onto the front screen will be 50.5 micron. This establishes a spatial sampling frequency of 39.4 pixels/mm and 19.8 pixels/mm for the front and back screens, respectively. Moire patterns at 59.2 pixels/mm and 19.6 pixels/mm will be observed-both outside the range of visible frequencies for a viewer at 60 cm.

Additional benefits may be achieved by adjusting the color filters of each of the layers, in some embodiments. For example, removing the color filters of the front layer is equivalent to boosting the horizontal spatial sampling rate by a factor of 3, thus for appropriately chosen screen sample rates and separation distances, reducing Moire intensity perceived by the viewer.

Figure 21:
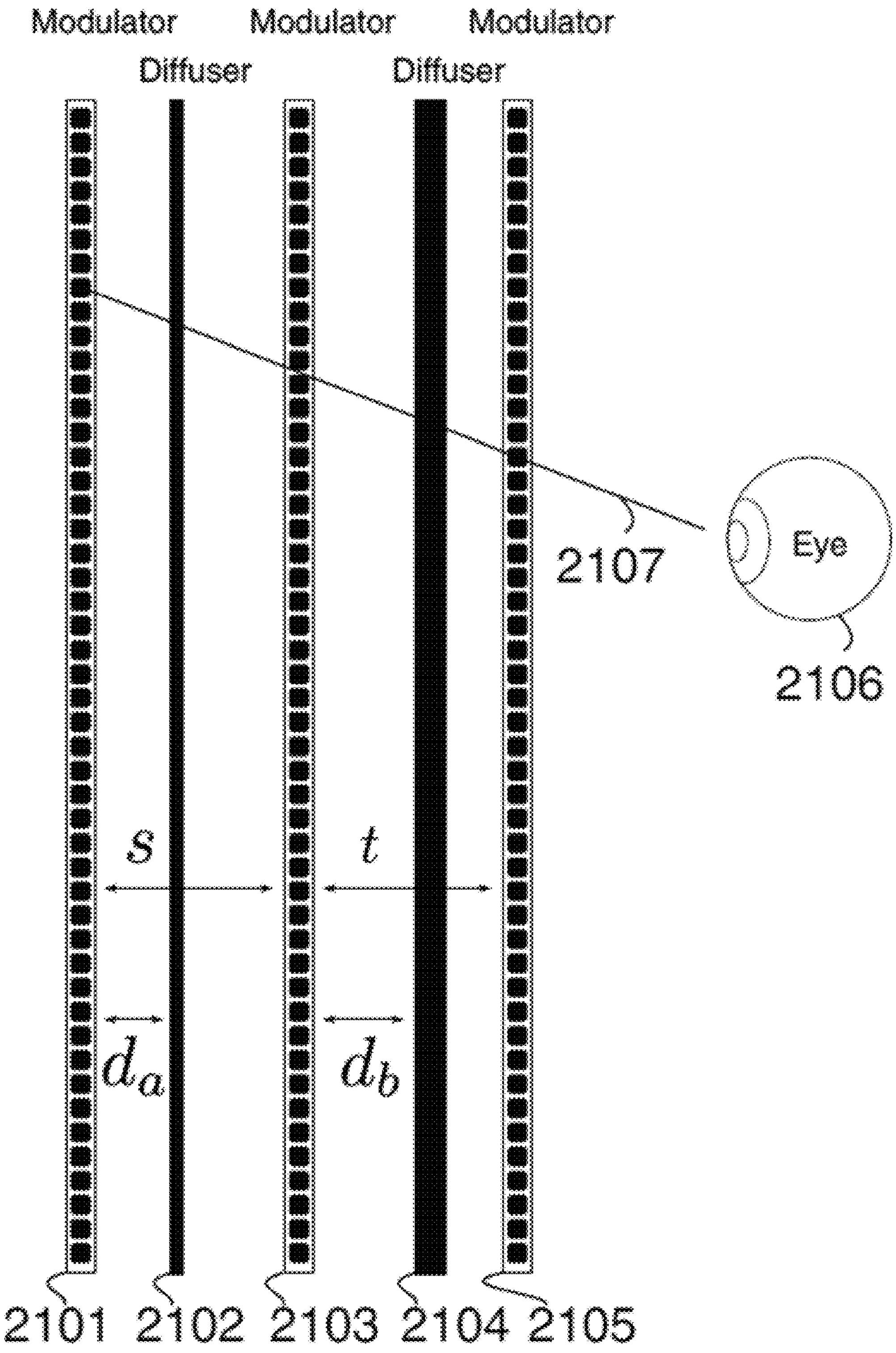
FIG. 21 illustrates a multi-view display comprising diffusers, in accordance with some embodiments of the technology described herein.

FIG. 21 shows a viewer 2106 observing a stack of optical modulators 2101, 2103, and 2105 in accordance with some embodiments of the technology described herein. In some embodiments, the optical modulators 2102, 2103 and 2015 comprise a grid structure, where said grid structure is proportional to the display resolution, which will create undesirable optical interference called Moire interference. Placing a diffuser between two optical modulators can mitigate Moire interference. The embodiment of FIG. 21 shows two optical diffusers 2102 and 2104. Diffusers 2102 and 2104 may have different diffusion weights, with diffuser 2102 being a light weight diffuser and diffuser 2104 being a heavy weight diffuser. The diffusers 2102 and 2104 are placed at different distances $d_a$ and $d_b$ in the optical stack. As a ray 2107 passes through each of said diffusion layers 2102 and 2104, it will be scattered by a degree according to the weight of the diffuser. Said scattering will impart an according amount of angular divergence, which will create optical blur as the ray travels a distance to the viewer position 2106. The weight of diffuser 2104 may be chosen to mitigate the Moire interference between optical modulators 2103 and 2105. Depending on the size of the grid structure of optical modulator layers 2101, 2103, and 2105, additional diffusion may be required to mitigate the Moire interference between optical modulators 2101 and 2103, and may be added by selecting a diffusion weight and distance for diffuser 2102. In some embodiments, the display resolution of optical modulator 2101 will be lower than that of 2103, and the display resolution of optical modulator 2103 may be lower than that of 2105. In some embodiments, the display layer spacings s and t may differ, and in some embodiments they may be identical.

Another benefit of reducing the spatial resolution of one or more layers of a display device that may be realized in combination with the above noted benefits is that of reduced rendering and optimization computational costs. Optimization and rendering costs are function of the number of discrete rays it is possible to represent with a display system. The number of discrete rays depends, combinatorially, on the number of image elements in each display layer. Often in the presence of optical blur, introduced intentionally to mitigate Moiré interference, or unintentionally through the properties of the various surrounding layers in the display device, a single image element on the display layers furthest from the viewer will not be individually resolvable. Thus the computational cost to render and optimize content for this pixel grid will be wasted. In this case, it may be advantageous, in some embodiments, for the purpose of computational efficiency to reduce the number of image elements on said display layer until just before each display element will be individually resolvable by a viewer at the expected viewing distance of the display.

Refresh Rate/Temporal Resolution

The optimization techniques described herein may be used to synthesize light fields using many systems that conform to the nonlinearity and entanglement requirements laid out above. Additional degrees of freedom, provided by high temporal refresh rates allow for more flexibility in the trade space described above. This means that optimized displays with high temporal refresh rates may produce higher quality images.

First it is helpful to discuss the variable flicker fusion rate of the human visual system, which rate is the rate beyond which a viewer will not perceive flicker in foveal vision. The flicker fusion rate varies with respect to absolute light intensity, and the relative magnitude of the flicker signal (difference between high intensity and low intensity). Flicker fusion in bright lighting environments occurs at approximately 60 Hz, and may occur at flicker rates as low as 40 Hz in darkened environments. In this discussion, a flicker fusion period will be considered to be the reciprocal of the flicker fusion rate. In the case of an optimized display where each layer in a stack of layers simultaneously refreshes each pixel on said layer sequentially, such that each of said display layers simultaneously scans out one frame, the entire stack of layers will appear to have the same refresh rate as any one element of the stack. Thus, a stack of layers that can scan out an entire frame in 1/240th of a second will have a refresh rate of 240 Hz. An optimized display constructed from this stack will have the ability to scan out four images within the flicker fusion period of a viewer in bright lighting conditions, and six images within the flicker fusion period. Another way to look at flicker fusion is that the human visual system is temporally band limited and does not perceive out-of-band temporal frequencies.

One metric helpful in answering the question of refresh rate requirements for light field display is to consider the algebraic rank of the light field to be displayed as parameterized by the display layers, in comparison to the algebraic rank of the display output space. In the case of a 240 Hz 3 plane layered multiplicative display configuration this would constitute considering the rank of the light field to be displayed (often between 10 and 20) parameterized as an order-3 tensor, against an order-3, rank-4 tensor. For perfect reconstruction, the ranks would need to be equal. However, in practice, information is not uniformly distributed across all elements in a rank-wise decomposition of the light field. This means that for some scenes, a rank-4 reconstruction of the light field may be of acceptable quality. A screen with a 1000 Hz refresh rate may be able to reconstruct most natural light field scenes using temporal multiplexing alone.

In order to achieve a benefit from high speed display layers, at least two display layers in a stack should update at the same rate. A simple thought experiment reveals the reason that a single layer updating faster than other layers will not improve the degrees of freedom of the optimized display. The human visual system will approximately average over all frames that occur over a single flicker fusion period. If only a single display layer has updated in one period, the problem becomes linear, rather than multilinear, and the average of the frames displayed during the flicker fusion period could be displayed on the rapidly updating layer at a lower rate.

This reasoning leads us to see that in a multi-layer system at least two layers should be configured to update at the same rate if display updates are to be used efficiently. In some implementations, it may advantageous to hold at least one layer of a multi-layer optimized display constant while updating the remaining layers, so long as more than one layer remains. This may be used to simplify computation, deliver results to the user faster (as opposed to spending more time computing the result), and to conserve power that would otherwise have gone to solving the optimization problem.

Modern display hardware updates each image element in sequence, often called a raster scan, or scan-out. The sequence typically used begins at the top row of the screen, and updates each pixel along the first line sequentially, then proceeds to the next line, continuing until the entire screen has been updated. To date, optimized displays have been made using commercial off-the-shelf display hardware which uses this raster scan update sequence on each layer of the optimized display.

The inventors have recognized and appreciated, however, that it may be advantageous, in some embodiments, to take a different, non-sequential approach to updating optical elements in display layers (e.g., when using commodity display hardware to create an optimized display). In an optimized display, the inventors have recognized that it may be advantageous to update the screen at a higher rate in order to increase the number of degrees of freedom available for representing a desired image. In practice not all regions of a desired image will be equally complex to represent. Therefore, in practice, it may be beneficial to update some regions of the display layers quickly at the cost of updating other regions of the display layers more slowly. Non-sequential updates allow for this trade-off in update rate.

Modern display buses such as DisplayPort have bandwidth beyond the requirements of a standard display. In a sequential display update scheme, no pixel addresses are required because it is assumed that the ordering of the pixels determines their locations. Because of the bandwidth of modern display buses it is possible to pass a data block containing pixel values and pixel coordinates (addresses) to a display controller, allowing for arbitrary pixels to be updated.

On the other hand, in an optimized multilayer display, with display layers that use a non-sequential update scheme, regions of the display corresponding to high scene disparity or very bright imagery, or otherwise requiring many degrees of freedom to represent may be updated more rapidly, and darker, low disparity regions, or regions requiring fewer degrees of freedom to represent can be updated more slowly. For example, a 1024×768 pixel screen that is updated at 60 Hz, neglecting blanking intervals, each pixel is updated in 1/47185920 second (47 MHz). While some display technologies such as LCD have settling times that would not allow such rapid updates to a single image element, groups of image elements can still be updated at a rate much higher than 60 Hz. Conversely, in many display technologies a pixel will maintain its state for longer than 1/60th of a second without being updated, meaning it is possible to update other regions of the screen at lower rates without losing the image data on the display.

Accordingly, in some embodiments, when using this non-sequential addressing scheme with an optimized multilayer display, it is possible for the optimization algorithm to direct the sequence of updates, pushing reconstruction error out of band, or above the flicker fusion rate of a human observer.

It should be appreciated that as the problem of light field display on a multiplicative multilayered display device is rank-1 in the sense that the light field emitted from a two layer screen is the outer product of the attenuation function displayed on each layer, so too is the problem of display scanout through standard row and column drivers a rank-1 problem in the sense that the 2D image shown on the display is a rank-1 outer product of the electrical states of the row and column driver circuits. While the problem of addressing pixels with row and column drivers is typically solved trivially today by selecting a single pixel to update at each time step, it is possible to repurpose display row-column driver circuits currently used in many display devices to instead create a sequence of rank-1 images at each time step. A single optimization algorithm, of the general form outlined earlier in this document, can be formulated to address a multitude of display layers, each of said layers being addressed by a row and column driver, with said drivers being sent actuation signals producing rank-1 images on each of said display layers at each time step, and said multitude of display layers comprising an optimized light field display, the output of said light field display being a rank-1 outer product of the images on each display layer at each time step. Having many time steps which occur at a high frequency, it is possible to push error out of band temporally and make high quality images for a human viewer.

Some hybrid display layer update schemes compatible with existing display controller firmware are also possible, in some embodiments. For example, it is possible to change the refresh rate of the displays in order to save power when displaying low-complexity scenes. For example, scene content that changes very little over time, or scene content that has low view disparity, will require lower display refresh rates to show with high quality.

Display Layer Spacing

Figure 18A:
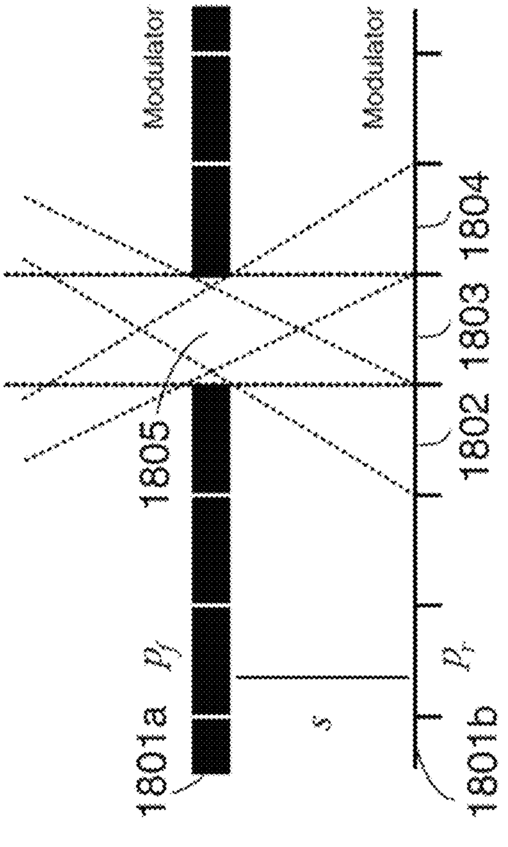
FIGS. 18A and 18B show detail and far-field views of a pinhole barrier display.
Figure 18B:
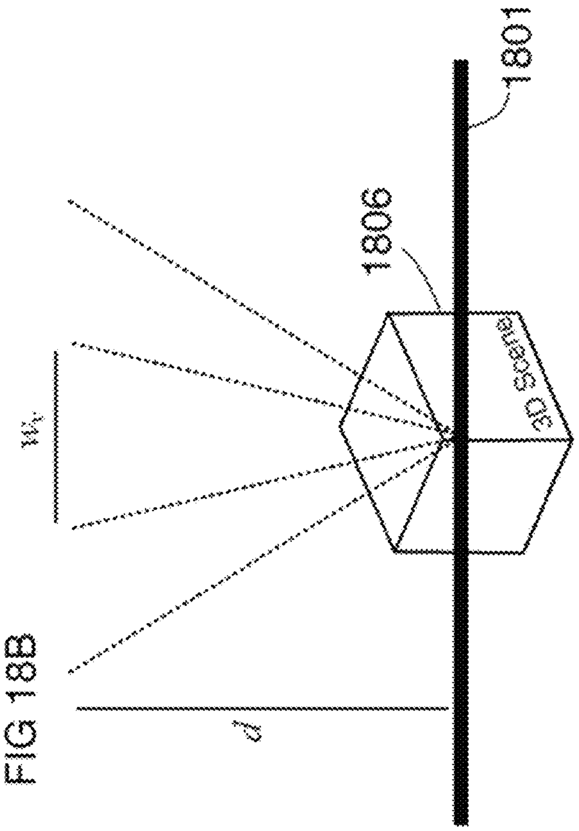
Figure 18C:
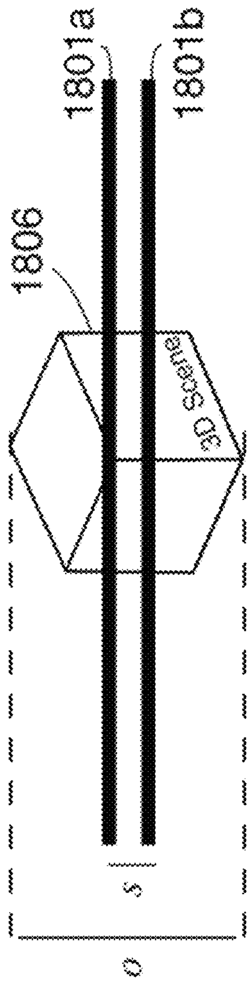
FIG. 18C illustrates a system configured for use with non-negative matrix factorization methods.

FIG. 18A shows a detail view of a pinhole display, which helps to illustrate some embodiments of the technology described herein. Modulators 1801*a* and 1801*b* comprise a pinhole display 1801. Individual pixels (1802, 1803, 1804) of modulator 1801*b* may be observed through transparent pixel 1805 of modulator 1801*a*. This creates three distinct view cones. FIG. 18B shows a more distant view of the arrangement in FIG. 18A, with corresponding view cones. A virtual object 1806 is shown relative to the position of the display 1801. FIG. 18C depicts a different system at the same level of detail as FIG. 18B, which system is configured for use with non-negative matrix factorization methods known in the art. Virtual object 1806 is shown relative to the positions of modulators 1801*a* and 1801*b*, positioned further apart than in FIGS. 18A and 18B for use with non-negative matrix factorization (NNMF).

In optimized multilayer light field displays, the choice of layer spacing may have a significant impact on the observed quality of displayed images. In practice the features exploited by the optimization algorithm driving the optimized multilayer display, in combination with the content to be displayed, will dictate the best strategy to be used to achieve desired results.

In configurations wherein the optimization algorithm exploits the 3D geometry of a multilayer device to create light field effects, such as those displays that use non-negative matrix factorization, the best practice is to space the layers at 30% to 40% of the distance of the maximum depth of the virtual scene to be represented. For example, if an optimized display device using NNMF methods were deployed in an application where it were required to display light fields representing 3D scenes with a real-world depth of 4 cm, the layer spacing should be between 1.2 cm and 1.6 cm. The display will more efficiently represent objects behind the central plane of the screen than in front of it. Therefore the 4 cm range of the display will be biased towards the back of the display. This rule of thumb provides a starting point, and the optimal value will depend on many factors, including the FOV of the system, the content displayed on the system, the amount of blur that is tolerable, the spatial resolution of the display layers, and the diffraction blur that is created by the sample grid of the front-most panel.

Another factor that is an important consideration for some types of multilayer systems is the depth location of the plane of maximum resolution. The plane with maximum spatial sampling in an optimized multi-layer display will occur on the front-most layer of the display, with high spatial sampling also available on other display layers of the optimized display. Accordingly, in some embodiments, the display layers may be placed at critical depths where, for example, legible text, is to appear. Insight about display performance may be gained by running a simulation of the physical system in conjunction with the optimization framework and intended content.

In embodiments where an optimized display has hardware capable of high temporal update rates (e.g., greater than 60 Hz), an optimization algorithm that exploits both the 3D geometry of a multilayer device and the high temporal sample rate of the display may be used. In this case the spacing guidelines may be relaxed, as the high speed temporal variation of the display provides degrees of freedom that may be used by a suitable optimization algorithm to extend the DOF of the optimized display. The degree of relaxation depends significantly on the speed of the modulator, and may be understood through simulation.

In embodiments where an optimized display has hardware capable of high frequency spatial sampling (e.g., a pixel grid having a pixel pitch of less than 1 arc-minute at a typical viewing distance), an optimization algorithm that exploits both the 3D geometry of a multilayer device and the high spatial sample rate of the display may be used. In these cases, the actuation patterns generating parallax-based effects may have a sufficiently small pitch that the spacing between layers can also be small (e.g., less than 6 mm). This makes the required layer spacing as narrow or narrower than that required by a pinhole display.

Color

Conventional multi-layer optimized displays are generally created using identical LCD panels having color filter arrays, with each of the color channels being optimized independently from one another. The inventors have developed techniques for jointly determine the actuation signals for multiple color channels of an optimized multi-layer display. This development allows for many new physical designs, and improved performance within existing hardware designs.

In optimized multi-layer displays comprising stacks of LCD panels where each LCD panel contains identical arrangements of identical color filter arrays, there will be cross-talk between the color filters, such that the color channels of the LCD are not truly isolated. In a hypothetical multi-layer display comprising a stack of LCD panels with ideal color filters, light transmitted through a red color filter in the first layer would not be transmitted through a green filter of the second layer, and so on for each non-identical pair of color filters contained in the color filter arrays of the LCD panels. This idealized multi-layer display system would allow for independent optimization of each color channel, as the color channels would not interact. However, in reality, cross-talk between the color filters will allow light from one color channel on one layer to pass through another color channel on another layer. The inventors have appreciated that in order to accurately reproduce the desired colors in a displayed light field or image the actuation signals that drive the optimized display must be generated jointly among all color channels and with knowledge of the cross-talk function between the color channels.

The inventors have recognized and appreciated that, in the case of an optimized multi-layer display with identical color filters on each layer, where the actuation signals driving the optimized multi-layer display are obtained jointly among all color channels, it is not only possible to obtain color-accurate representations of a desired light field or image, it is also possible to exploit the color cross-talk to achieve a wider color gamut, and spatially sub-sampled imagery. The colors of light that are emitted from pairs of non-identical color filters, one on each layer, will introduce new color primaries that can be used for image formation. For instance, light emitted along a path that intersects a red color filter on the first layer and a green color filter on the second layer might appear yellow-orange, depending on how the product of the response curves of the color filters.

In an idealized multi-layer display in which color filter responses do not have cross-talk, and the color filters are arranged per-pixel into color sub-pixels, the spatial resolution of each color channel is the same as the spatial resolution of the display. In this scenario, when considering each color channel independently, only light rays that intersect identical color filters on each display layer will propagate. This means that for each color channel the sample rate of the visible color sub-pixels is the same as the overall display sample rate. However, in real-world displays exhibiting color cross-talk between color filters, light will be visible along ray paths that intersect non-identical color filters on different display layers, meaning that for at least a subset of colors the spatial sampling may be increased to that of the sub-pixel sample rate.

At the time of display manufacture, color filter arrays may be tuned to maximize the above noted effects of increased color gamut and increased spatial sampling, as well as the optical intensity of the display. Generally, the goal of these modifications is to take advantage of multiple modulations that occur, one on each of the multiple display layers, to reduce the light loss through the color filters, and to increase the variety of color primaries available at the output of the display through combinations of filters on each of the layers. Because the observed color filter response for a ray exiting a multi-layered display is the product of the color filter responses along the ray path through the stack of layers, multiplicative combinations of color filter responses may be achieved.

Figure 19A:
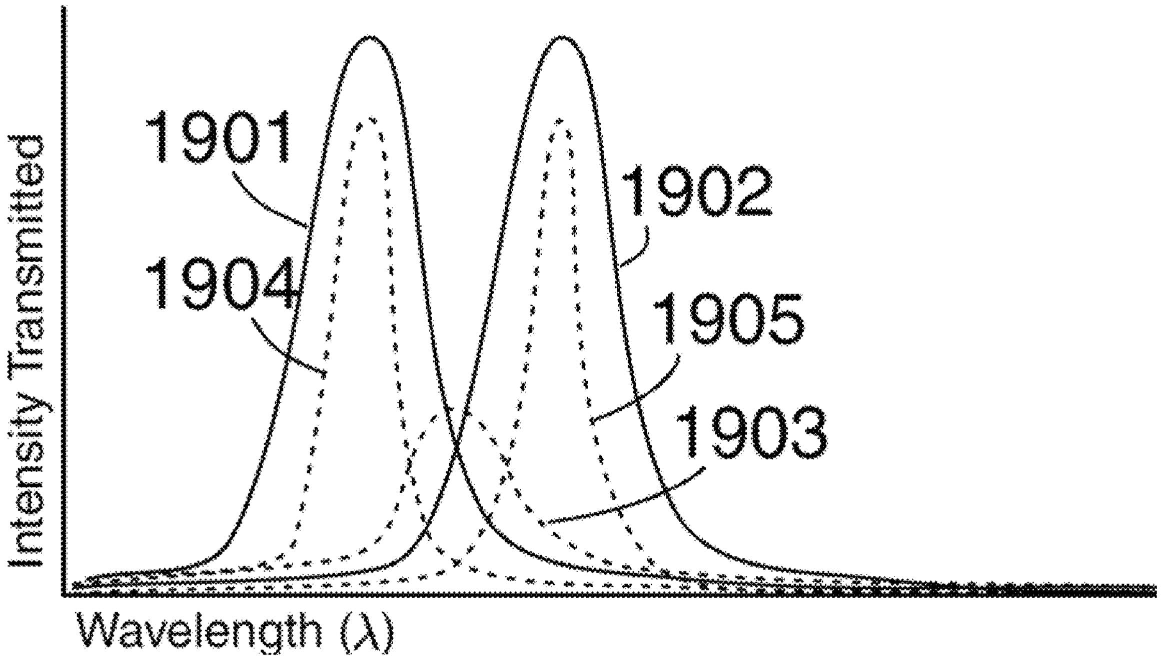
FIGS. 19A and 19B illustrate color filter responses for use in a color filter array in a multi-view display, in accordance with some embodiments of the technology described herein.
Figure 19B:
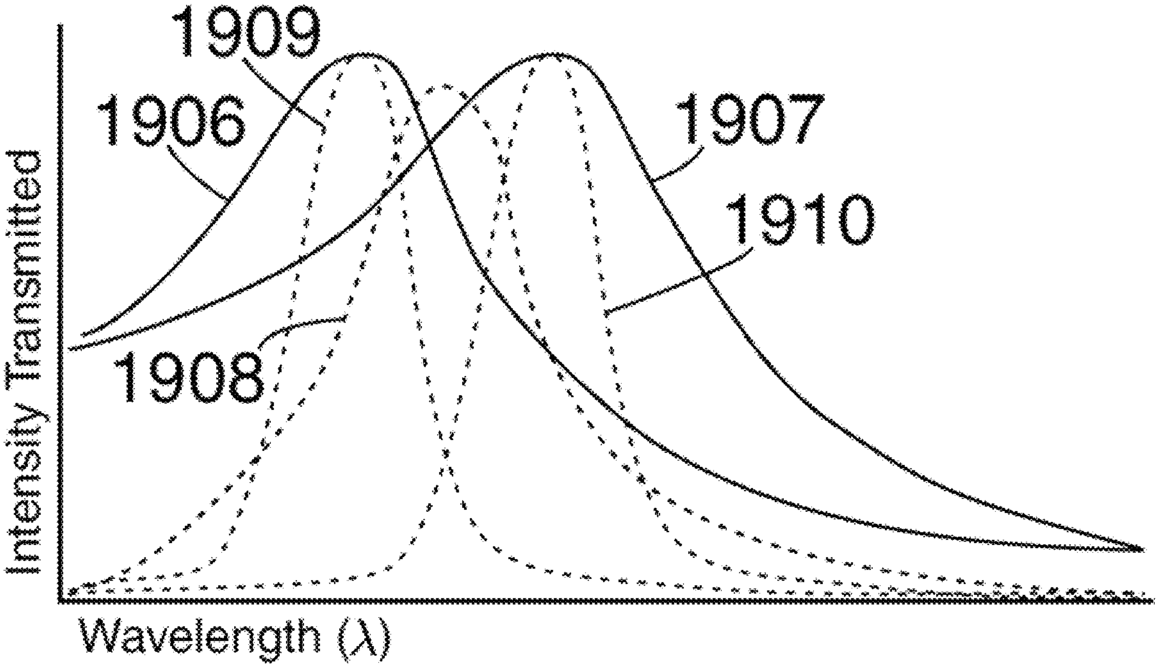

FIGS. 19A and 19B depict color filter responses that may be used in, or exemplify the color filter responses used in colored pixels of optical modulators, in accordance with some embodiments of the technology described herein. In embodiments where a display is created from two light attenuating layers, the observed color along a single ray path through the layers will be the product of the color responses of each layer at the location where said ray intersects said layer. In FIG. 19A, solid lines 1901 and 1902 represent standard red and green color filter responses found in LCD panels known in the art, respectively. Such responses might have a full-width-half-max of 70 nm. The dotted lines 1903, 1904, and 1905 represent the product of the three combinations of the two color filters, respectively—1901 by 1901, 1901 by 1902, and 1902 by 1902. The aforementioned products will comprise the possible colors observed by layering two layers comprising pixels with color responses 1901 and 1902.

FIG. 19B depicts modified color responses shown as solid lines 1906 and 1907. Dotted lines 1908, 1909, and 1910 denote the products of the three combinations of the two color filters, respectively—1906 by 1906, 1906 by 1907, and 1907 by 1907. Responses 1906 and 1907 have been modified from 1901 and 1902 such that their products have greater area under the curve, thus allowing more light energy to pass through the color filters. The modified color filter responses will typically have a full-width-half-max of greater than 100 nm.

In some embodiments, the color filter responses may be modified by taking the square root of a standard color filter response. It is also possible to determine the optimal color filter responses for a corpus of light field images by running an optimization problem that minimizes the light field reconstruction error within the corpus across a variable set of color filter responses. In some embodiments, color primaries may be removed entirely from one or more layers of an optimized multi-layer light field display. It is well known that chrominance is perceived at a lower resolution than luminance by the human visual system. This perceptual fact can be exploited to create optimized multi-layer light field displays with better light efficiency by excluding color filter arrays from one or more layers in a multi-layer display.

In some embodiments, it may be possible to decompose the light field images to be displayed by an optimized light field display into luminance and chrominance components, then decimate the resolution of the chrominance component, and create a cost function for said optimized display that jointly incorporates the target high resolution luminance and low resolution chrominance components. In embodiments where an optical stack comprises one layer with an RGB color filter array as is typically found in LCD panels, and a second grayscale LCD without color filter arrays, each sub-pixel of the color filter array will contribute to the luminance image, while the lower resolution chrominance image will be formed between the color pixels of the color layer and the grayscale pixels of the layer without color filter arrays.

Number of Display Layers

One of the ways to increase the number of degrees of freedom available to an optimized light field display is to increase the number of layers in the display. There are inherent tradeoffs when increasing the number of display layers in a multilayer display. While the extra degrees of freedom afforded by additional layers contribute to improving the theoretical upper bound for display quality, in practice the addition of a non-ideal display layer will increase light loss due to absorption and scattering, and create internal reflections that, if uncharacterized, will contribute to image artifacts.

It is possible to compensate for internal reflections by accounting for the reflected ray paths in the formulation (e.g., via a suitable cost function) of the optimization driving an optimized multi-layer display. Often it may be necessary to compensate for only the first bounce, but multi-bounce corrections are also possible.

Figure 20:
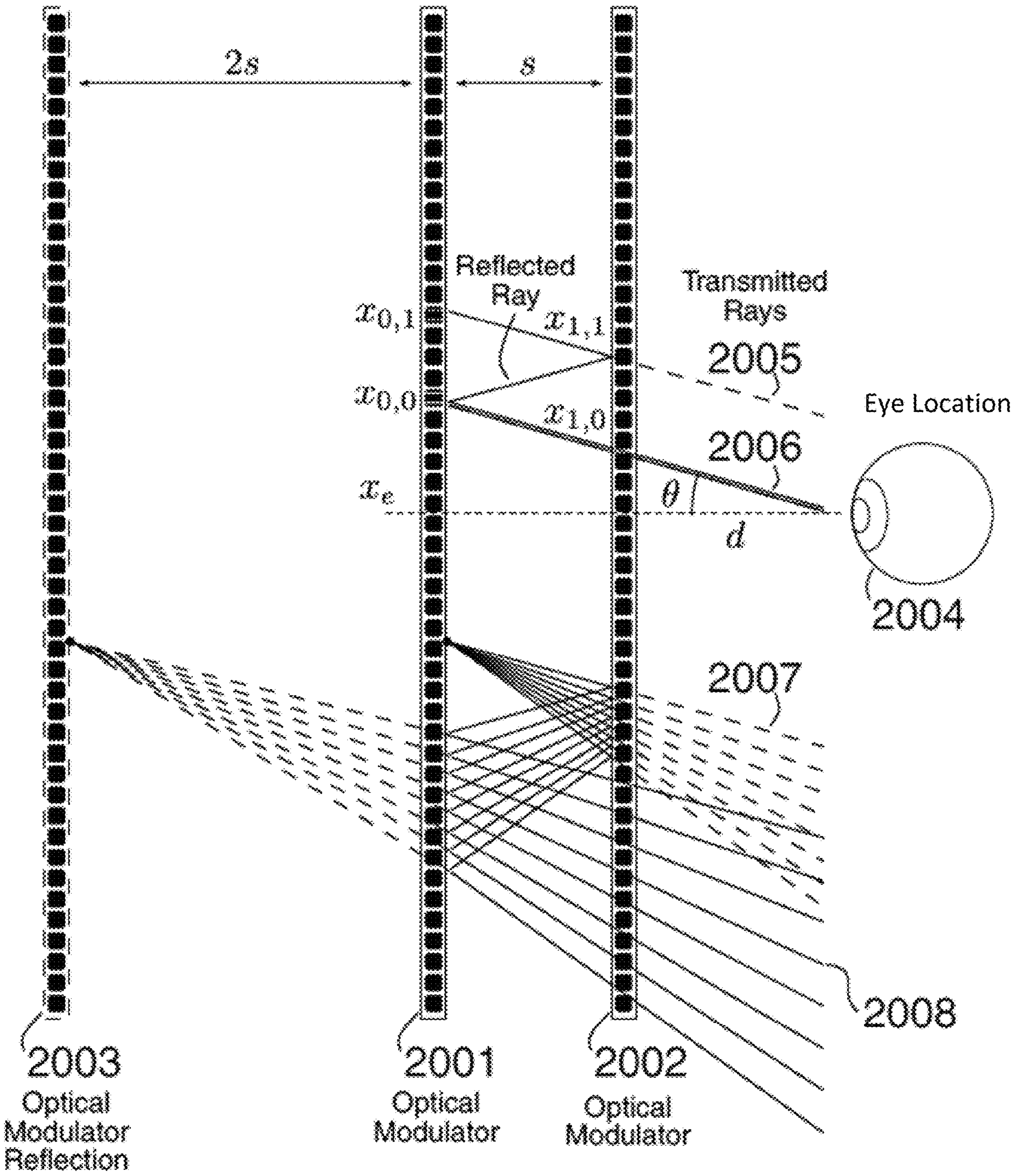
FIG. 20 illustrates techniques for compensating for internal reflections within a multi-view display, in accordance with some embodiments of the technology described herein.

FIG. 20 illustrates techniques for compensating for internal reflections within a multi-layer multi-view display, in accordance with some embodiments of the technology described herein. As shown, optical modulators 2001 and 2002 are placed a distance s apart to form a light field display. Ray 2005 is transmitted directly through both layers. In some treatments ray 2006, which is emitted from x0_1, reflected from x1_1 and x0_0 and passes through x1_0 before being observed by viewer 2004 may be ignored. However, it may be advantageous to account for the effect of ray 2006 and other such reflected rays. Two ray bundles are drawn in FIG. 20. Ray bundle 2007 originates at optical modulator 2001 and passes through optical modulator 2002, and ray bundle 2008, originates at optical modulator 2001, then bounces off of optical modulator 2002, then bounces off of optical modulator 2001, then passes through optical modulator 2002. By tracing the paths of ray bundles 2007 and 2008 it is shown that the bouncing ray paths of ray bundle 2008 can equivalently be modeled as an additional additive optical modulator layer 2003 at a position 2*s* from optical modulator 2001.

Moiré interference is caused by spatial aliasing between regular spatially distributed patterns, and is well understood in the optics community. It has been shown that placing a diffuser between display layers in a multi-layer display can mitigate the effects of moiré by blurring out the high spatial frequencies that cause Moiré interference. Here, we show an alternative method for placing diffusers in multi-layer displays.

There are various issues associated with diffuser placement in multi-layer displays, including those where the display has more than two layers. The general goal of the diffuser placement is to ensure that the resulting blur kernel from each of the layers of material in the multi-layer display stack, when combined, creates a blur kernel that is just large enough to attenuate the spatial frequency of the display sampling grid, from the perspective of the viewer, and is no larger than necessary preventing the loss of observable spatial resolution. It is also noted that the display layers themselves create a blur due to diffraction, and that this blur can be exploited to reduce Moiré interference with layers closer to the viewer.

One method to find the amount of blur required between each layer is to project the layer in question onto the next layer, multiply the signals, and compare the spectrum of the result to the minimum allowable Moiré frequency, creating an aggregate characterization of the overall blur function. In an optimization-based multilayer display, the optimization formulation would generally incorporate a characterization such the previously-mentioned characterization.

Optimized Display with Optical Modulators

Optimized displays may be constructed with a wide variety of light modulating devices such as, liquid crystal display devices, for example. In this section, we enumerate some useful combinations of devices that can comprise the modulator elements for an optimized light field display implemented in accordance with some embodiments described herein. The modulator combinations outlined below may be used with many of the techniques described herein.

In some embodiments, a wide variety of LCD technologies may be used including, but not limited to, TFT, TN, Pi cells, and ferroelectric LCDs.

In some embodiments, a light emitting device (e.g., an organic LED display) may be combined with an attenuating device (e.g., an LCD panel), so long as there is at least one light attenuating device in front of at least one light emitting device. In some embodiments, an optimized display may comprise an OLED display in a two layer stack a small distance behind an LCD display. This has the advantage of reduced power usage and increased update rate as compared to many LCD and backlight combinations.

Micro-electro-mechanical systems have been used to create sliding shutter "light valves" which can switch between binary opacity states at a high rate. In some embodiments, these light valves may be employed, along with optimization methods that create binary patterns, to create an optimized light field display. In some embodiments, two MEMS shutter devices may be arranged in a stack of layers. The spacing of the layers in these devices may be determined in any of the ways described herein.

An LCD panel may be manufactured such that the precision of the modulation state is traded for the number of discrete levels of modulation. It is therefore possible to create LCD panels, where the output of said panels is quantized to only a few bits. Typical LCD panels have their output quantized to 6-bits, whereas typical images intended for display on LCD panels have at least eight bits of dynamic range. Temporal and spatial dithering may be used to hide the difference between the desired output dynamic range and the available dynamic range from a human viewer. In an optimized display comprising multiplicative layers, the output dynamic range will be the sum of the dynamic range of each of the layers. For example, an optimized multilayer display comprising two 6-bit LCD layers will have a dynamic range of 12 bits. This may be accounted for in the optimization algorithm to increase the dynamic range of the light field emitted from an optimized multi-layer display. The visual quality of displays with 8-bit output may also be improved using the above strategy.

LCD panels are typically designed to be of appropriate thickness to fully modulate the polarization state of an incoming light wave. Reducing the thickness of the glass layers of an LCD device will reduce the amount of light that is modulated by the panel, reducing the observed contrast of displayed images, but will also increase the switching rate of the panel. The inventors have recognized that in a multi-layer optimized display, as it is possible to achieve increased contrast in displayed images through multiple modulations of a light ray passing through the multiple layers, and as it is possible to exploit increased temporal bandwidth to improve said optimized display, making a trade-off between contrast and display update rate is advantageous. Typical LCD contrast is above 1:1000. In the case of an optimized multi-layer display it is possible to use LCDs with contrast of 1:100 or lower.

In some embodiments, optimized displays may be made from printed transparency sheets. A novel aspect of the technology describe herein is the thinness of the stack of passive modulating layers used to create the perception of a 3D effect. When setting the actuation signals from the solution to optimization algorithms that utilize the spatial band limit of the human visual system, it is possible to make the layer spacing much thinner than reported in the literature, and it is possible to use fewer layers than reported in the literature.

Reflection-Based Optimized Displays

Unlike conventional optimized displays, which are transmissive, the inventors have developed some optimized display architectures that allow for reflective optimized light field displays. The reflection-mode optimized displays described herein have two basic ingredients: a modulator, and a reflective back-plane. Though there is not a direct correspondence to a transmissive optimized display, the analog of the reflective plane is the backlight unit and the modulators are the same.

FIGS. 22A-F illustrate aspects of reflection-mode multi-view displays, in accordance with some embodiments of the technology described herein. Depicted displays comprise at least one transmissive modulator and a reflective backplane. Said backplane may be a diffuser reflector or a specular reflector, and may itself also be a modulator. In this discussion, a specular reflection may occur when an incident light ray, upon being reflected, remains compact enough in exit direction that it meaningfully interacts with only a single modulator element on its exit path from the system.

Figure 22A:
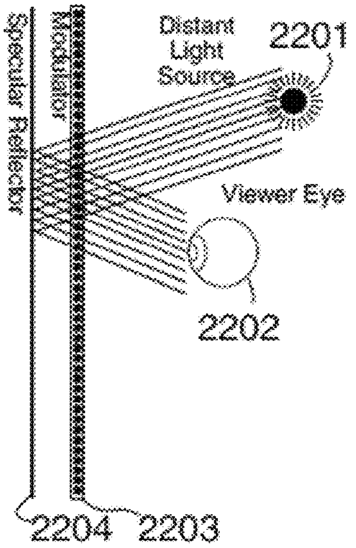
FIGS. 22A-F illustrate aspects of reflection mode multi-view displays, in accordance with some embodiments of the technology described herein.

FIG. 22A shows a transmissive optical modulator 2203 in front of a specular reflector 2204 (which for example may be a mirror). Light originates at a distant point light source 2201, which produces parallel or nearly parallel rays. A viewer 2202 observes the display. Light rays reaching the viewer 2202 must travel through modulator 2203 twice-one pass through the modulator occurs on entry as the ray travels from light source 2201 towards specular reflector 2204, and the second pass through the modulator occurs on exit reflecting from specular reflector 2204 towards the viewer 2202. Actuation signals may be produced to control the pixels of modulator 2203 in accordance with the methods described herein to produce a multi-view display, and with knowledge of the lighting direction to light source 2201.

Figure 22B:
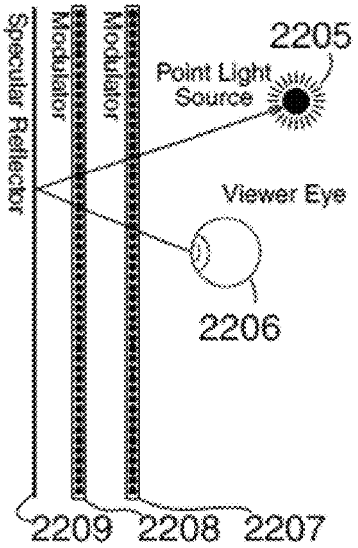

FIG. 22B shows another embodiment in which multiple transmissive modulators 2207 and 2208 are placed in front of a specular reflector 2209. In this embodiment, rays from distant point light source 2205 are modulated four times-two modulations occur as the ray travels from light source 2205 to reflector 2209 and two additional modulations occur as the light ray travels from specular reflector 2209 to viewer location 2206. The embodiment of FIG. 22B allows for additional degrees of freedom in the system, which allows for improved multi-view display performance, including but not limited to expanded field of view, and increased apparent pop-out. Actuation signals may be produced to control the pixels of modulators 2207 and 2208 in accordance with the techniques described herein to produce a multi-view display, and with knowledge of the lighting direction to light source 2205.

Figure 22C:
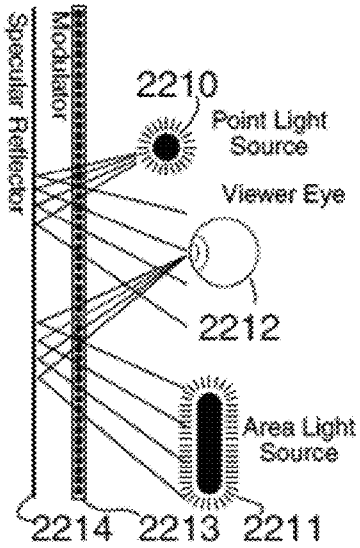

FIG. 22C shows an arrangement of spectral reflector 2214 and transmissive modulator 2213. The point light source 2210 is placed close to the display, such that rays arriving from light source 2210 cannot be considered to be parallel. This may lead to an undesirable situation in which regions of the display will appear dark to viewer 2212, as there will be no ray path connecting the viewer position 2212 to the light source 2210 over some regions of the display. In some embodiments, the need for a nearby light source can be accommodated by replacing point light source 2210 with area light source 2211. Knowledge of the position and shape of the light source may be used to compute the actuation signals for modulator 2213 in accordance with the techniques described herein.

Figure 22D:
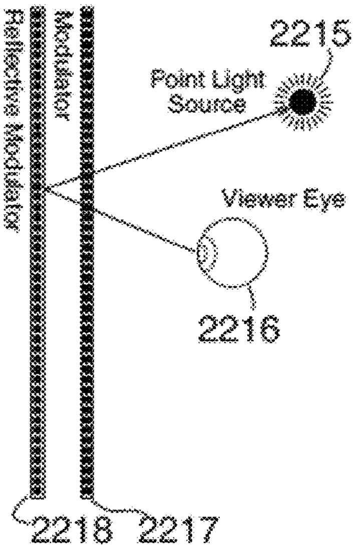

FIG. 22D depicts a transmissive modulator 2217 on top of a specular reflective modulator 2218. In this case, a distant point light source 2215 will cast a ray that travels through modulator 2217, is modulated upon reflection at reflective modulator 2218, and is modulated a third time at modulator 2217 as it continues towards viewer location 2216. In some embodiments, the arrangement of elements pictured in FIG. 22D will add degrees of freedom to a reflective multi-view display system beyond those that would be available with a specular reflective backplane as pictured in FIG. 22A. Actuation signals for modulators 2218 and 2217 may be computed according to the techniques described herein, and with knowledge of the direction of incident light from light source 2215.

Figure 22E:
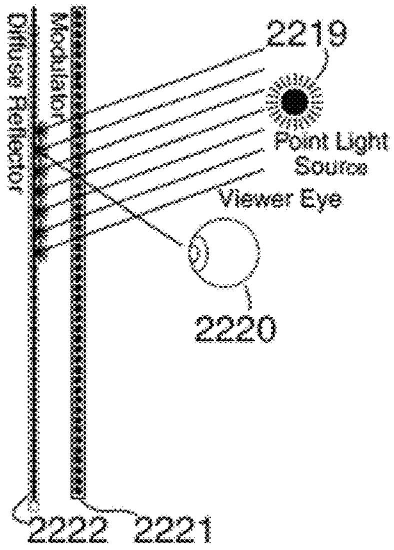

FIG. 22E depicts a transmissive modulator 2221 layered atop a diffuse reflector 2222. The diffuse reflector scatters light such that a single ray from distant point light source 2219 is modulated by the modulating layer 2221, scattered by the diffuse reflector 2222, and then interacts with multiple pixels on the modulating layer 2221. A diffuse reflector with a wide reflection lobe, when coupled with a single distant point light source 2219, will form an image of the pattern displayed on the modulator on the diffuse reflector. Thus, from the perspective of the viewer, the pattern on the modulator 2221 modulator will interact with a scaled and shifted version of the same pattern, projected by the light source 2219 onto the diffuse reflector 2222. In some embodiments, actuation signals may be computed, according to the techniques described herein, that incorporate said interaction between shifted patterns, in addition to the viewer location 2220 to produce a multi-view display.

Figure 22F:
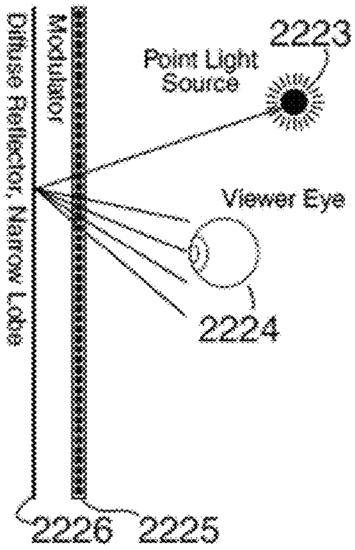

FIG. 22F depicts a configuration of transmissive modulator 2225 atop a diffuse reflector 2226, wherein the diffuse reflector has a reflection lobe that is narrow. Said narrow lobe causes light reflected from said diffuse reflector to interact with a small subset of pixels on modulator 2225. In some embodiments, a narrow diffuse reflection lobe, which causes light to be scattered in across an angular range that encompasses only a subset of the pixels on the modulator 2225, enables a beneficial way of manage the degrees of freedom in a multi-view display system. Actuation signals may be computed for the system pictured in FIG. 22F according to the disclosed techniques. In some embodiments, it may be useful to also consider the size of the diffuse lobe of the diffuse reflector, the direction of the point light source 2223, and the position of the viewer 2224.

With some types of modulating layers, it may be possible to achieve greater optical efficiency by making adjustments to the optical system. For example, in the case of an LCD panel in front of a reflective surface that preserves the polarization state of light, it may be possible to remove the rear polarizing layer of the LCD in order to increase the optical transmission. In this setup, it may be advantageous in some circumstances to replace the front polarizing layer of an LCD with a circular polarizer to prevent the intensity distribution of the display from being inverted optically. Coupling the above modified LCD modulator with a reflective modulator capable of altering the polarization state of incident light, such as a liquid crystal on silicon (LCoS) device, has the effect of adding a reflective modulator to the system while preserving the optical efficiency of a system without a reflective modulator.

Backlight Design

The inventors have appreciated that, for efficiency purposes, the backlight coupled to an optimized light field display should be designed to provide a directional light cone over the area of expected viewing only. For example, if a display is expected to support viewers over a 90 degree horizontal span, the backlight unit placed behind the modulating layers of the display should be made to emit light only across the 90 degree span of expected viewing. This remains true in the case of a display that tracks one or more viewers' positions and updates the angular region over which the display shows content. In many cases the display will have a narrow field of view at any moment, but the narrow field of view can be aimed in a variety of directions such that the narrow field of view may address a wider angular region of expected viewing locations. In some embodiments, for these cases, in order to keep the design of the backlight relatively simple, the backlight may be made to emit light over the entire angular region of expected viewing locations at once. In practice, due to the non-ideal nature of optical materials it is expected that at least 90% of the light emitted by the efficient angular backlight falls in the angular region containing the expected viewer locations.

V.B Near Eye Light Field Displays

Non-limiting examples of near eye light field displays include virtual reality displays (e.g., two LCD layers near the viewer's eye with a main lens between the eye and the screen) and augmented reality displays (e.g., a virtual reality system having a split optical path). Virtual reality displays may be implemented using any of the multi-layer approaches described herein. Augmented reality displays may be implemented by including a second low-resolution multi-layer system to produce occlusions.

Figure 23:
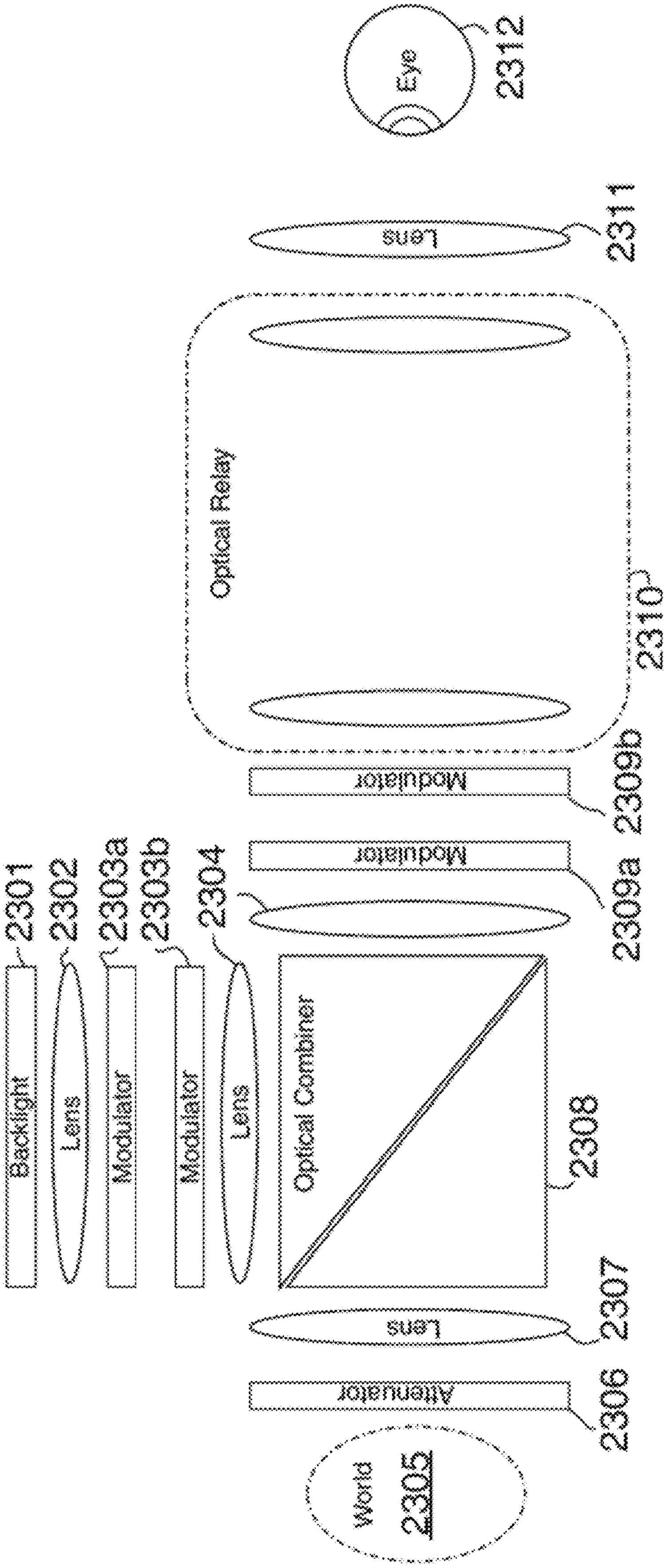
FIG. 23 illustrates a multi-layer light field display, in accordance with some embodiments of the technology described herein.

FIG. 23 illustrates one embodiment of a multi-layer light field display designed for the purpose of providing a light field input into the eye of a viewer 2312, and designed to be located near to the viewer's eye. This arrangement is in contrast to other embodiments in which the modulating layers are far from the viewer's eye and the output is intended to present different imagery to multiple viewer eye locations simultaneously. In the case of a near-eye light field display, some embodiments are designed to create multiple scene viewpoints across the viewer's pupil, allowing the viewer to refocus his or her eye on virtual objects. A pair of such near-eye light field displays is able to create a virtual reality or augmented reality headset capable of providing accommodation and focus cues to a viewer.

The system illustrated in FIG. 23 depicts one embodiment of the technology described herein comprising two optical paths: one optical path directs an image of the world, including objects or people in front of the viewer into the viewer's eye, and a second optical path images a plurality of layered optical modulators into the viewer's eye to create a light field image of a virtual scene. The optical path to create the virtual image begins at the top of FIG. 23 with backlight element 2301. A lens or lenses 2302 may be used to condition the backlight appropriately for the modulators, said conditioning comprising for example, focusing or collimating the light source. An alternative configuration for some embodiments would be to forego an emissive backlight 2301 in favor of collecting environmental light using lens(es) 2302 as environmental light collector(s). Optical modulators 2303*a* and 2303*b* may optionally be high resolution modulators in some embodiments, and are shown by way of example as two layers of liquid crystal light modulating elements in FIG. 23. Layers 2303*a* and 2303*b* may be any transmissive or reflective optical modulating elements. Layers 2303*a* and 2303*b* may be driven by computed actuation signals according to the technology disclosed herein. Lens(es) 2304 may be present to act as optical adapters. Said optical adapters may couple the output from the modulators and from the optical combiner to adjacent optical elements. An optical path to image real-world scene images to the viewers eye 2312 begins at the world 2305, which may be construed to represent any scene to be viewed through the device. 2306 shows an optional adjustable optical attenuator, which may be used to adapt the intensity of the world 2305 to the intensity of light transmitted by the optical modulators 2303. Lens or lenses 2307 represent an optional main lens or scene collection optics, which may image the world 2305 into the system. Optical combiner 2308 may represent, for example, a pair of prisms. Said optical combiner will combine the images formed by main lens 2307 and light field display 2303, wherein the combined images then travel in the direction of the viewer 2312. Optical modulators 2309*a* and 2309*b* may be present to create a dark field screen. Said screen is drawn, by way of example and not limitation, as two liquid crystal light modulating elements, but may comprise other types of optical modulators. Said screen is designed such that diffraction blur through the device is minimized at the viewer's eye location. In some embodiments, diffraction may be minimized by creating the device from liquid crystal elements with large apertures. The intention of dark field screen element is to block light arriving from specified directions. Said dark field screen may be known as an angularly dependent attenuator. In some embodiments, said dark field screen allows the viewer to observe correct or plausible real-world occlusion from virtual objects, or to remove real objects from view. In some embodiments, the modulators 2309*a* and 2309*b* may be driven using actuation signals computed according to the methods disclosed herein, given the appropriate cost function describing the desired attenuation distribution. Element 2310 shows an optional relay optic that can be used in some embodiments to adapt the system to space-constrained designs. Lens(es) 2311 represent eyepiece optics, meant to couple the output of the system to the human visual system, indicated by eye location 2312.

Figure 24B:
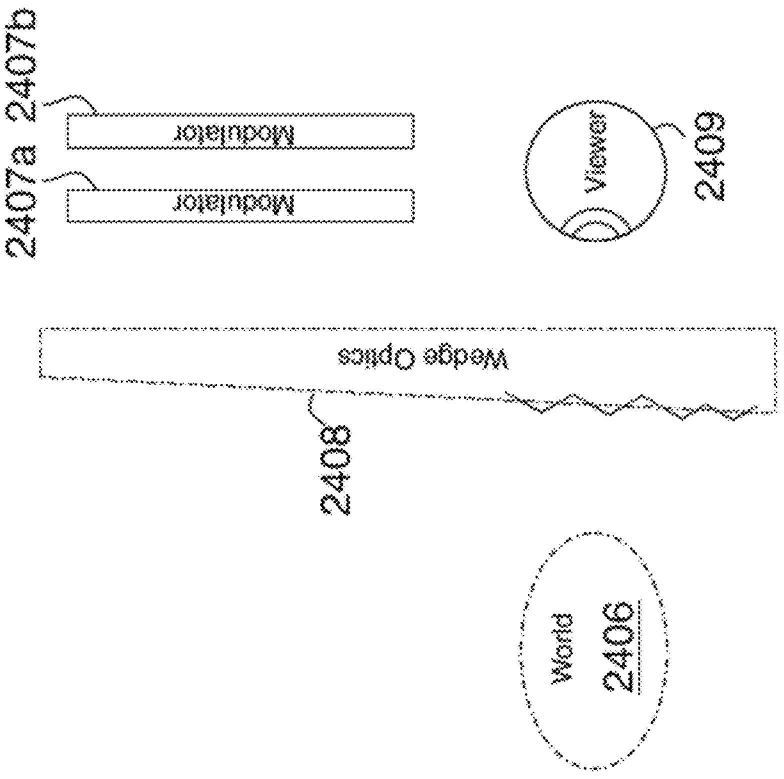
FIGS. 24A and 24B illustrates embodiments of multi-view displays that may be used for augmented reality and other applications that make use of visual accommodation effects, in accordance with some embodiments of the technology described herein.
Figure 24A:
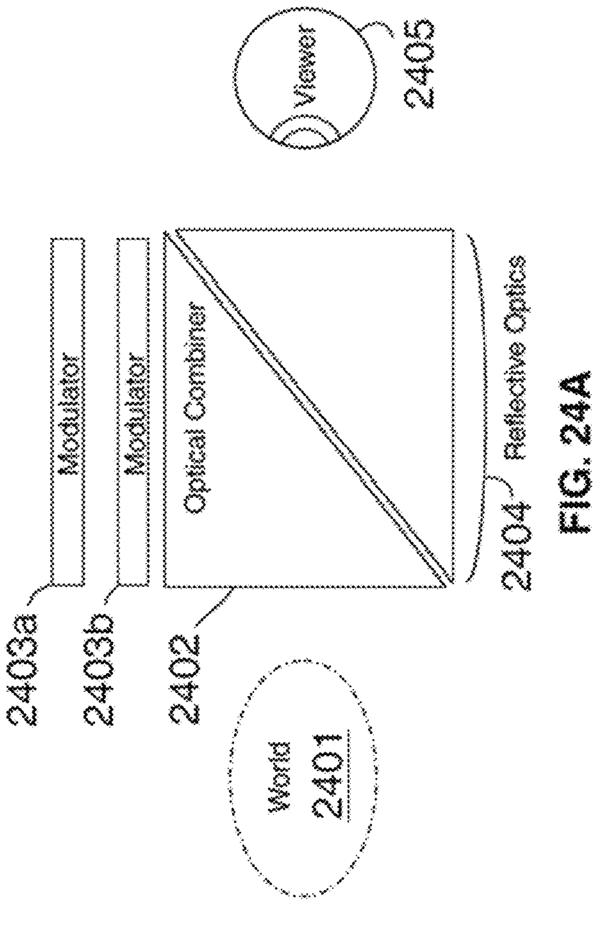

FIGS. 24A and 24B illustrate embodiments of multi-view displays that may be used for the application of near-eye light field display including augmented and virtual reality, in accordance with some embodiments of the technology described herein. Both figures depict embodiments of near-eye light field displays that make use of alternative optical elements from those depicted in FIG. 23. The drawings of FIGS. 24A and 24B are simplified to clarify the role of the featured optical elements, and are not intended to suggest that the full generality of the system drawn in FIG. 23 does not apply to the systems of FIGS. 24A and 24B.

In FIG. 24A, the world 2401 is imaged through an optical combiner 2402, which combiner combines the image of the world with the light field image produced by modulators 2403*a* and 2403*b* and directs said images to the viewer 2405. Modulators 2403*a* and 2403*b* are, in some embodiments, driven by actuation signals produced according to the technology disclosed herein to produce a multi-view display. Reflective optics 2404 deliver the image produced by modulators 2403*a* and 2403*b* to the viewer 2405 via the optical combiner 2402.

In FIG. 24B, an embodiment is illustrated using wedge optics 2408 to combine images of the world 2406 and light field images from modulators 2407*a* and 2407*b*. Said images are directed to the viewer 2409. Modulators 2407*a* and 2407*b* may be actuated by actuation signals computed in accordance with the technology disclosed herein. Embodiments of the disclosed technology using wedge optics may benefit from space efficient designs.

V.C Projected Augmented Reality Light Field Displays

A projected, augmented reality display may be made using the principles outlined in this document, in conjunction with a projection lens and viewing surface. The purpose of such a display would be to project virtual images into views of the world as seen through a window, windshield, cockpit, view-screen, projection screen, or other reflective, transparent surface, such that the projected virtual images integrate with the real scene, in 3D, from the perspective of one or more observers.

It has been shown that optimized displays can project light field images with specialized screen optics. The inventors have developed techniques for creating an optimized projected light field display for augmented reality applications without using a specialized screen. The basic layout of such a device will comprise a source, which provides spatio-angular variation, a main lens, which scales the source to the desired spatial scale, and a screen, which reflects the projected images to the eye of the viewer.

In some embodiments, the source may comprise any one of the transmissive optimized light field displays detailed in the sections above, coupled with appropriate backlighting. In some embodiments, the screen may be any reflective or semi-reflective surface, optionally modified to make it preferentially reflective from the known location of the source and main lens, in the known direction of the viewer. Such modification can be achieved through holographic elements, or hogels, which are commonly used for such purposes.

In some embodiments, surfaces for the screen may include car windshields, boat and airplane cockpits, and exterior windows in buildings and other structures. In the case that the reflective surface has a curvature, the light field emitted from the source may be pre-warped in order to compensate for the shape of the reflector. This is done by tracing the ray path from the light field source, through all optical surfaces in the system, to possible locations for the viewer's eyes. These ray paths are then sorted to provide the desired shape of the light field.

The key to creating a projected augmented reality display is to ensure sufficient angular diversity reaches the viewing locations of the viewer's eyes. In order to achieve this, the angle subtended by the exit pupil of the main lens of the system must be at least as large as the desired field-of-view of the system. For this reason, a large lens placed near to the viewer is desirable, in order to achieve a system with a workable field-of-view. Large lenses will necessitate large modulating layers in the source. These can preferentially be achieved with LCD devices. In order to reduce the cost of the main lens, it is sometimes desirable to use Fresnel optics, or catadioptric systems (those which combine mirrored devices and refractive optics) in the construction of the main lens. Multiple types of modulators can be used, including LCD, LCOS, MEMS DMD, MEMS Shutter displays.

V.D Calibration of Optimized Light Field Displays

In some embodiments, a mobile device may be used to calibrate algorithms used herein for determining actuation signals for optimized displays. For example, a mobile device may be used to aid in determining the mappings from the various actuation signals to the display views Calibration methods in a manufacturing environment would also follow in a straightforward way from these examples and considerations.

In some embodiments, calibration using a mobile device may include any suitable combination of one or more of the following: (1) the use of a mobile device camera, depth camera, or camera array in imaging the display being calibrated; (2) the use of a camera, depth camera, or camera array attached to the display being calibrated, in imaging the mobile device; (3) the use of the display being calibrated in displaying various calibration patterns, including QR codes, to be viewed by a human or by a mobile device camera, depth camera, or camera array; (4) the use of the mobile device display in displaying various calibration patterns, including QR codes, to be viewed by a human or by a camera attached to the display being calibrated; (5) the use of multiple mobile devices in performing calibration; (6) the continual adaptation of various displayed patterns as calibration parameters are learned; (7) the use of accelerometer, gyroscope, compass, sonar or other measurements by the mobile device in determining the position of the mobile device with respect to the optimized display; and (8) the use of wireless or wired data transmission in exchanging parameters between the mobile device and computation attached to the display being calibrated.

Figure 25:
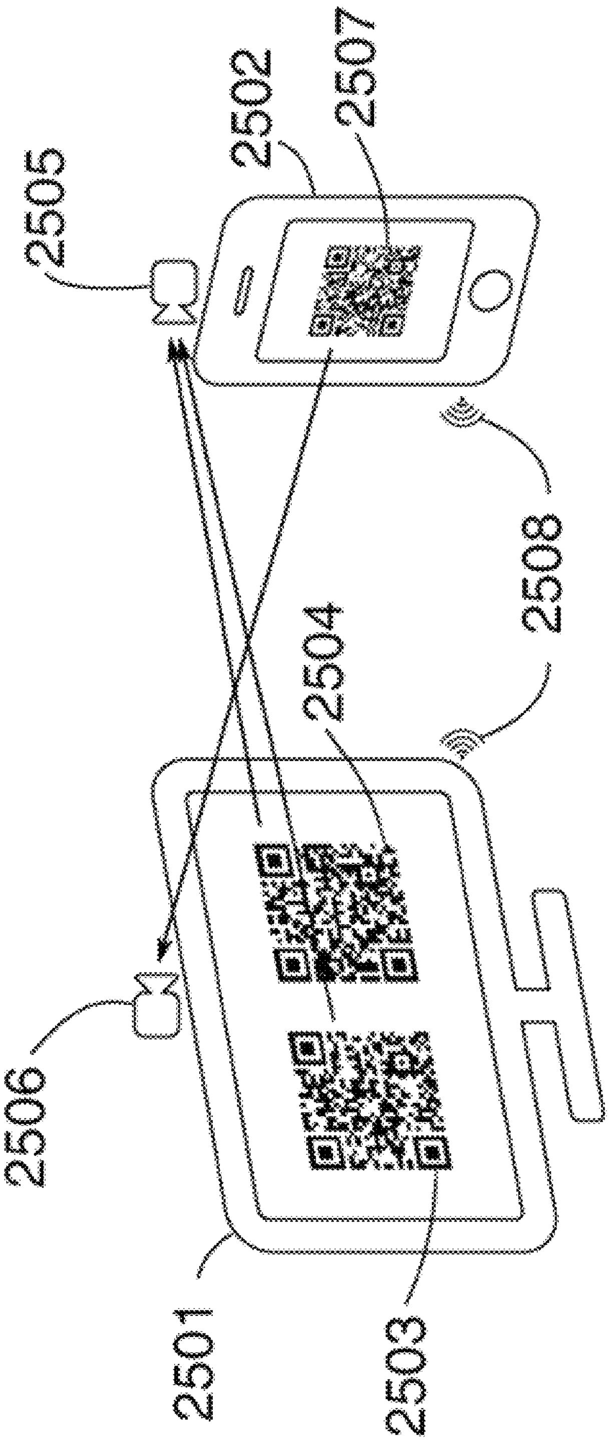
FIG. 25 shows an illustrative example of using a mobile device for calibrating a multi-view display, in accordance with some embodiments of the technology described herein.

FIG. 25 shows an illustrative example of using a mobile device for calibrating a multi-view display, in accordance with some embodiments of the technology described herein. In embodiments of the technology described herein that comprise multiple light modulating layers the relative spatial orientation of said layers will affect the multi-view imagery produced by the display. Using methods known to those skilled in the art display layers may be arranged in predetermined positions and said positions characterized at the time of manufacture. In some embodiments, it may be necessary to re-characterize the positions of the modulator layers relative to one another, for example because of mechanical changes in the device, errors in manufacture, and/or software changes.

FIG. 25 illustrates an example of a system to perform said characterization via a calibration step in-the-field using a smartphone or other mobile computing device. In some embodiments, calibration in-the-field may refer to any calibration performed post-manufacture. In some embodiments, the system shown in FIG. 25 (and its variations) may be applied at the time of manufacture.

In the embodiment of FIG. 25, a multi-layer display to be calibrated 2501 comprises two modulating layers displaying calibration patterns 2503 and 2504 and a camera 2506. The spatial relationship between the camera and at least one modulating layer may or may not be known. Also illustrated is a mobile device 2502 comprising a display, which is able to display a calibration pattern 2507 visible to camera 2506, and a camera 2505, which is able to image calibration patterns 2503 and 2504. Both cameras 2505 and 2506 may be integrated cameras, camera arrays, or depth cameras. In some embodiments, the spatial relationship between camera 2505 and pattern 2507 is known. In some embodiments a wireless communication channel 2508 is present between mobile device 2502 and screen 2501.

In some embodiments of the calibration procedure, mobile device 2502 is moved to a plurality of locations in front of display 2501. The number of locations may be greater than a threshold number (e.g., greater than 3, 5, 10, 20, 25, etc.). At each of said locations camera 2505 is able to image patterns 2503 and 2504, and camera 2506 is able to image pattern 2507. Using camera calibration techniques (e.g., as may be used in computer vision), the spatial position of patterns 2503 and 2504 are established with respect to camera 2505, and the spatial position of calibration pattern 2507 is established with respect to camera 2506. In some embodiments, the relative arrangement of patterns 2503 and 2504 from the perspective of camera 2505 may be sufficient for calibration. In some embodiments, using the known spatial relationship between camera 2505 and pattern 2507, the coordinate systems of cameras 2505 and 2506 may be connected, establishing a global coordinate system for all calibration patterns. From the established spatial location of each pattern the spatial orientation of each modulator may be derived. In some embodiments, the spatial information is shared between the mobile device 2502 and screen 2501 via (e.g., wireless) communication link 2508. In some embodiments, the communication link 2508 comprises a connection via a server on the Internet or other network.

In FIG. 25 the calibration pattern is drawn as a QR code as a non-limiting example. The calibration pattern may comprise other popular patterns including, for example, the chess board pattern or dot calibration pattern in the OpenCV software package or any other suitable pattern. In some embodiments, the calibration patterns may include unique metadata. In some embodiments, unique metadata and calibration data obtained during the calibration may be stored for later retrieval in a database, and said database may reside in a server on the Internet or other network. The server may be a cloud server. Calibration patterns 2503 and 2504 are drawn such that they do not overlap, even though the modulators in screen 2501 are placed on top of one another. In some embodiments, the calibration patterns may not overlap in the view of camera 2505. In some embodiments, overlapping calibration patterns may be used to achieve additional measurement accuracy. Overlapping calibration patterns may produce a Moire effect, which can be measured by camera 2505 to determine the separation between modulator layers.

V.E Caching and Compositing of Computed Actuation Patterns

In determining the values of display actuation signals in optimized multi-layer displays, including using the previously-mentioned techniques employing blurring transformations, the inventors have recognized the advantages of caching of actuation signals and/or the compositing of cached signals with other cached signals as well as those signals under optimization.

In some embodiments, generated actuation signals may be stored. The generated actuation signals may be obtained in any of the ways described herein including as the result of an explicit optimization process or using a heuristic method for generation. The generated actuation signals may be generated for: (1) a pre-selected view position or set of view positions; (2) in the context of an animated scene, a pre-selected animation frame or set of animation frames; (3) in the context of scenes displaying content as a function of various parameter values, a pre-selected parameter value or set of parameter values, and/or in any other suitable context.

The actuation signals may be stored in any type of memory, as aspects of the technology described herein are not limited in this respect.

In some embodiments, stored actuation signals may be displayed (recalled) on a single- or multi-layer display, including an optimized display.

In some embodiments, the stored actuation signals may be combined one or more other signals including, but not limited to: (1) actuation signals corresponding to two-dimensional, diffuse light fields, e.g. two-dimensional text, images, graphics, or user interface elements; (2) other previously-recalled actuation signals; (3) actuation signals being optimized, explicitly or heuristically, in “real time”; and (4) any other suitable actuation signals.

In some embodiments, the techniques for combining actuation signals include: (1) spatial compositing based on individual display layers; (2) gradual blurring between edges of actuation signals being composited; (3) higher-order light field based compositing (e.g., compositing that utilizes the known location of the viewer to identify partitions of the actuation signals that correspond to mutually distinct portions of the light field generated by the display, and compositing that utilizes the known location of the viewer to identify partitions of the actuation signals that correspond to mutually distinct portions of perceived views of the generated light field); (4) additive or linear compositing, e.g. in a multiplicative multi-layer display where, given two sets of actuation signals to be composited (“source signals”), all but one of the display layers have identical source signals. In this case the composited signal would correspond to a linear superposition of the source signals on the display layer having distinct source signals; and (5) the use of a cached actuation signal or signals as parameters in, or initial state of, an optimization algorithm that in turn generates actuation patterns.

V.F Applications

It should be appreciated that aspects of the technology described herein may be used in a variety of applications. Non-limiting examples of such applications are automotive applications (e.g., 3D Dashboard, gauges, instruments, buttons, and augmented reality windshields), user interfaces for computing devices (e.g., tablet, phone, laptop, desktop, workstation, etc.), computer-aided design (CAD) workstations, architectural models, entertainment applications (e.g., television, theater movies, home movies, mobile device movies), gaming applications (livingroom scale, handheld, desktop computing, public venue-arcade, team sports arena), medical imaging (e.g., visualizing volumetric data obtained for example by an MRI or ultrasound imaging device, visualizing depth data (2.5D), visualizing rendered/mesh data), scientific and medical visualization applications (e.g., underground imaging, biological systems imaging, big data/data trends), financial applications (e.g., complex markets, finding correlations), advertising applications, art applications, remote vehicle control applications (e.g., generating user interfaces for controlling unmanned vehicles in air, water, and/or land), monitoring single or multiple vehicles, teleconferencing applications, telepresence applications, teleoperation applications, near-eye display applications (e.g., augmented reality and/or virtual reality applications), and creating accommodation cues for any of these applications.

VI. Further Descriptions of Techniques for Manufacturing Light Field Prints

Further aspects of techniques for rapid, robust, and precise manufacturing of light field prints are described in this section.

Figure 26:
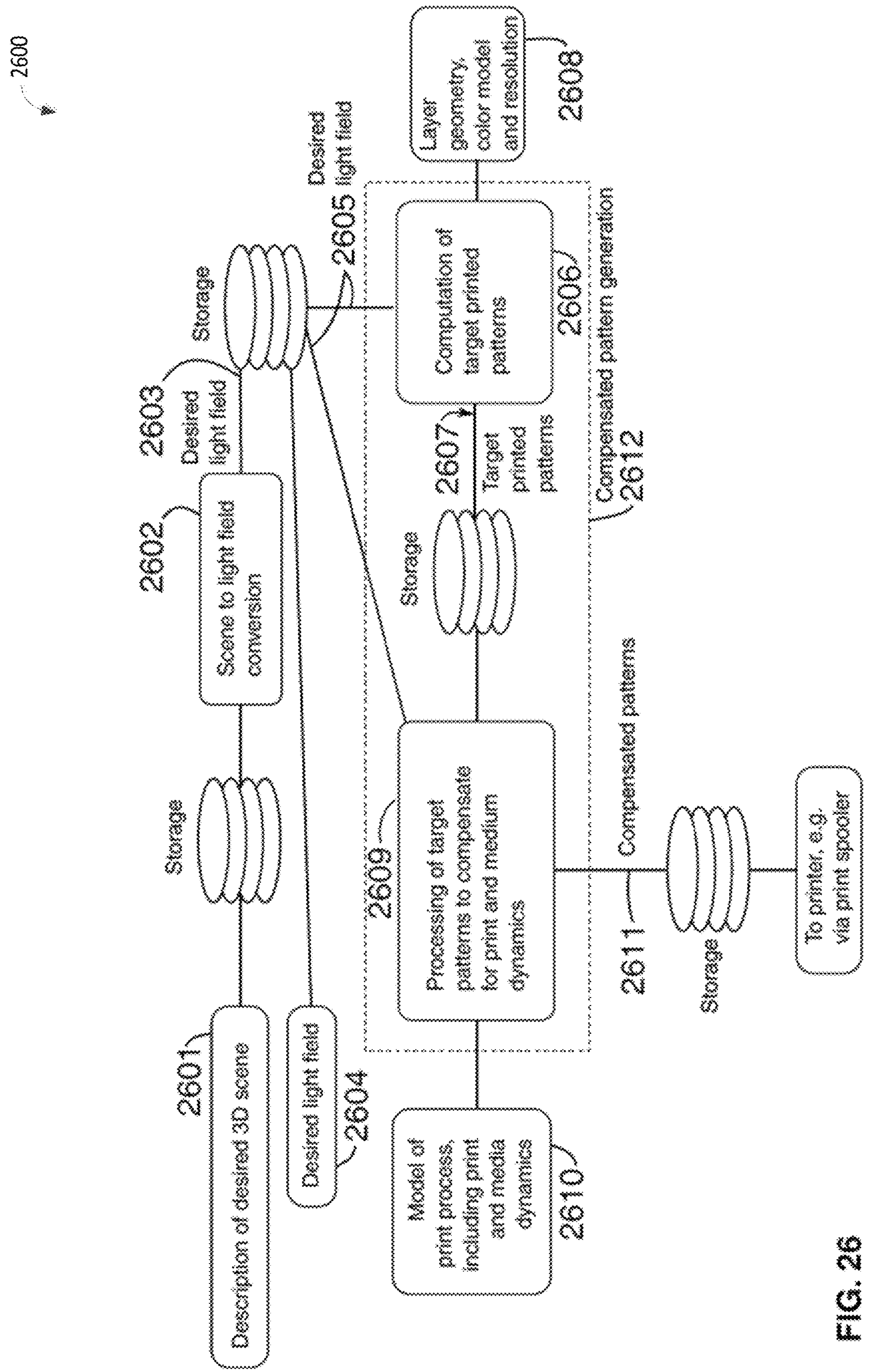
FIG. 26 shows another illustrative system for generating patterns to be printed on layers of a light field print and printing the generated patterns on the layers of the light field print, in accordance with some embodiments of the technology described herein.

FIG. 26 shows an illustrative system 2600 for generating patterns to be printed on layers of a light field print and printing the generated patterns on the layers of the light field print, in accordance with some embodiments of the technology described herein. In FIG. 26, lines indicate the path of data through the system, and storage indicates parts of said data path where data may be stored. In some embodiments, the storage locations may be bypassed.

The input into the system pictured in FIG. 26 may comprise one of a number of formats. In one embodiment, input 2601 may comprise a plurality of 2D views of a 3D scene, in some cases referred to as a light field. In some embodiments, input 2601 comprises a scene description including but not limited to geometry or texture information. In embodiments in which a scene description comprises the input, the input may be converted 2602 to a light field representation, comprising a plurality images representing views of the described scene 2603. When the input is already a plurality of images representing scene views 2604, the conversion step 2602 may be bypassed. In block 2606, the desired light field representation 2605 may be used to compute the target patterns 2607 for printing onto layers to be assembled into a light field print.

In some embodiments, geometry, color model, and resolution information 2608 may be incorporated into the computation of the patterns 2607. In some embodiments, the target patterns 2607 may be processed at act 2609 to compensate for properties of the print process. Such properties may include, for example, physical properties of the medium, physical properties of the print process, dynamic properties of the print process, and fluid dynamic properties of the printer ink, or physical properties of printer toner. In some embodiments, processing 2609 incorporates a physical model of the properties to be compensated 2610. In some embodiments, computation blocks 2609 and 2602 may be combined into unified computational system or method 2612. The compensated patterns 2611 may be sent to a printer or print spooler or otherwise reproduced in print.

In some embodiments computation block 2602 generates a representation of a light field from a scene description, which scene description may comprise a 3D scene represented, for example, as a CAD file, a depth map, the OBJ file format, Collada file format 3D Studio file format, three .js JSON file format, or scene meant for ray tracing such as a POV-Ray scene or Nvidia Optix program. The resulting desired light field 2603 may be generated using any of numerous rendering techniques. For example, said rendering techniques may comprise a virtual multi-camera rendering rig to render an plurality of off-axis images from different perspectives, GPU shader-based rendering techniques, and/or ray-tracing techniques.

The light field generated by 2602 may be encoded in various formats. For example, the light field may be encoded as an ensemble of images corresponding to various desired views of the scene. In this representation, each pixel value corresponds to the desired color and/or intensity of a light ray to be emitted from a specific location and at a specific angle on the display surface. The importance of the particular light ray may also be encoded. In some embodiments, said encoding may be used to weight the error function used in the downstream processing 2606.

Several methods may be used for computing target patterns for printing 2606. In some embodiments, target patterns are computed for one printed layer that is monochrome and a second printer layer that is color. In some embodiments, target patterns that are binary in each ink channel may be computed. For example, the patterns may comprise binary Cyan, binary Magenta, binary Yellow, binary black (CMYK) channels. Similar considerations may also be made for other color combinations and ink sets, including without limitation light inks such as light black, light cyan, and light magenta, spot color inks, and inks intended to extend the color gamut of the printer. The computation of binary patterns may be done, for example, by introducing appropriate regularization into the computational methods used to compute the target patterns in accordance with the techniques described herein (e.g., using the techniques described in FIGS. 2-13) disclosed herein. In some embodiments, patterns may be computed by operating on sub-blocks of the target patterns, and combining said sub-blocks to obtain the target patterns. In some embodiments, said sub-blocks may use associated partitions of the target light field. For example, the block processing may be done on each iteration of any iterative method for performing the computation.

Some embodiments may include techniques for compensate for print and medium dynamics in printing patterns for printed multi-view displays. The goal of said compensation is to obtain a compensated pattern from a target pattern, where said compensated pattern has been corrected for print and medium dynamics. For example, the compensated pattern may be corrected for any one or more (e.g., all) of ink bleed, dot gain, and the maximum allowable ink density of the print medium.

Techniques for compensating for dot gain in creating light field prints include, for example, linear spatial filtering of the target pattern such as Gaussian blur filtering, followed by an intensity threshold operation and/or the use of morphological processing methods. Prior to employing these techniques, the target patterns may be spatially upsampled. Dot gain compensation methods used in creating light field prints may be applied to individual color channels or to multiple channels jointly. The output patterns generated by dot gain compensation processing may be referred to as intermediate patterns.

Techniques for ink density compensation in creating light field prints include, but are not limited to, applying a structured pattern to the intermediate patterns, whereby a select number of individual pixels are eliminated so that ink, toner, dye, or other media, is not deposited on the medium at the locations of the eliminated pixels. In some embodiments, the choice of which pixels to eliminate may depend on the patterns upstream in the processing. In other embodiments, that choice may be independent of the patterns upstream in the processing. The result of ink density compensation, in some embodiments obtained by processing the intermediate patterns, becomes the compensated patterns utilized downstream in the printing.

Figure 27A:
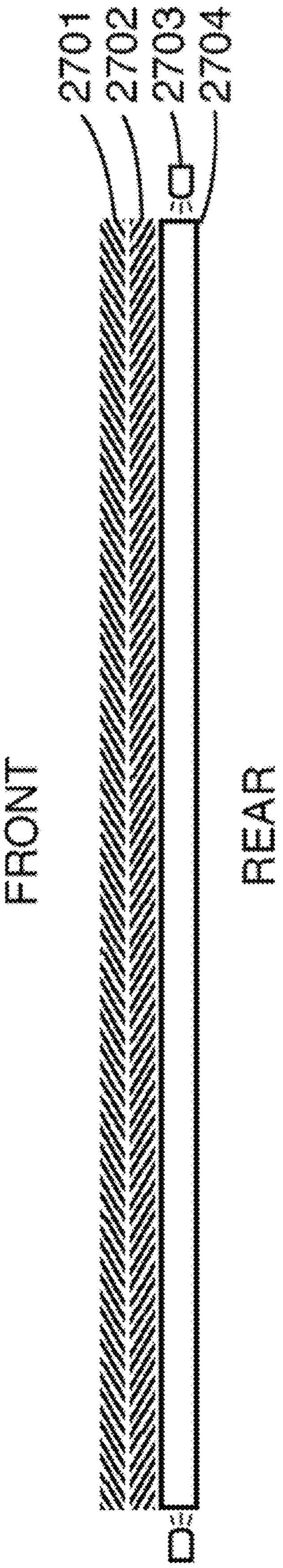
FIGS. 27A and 27B show illustrative examples of a light field print, manufactured in accordance with some embodiments of the technology described herein.
Figure 27B:
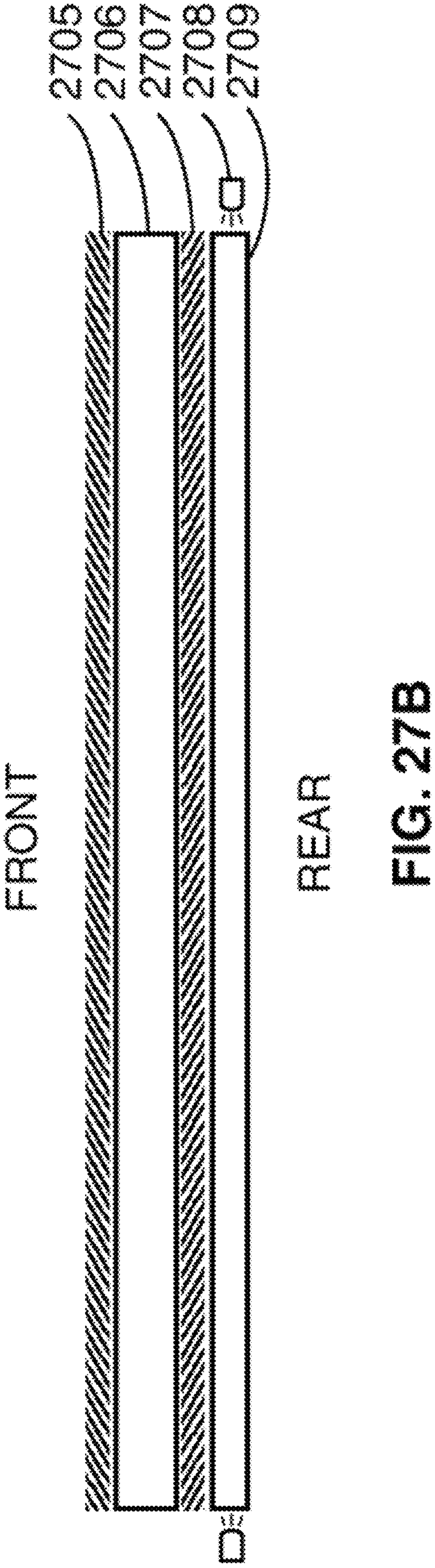

FIGS. 27A and 27B shows an illustrative example of a light field print, manufactured in accordance with some embodiments of the technology described herein. The light field print in FIG. 27A comprises a front printed layer 2701 sitting directly atop, so as to be in contact with, a rear printed layer 2702. The layers are lit by a backlight unit comprising lamps, including without limitation LEDs 2703 and a light guide 2704.

FIG. 27B illustrates a light field print comprising a front printed layer 2705, separated from a rear printed layer 2707 by a transparent spacer 2706. This embodiment can also be illuminated by a backlight identical in construction to that illustrated in FIG. 27A, comprising lamps 2708 and light guide 2709.

In some embodiments, the ink or emulsion may be on the front-facing surface of the printed layers 2701, 2702, 2705 and 2707. In some embodiments, the ink or emulsion may be on the rear-facing surface of the layer. In some embodiments, the entire layer may be a selectively transparent attenuator throughout the volume of the layer. In some embodiments, the particular mode of attenuation (e.g., top, bottom, or volumetric) may be distinct between layers 2701 and 2702. By choosing an appropriate mode of attenuation, the thickness of the transparent material onto which the pattern is printed may be used as a transparent spacer.

LEDs 2703 and light guide 2704 illustrate a side-illuminated backlight module. Alternative types of backlight modules may be used in other embodiments. The backlight modules may be based on electroluminescent, fluorescent or LED elements, organized in side-illuminating, front-illuminating, or rear-illuminating configurations. The same considerations apply to 2708, 2709.

Figure 28:
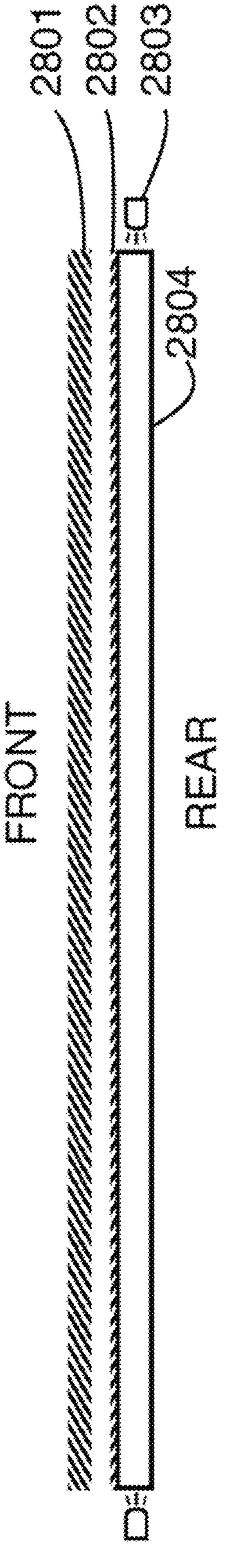
FIG. 28 shows another illustrative example of a light field print, manufactured in accordance with some embodiments of the technology described herein.

FIG. 28 shows another illustrative example of a light field print, manufactured in accordance with some embodiments of the technology described herein. Said light field print comprises a stack of emissive and attenuating layers. Said layers may correspond to associated methods disclosed herein for sequentially assembling the individual layers to form a stack of printed layers. A printed pattern 2802 is printed onto the surface of a backlight, comprising a lamp 2803 and light guide 2804. Illumination source 2803 may be, by way of example and not limitation, an LED. Frustrated total internal reflection results in the appearance of an illuminated region at any location where ink is deposited 2802 on the surface of the backlight medium 2804. An attenuating layer 2801 is then affixed to the rear emissive layer. In some embodiments, attenuating layer 2801 may be affixed directly to emissive layer 2804. In some embodiments, attenuating layer 2801 is separated by a spacing layer. The actuation signals for target and compensated patterns on layer 2801 and ink layer 2802 may be computed according to techniques described herein for computing actuation signals for prints containing a plurality of attenuating layers.

Figure 29:
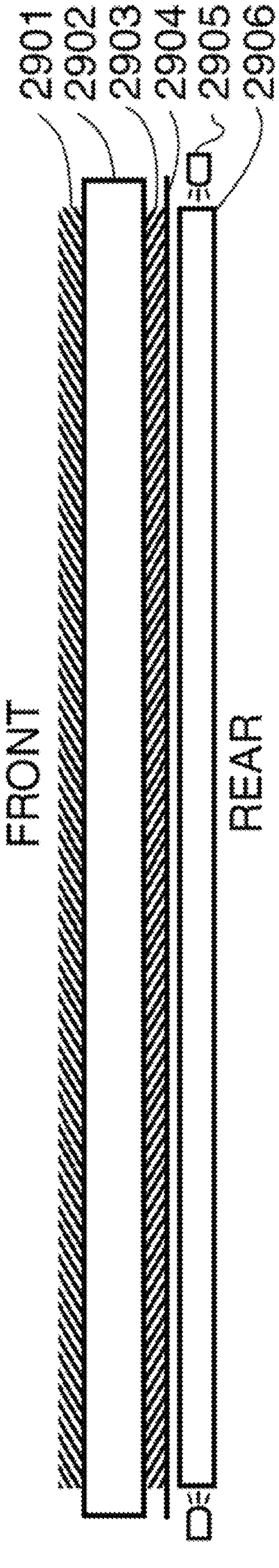
FIG. 29 shows an illustrative example of a light field print manufactured using a self-aligned printing method, in accordance with some embodiments of the technology described herein.

FIG. 29 shows an illustrative example of a light field print manufactured using a self-aligned printing method, in accordance with some embodiments of the technology described herein. Illustrated are a transparent layer 2904 onto which a rear pattern 2903 is printed. A transparent separator 2902 is affixed atop the printed pattern 2903. In some embodiments, the separator may be affixed using an optical adhesive. A front pattern 2901 is then printed on transparent separator 2902. In some embodiments, spacer 2902 is affixed without influencing the spatial location of transparent layer 2904. This may include performing assembly directly on the print bed or paten, and performing repeated print passes for multiple layers. In some embodiments, a UV cured flat-bed inkjet printer may be used. In this way, the alignment between layers and between each layer and the print head may be preserved. In some embodiments the stack of materials 2901-2904 may be placed on a backlight comprising edge-lit illumination source 2905 and light guide 2906.

Figure 30:
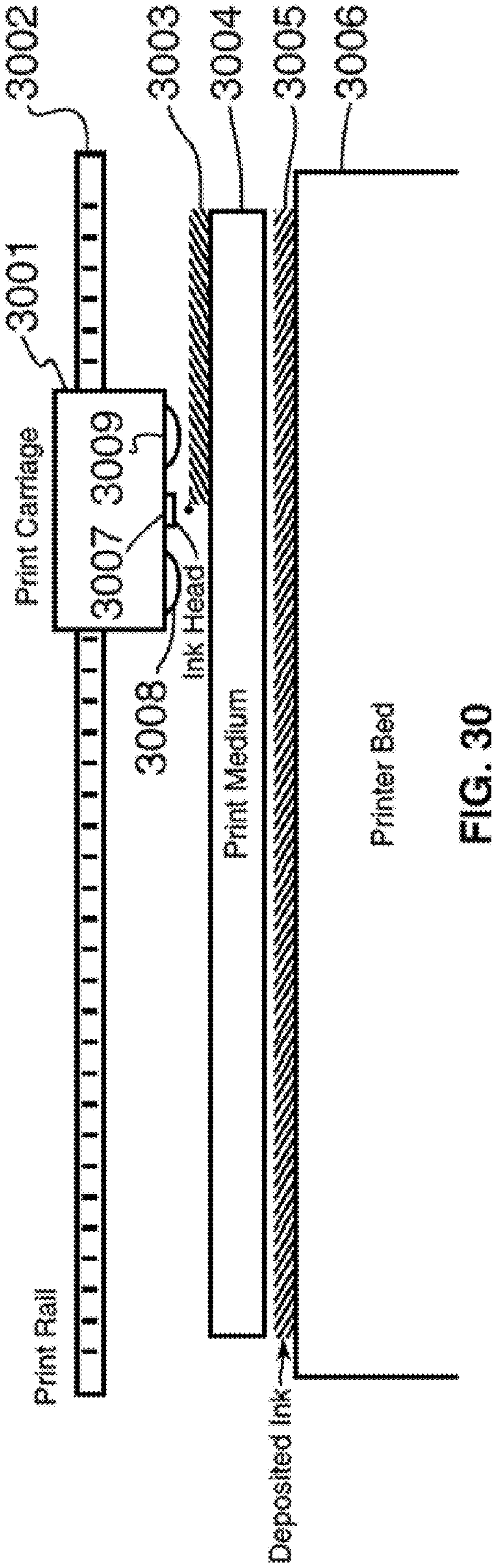
FIG. 30 shows an illustrative system for adaptively aligning the printing process used for printing a layer of a light field print, in accordance with some embodiments of the technology described herein.

FIG. 30 shows an illustrative system for adaptively aligning the printing process used for printing a layer of a light field print, in accordance with some embodiments of the technology described herein. A print carriage 3001 moves along a guiding structure 3002. In some embodiments, a guiding structure may be used to move print carriage 3001 in a direction normal to the drawing plane. In some embodiments, the print medium is moved normal to the drawing plane to allow the print mechanism to address a two dimensional region of the print medium.

FIG. 30 illustrates a two-pass printing process. During the first pass, ink is deposited on a print medium 3004 by ink head 3007, which medium is resting on print bed 3006. The ink may be aqueous ink, pigment ink dye ink, UV cured ink, and/or any other suitable type of ink. In some embodiments, the medium 3004 is a transparent layer that may be a rigid or flexible. The stack of material may be secured to the print bed 3006. In some embodiments, the material may be secured to the print bed by using an arrangement of pins and/or a vacuum table.

After completion of the first pass the print medium 3004 is flipped over. The material stack 3003-3005 rests on the print bed or platen 3006, and may be secured to the print bed as above. During the second pass, the ink head 3007 deposits ink drops 3003 onto the medium 3004. Cameras 3008-3009 integrated into the print carriage 3001 allow for monitoring the second pass of the print process. The spatial relationship of the plurality of cameras (drawn as 3008-3009) and the ink head 3007 may be known. Camera 3003 monitors the ink currently deposited, viewed through the material stack 3003-3005. Camera 3008 monitors the layer of previously-deposited ink 3005 through transparent layer 3004, and any element of the stack below 3005. In some embodiments, the platen or print bed 3006 may incorporate an illumination source. In some embodiments, the platen or print bed 3006 may incorporate tracking markers. As the print carriage 3001 moves over the print bed or platen 3006, the cameras 3008-3009 are used to align the position of the print carriage 3001 to the previously-deposited ink pattern 3005. This helps to ensures that the print layers are aligned.

Light field prints manufactured in accordance with embodiments described herein may be used in any suitable application. For example, light field prints manufactured in accordance with the techniques described herein may be used to create signage (e.g., advertising signage that, for example, might appear in backlit light boxes in airports, malls, bus stops and/or any other suitable locations). Signage may either have an integrated backlight, or it may be installed as a rigid or flexible multi-layer print inserted into an existing back light box. As another example, light field prints manufactured in accordance with the techniques described herein may be used to create souvenirs and/or keepsakes (e.g., a light field print of a person's face created from a 3D scan of the person's head, sports memorabilia, architectural and/or any other suitable type of memorabilia). As another example, light field prints manufactured in accordance with the techniques described herein may be used to create logos, promotional materials, instructional materials, and/or any other suitable type of materials used in a business environment.

As yet another example, in some embodiments, light field prints manufactured in accordance with the techniques described herein may be used as glass décor (e.g., window décor), interior decoration, interior branding and/or artwork.

Figure 31:
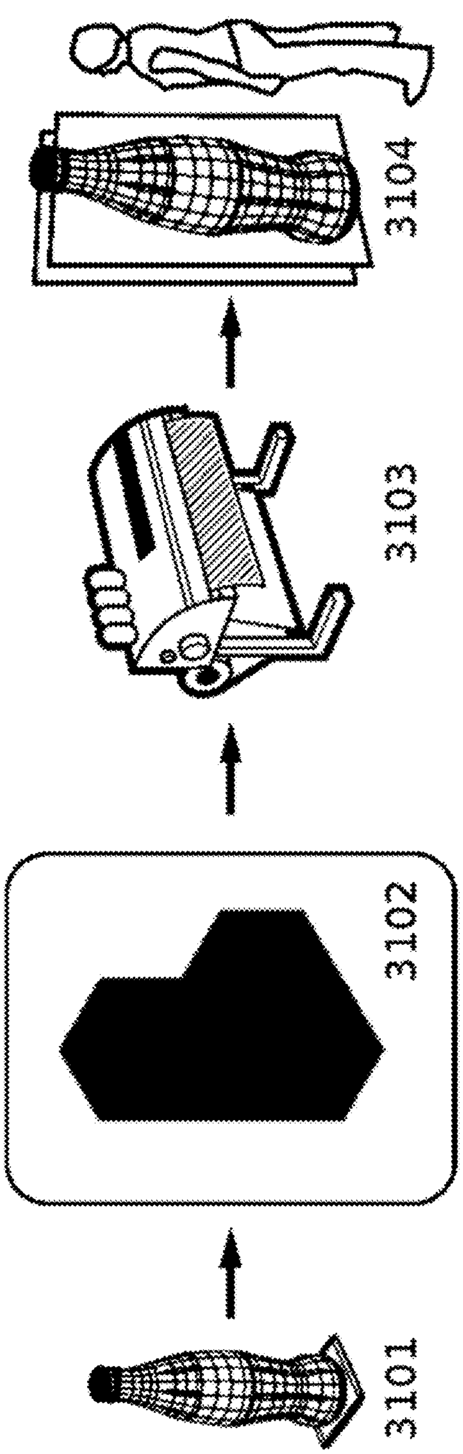
FIG. 31 illustrates an example of a print service, in accordance with some embodiments of the technology described herein.

FIG. 31 shows a description of print service, indicating its use in advertising signage. In some embodiments of the print service, a 3D model is stored on a computer 3101. The 3D model may comprise a scene description, which may be represented, for example, as a CAD file, a depth map, the OBJ file format, Collada file format 3D Studio file format, three .js JSON file format, or scene meant for ray tracing such as a POV-Ray scene or Nvidia Optix program. In some embodiments, the 3D model comprises a plurality of 2D layers, with said 2D layer to be shown at one or more depths in a 3D scene. In some embodiments, 2D file formats, which include without limitation Adobe Photoshop files, Adobe Illustrator files, bitmap images, vector images, may be upconverted through a 3D upconversion process to create 3D models. In some embodiments, 2D files containing layer information may be upconverted to 3D models by separating existing layers in depth.

In some embodiments, a 3D model may submitted to the print service 3102. The submission may comprise transmitting a file via the Internet. In some embodiments 3D, model submission may take place via a web service, whereby 3D models submitted to the web service may be stored on a remote server. In some embodiments, 3D models may be created in a web browser and submitted to the print service 3102 via transmission over the Internet. In some embodiments, 3D models may be combined and edited once submitted to the print service. In some embodiments, 3D models may be submitted to the print service from a mobile device (e.g., a tablet, laptop, smart phone, appliance, etc.).

In some embodiments, the print service may allow users to import 3D models from partner web services. The importing may include selecting one or more models from a partner web service, and communicating said models or selections to the print service. The communicating may comprise using of an API or a partner API. In some embodiments, the print service may provide database of stock content from which users may create 3D scenes to be printed via the print service. The stock content provided by the print service may be free or may be available by a fee or subscription. The stock content may be provided by other users of the print service for free or for a fee. The stock content may be available on a market on the print service, and provided by a third party. The market may be a fee, barter, or trade market.

In some embodiments, 3D models submitted to the print service may be previewed upon submission. Said preview may show the predicted outcome of printing or rendering the submitted 3D model with the print service. When creating said preview, the following inputs, without limitation, may be considered: 3D model contents, printer type, printer quality settings, algorithm inputs, algorithm settings, ordered viewing angle, viewing location, environmental lighting, backlight unit type, print medium type, print inks, available compute time, product type, payment type or plan, print lifetime, and print environmental exposure.

In some embodiments, the preview available in the print service may be presented on a standard 2D screen. In other embodiments, the print service may allow for preview using glasses-free 3D screens, stereo or multi-view screens, glasses-based 3D screens, virtual reality headsets, augmented reality headsets, or augmented reality on a mobile device such as a smartphone or tablet. In the case of said augmented reality previews, the preview may be physically located, said physical location comprising the intended location of a print to be produced with the print service, or another similar or dissimilar location. In some embodiments the user of the print service may have the opportunity to approve or reject the print, for example, based on cost estimates provided by the print service and/or previews of the final product.

In some embodiments, a user may initiate a printing process using the print service. The initiation may involve a payment, clicking a button using a browser, or providing verbal input to technician or by means of a kiosk at a storefront.

Upon initiation, the print service may process the submitted 3D scene description or 3D model according to the methods disclosed herein. Said processing may generate target patterns for printing using techniques described herein. The generated target patterns may be compensated to produce a compensated patterns using techniques described herein. The target patterns or compensated target patterns may be sent to a printer 3103 (e.g., a conventional roll inkjet printer as pictured, or a UV flatbed printer, or any other type of process that can modify the transparency of a transparent material). The printer may create multiple printed layer from the target patterns or compensated target patterns sent to the printer. The printed layers may be aligned after printing, though in some embodiments they may be aligned at print time. The aligned printed layers may be placed in front of a light box 3104, such as a light box used for commercial signage applications. Such light boxes may be found at transit stations, malls, movie theaters, and many other commercial locations, as well as private showrooms, and homes, and entertainment venues and museums, and/or any other suitable locations. In some embodiments, the print service places prints in front of light boxes. In some embodiments, the print service coordinates with a partner organization to print and distribute prints to light boxes. In some embodiments, the print service may offer user tracking or face tracking devices to be co-installed with a printed sign. The tracking device may measure user engagement.

In some embodiments the above service may comprise a digital display service rather than a printed display service. In such embodiments actuation signals will be generated from submitted 3D scene descriptions or 3D models. In some embodiments actuation signals will be transmitted to digital displays comprising multiple optical modulators. In some embodiments said transmission may occur over the internet. In some embodiments the digital displays may be coupled with a tracking device to measure quantities related to viewership, by way of example and not limitation, user engagement, number of viewers, and type of viewers. In some embodiments said measured quantities may be used to tailor the content of said digital display.

In some embodiments, a light field print may be realized as light attenuating patterned material and may be attached to both sides of a glass surface (e.g., a window). The patterned material may include film that has been printed, a color layer directly applied on the glass surface, and/or material that has been machined or molded to contain a light attenuating pattern. The patterns on the patterned material may be printed according to how light rays should be attenuated when passing through the glass surface, depending on the point at which a ray passes and the angle of the ray.

Figure 33:
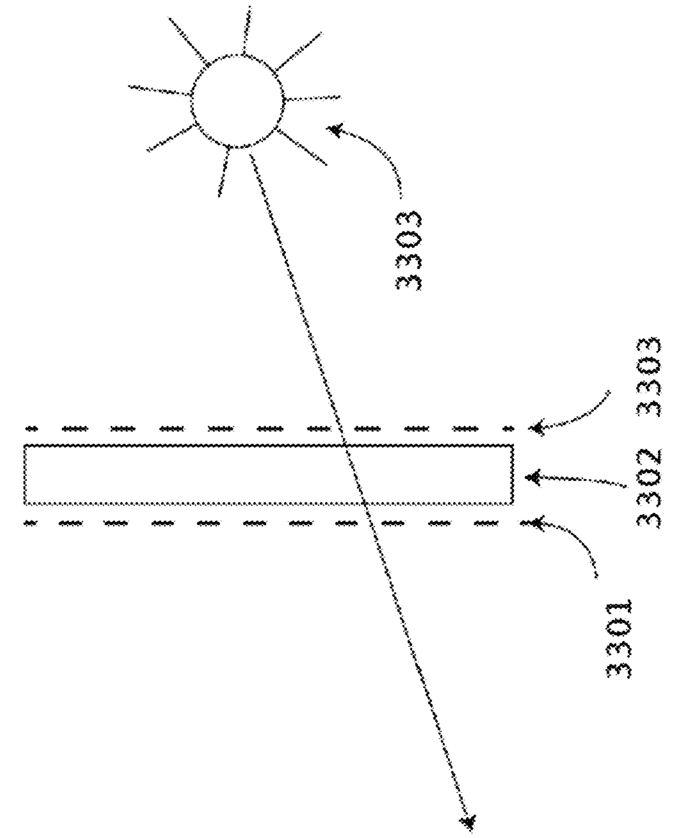
FIGS. 32 and 33 show an example light field print for use with a glass surface, such as a window, in accordance with some embodiments of the technology described herein.
Figure 32:
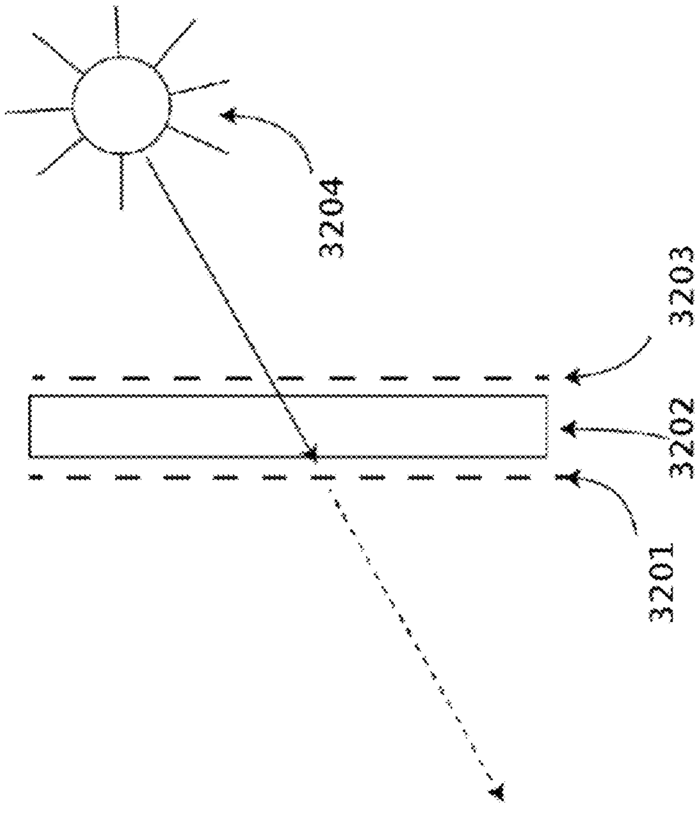

For example, when the glass surface is a window, the window may block sunlight at a certain angle (e.g., as shown in FIG. 32), and pass it at another angle (e.g., as shown in FIG. 33). In some embodiments, the patterns deposited on a window may be generated, according to the latitude, longitude and/or orientation of the window, which corresponds to different sunlight angles at specific time of the day and year. FIG. 32 illustrates blocking sun-light at a certain angle and shows light attenuating layers 3201 and 3203, window surface 3202, and sun 3204. FIG. 33 illustrates passing a sun ray and shows light attenuating layers 3301 and 3303, window surface 3302, and sun 3304.

In some embodiments, light attenuating patterned material may be manufactured to block man made light, such as for selectively attenuating light of passing cars, streetlamps, advertisements or preventing light leakage from inside a room. In some embodiments, light attenuating patterned material may be manufactured to display 3D content, such as graphics or logos, that would be part of interior and/or exterior branding.

In some embodiments, light attenuating patterned material may block light rays in one direction, but may include colors that reflect in another direction, thereby display 2D graphics when viewed from the same side at which a light source is located.

Figure 34:
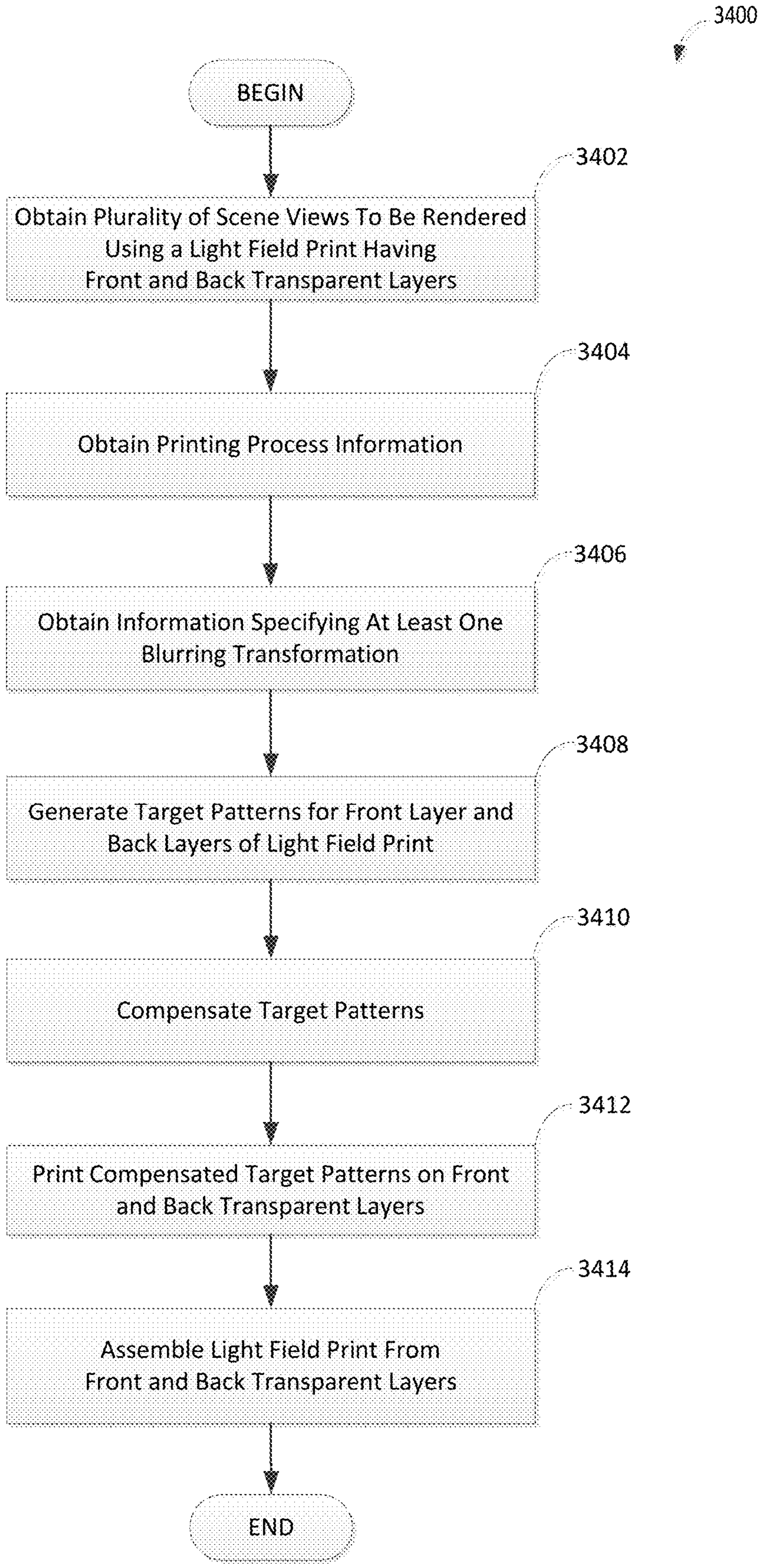
FIG. 34 is a flowchart of an illustrative process 3400 for manufacturing a light field print, in accordance with some embodiments of the technology described herein.

FIG. 34 is a flowchart of an illustrative process 3400 for manufacturing a light field print, in accordance with some embodiments of the technology described herein. Process 3400 may be performed by any suitable system including, for example, system 110 or system 2600.

Process 3400 begins at act 3402, where a plurality of scene views may be obtained, which scene views are to be rendered using a light field print being manufactured via process 3400. Each of the plurality of scene views may correspond to a location of a viewer of the light field print. As described herein, the scene views may be of a natural or a synthetic scene. Each scene view may comprise a grayscale and/or a color image of any suitable resolution for each of one or more (e.g., all) of the scene views. Any suitable number of scene views may be obtained at act 1502 (e.g., at least two, at least ten, at least fifty, at least 100, at least 500, between 2 and 1000, between 10 and 800, or in any other suitable combination of these ranges), as aspects of the technology provided herein are not limited in this respect.

In some embodiments, the scene views may be obtained by accessing and/or receiving one or more images from at least one image source (e.g., accessing stored images, receiving images from another application program or remote computing device). In some embodiments, the scene views may be obtained by first obtaining a description of a 3D scene (e.g., a 3D model of a scene) and then generating, as part of process 3400, the scene views based on the obtained description of the 3D scene.

Next, process 3400 proceeds to act 3404, where printing process information may be obtained. Printing process information may include any of the information 116 described with reference to FIG. 1B and, for example, may include layer geometry information, color model information, print resolution information, and/or any information that may be used for compensating the target patterns for print dynamics (e.g., at act 3410). In some embodiments, layer geometry information may include information describing the size, shape, and position of the layers relative to one another in the light field print to be assembled. For example, layer geometry information may indicated that each of the layers is a plane and 11 inches in width and 17 inches in height, and that the layers may be spaced apart 0.045 inches in the light field print to be assembled. As another example, the layers may be curved shapes that are to be spaced apart at a displacement of 0.06 inches relative to the surface normal in the light field print to be assembled. Layer geometry information may be expressed as a geometric model in a software package (e.g., AUTOCAD) or as a file (e.g., an OBJ file).

In some embodiments, color model information may specify a color model that represents the color channels available (e.g., the available ink channels and ink set in a set of print heads) and/or optical properties of an ink set (e.g., spectral properties, information about how colors interact with one another when ink of one color is overlaid on ink of another color). Additionally or alternatively, the color model may include any information embedded in a printer profile (e.g., an ICC device profile), and may contain information about how to map the device color space (e.g., in the language of PostScript, a DeviceN or DeviceCMYK space) to a standard color space (e.g., sRGB). The color model may describe the optical properties of ink colors, non-limiting examples of which include cyan, magenta, yellow, black, light cyan, light magenta, orange, green, red, violet, light black, light light black, matte black, glossy black, clear inks, emissive inks, gloss optimizers, and specific standardized colors such as Pantone colors.

In some embodiments, print resolution information may include the number of addressable dot centers per inch, both in the horizontal and vertical dimensions (e.g., horizontal and vertical DPI). Print resolution information may, additionally or alternatively, include the dot pitch or selection of dot pitches (dot radius or selection of dot radii) producible by the printing system (e.g., measured in inches or fractions thereof). An example dot pitch may be 1/800 inch.

Next, process 3400 proceeds to act 3406, where information specifying at least one blurring transformation may be obtained. The information specifying the at least one blurring transformation may specify one or multiple blurring transformations and may include information of any suitable type including, for example, any of information 114 described with reference to FIG. 1B.

Next, process 3400 proceeds to act 3408, where a plurality of actuation signals may be generated based on the plurality of scene views obtained at act 3402, printing process information obtained at act 3404, and information specifying at least one blurring transformation obtained at act 3406. This may be done in any of the ways described herein and, for example, by using any of the optimization techniques described with reference to FIGS. 2-13.

Next, process 3400 proceeds to act 3410, where the target patterns generated at act 3408 may be compensated for print and/or medium dynamics to obtain compensated target patterns (e.g., compensated for effects of dot gain, for effects of printing material bleed, and for effects of maximum allowable printing material density). The compensation may be performed in any of the ways described herein or in any other suitable way.

Next, process 3400 proceeds to act 3412, where the compensated target patterns are printed on the front and back transparent layers using a printer of any suitable type including any of the types described herein or any other technique for depositing the compensated target patterns onto the layers. After the target patterns are printed onto the layers, the layers may be assembled at act 3414 to create the light field print. Assembling layers into a light field print may include, for example, aligning the prints and adhering them to one another (e.g., using an adhesive or any other suitable means). After act 3414, process 3400 completes.

It should be appreciated that process 3400 is illustrative and that there are variations. For example, in some embodiments, one or more of acts 3406 and/or 3410 may be omitted.

VII. Additional Implementation Detail

Figure 35:
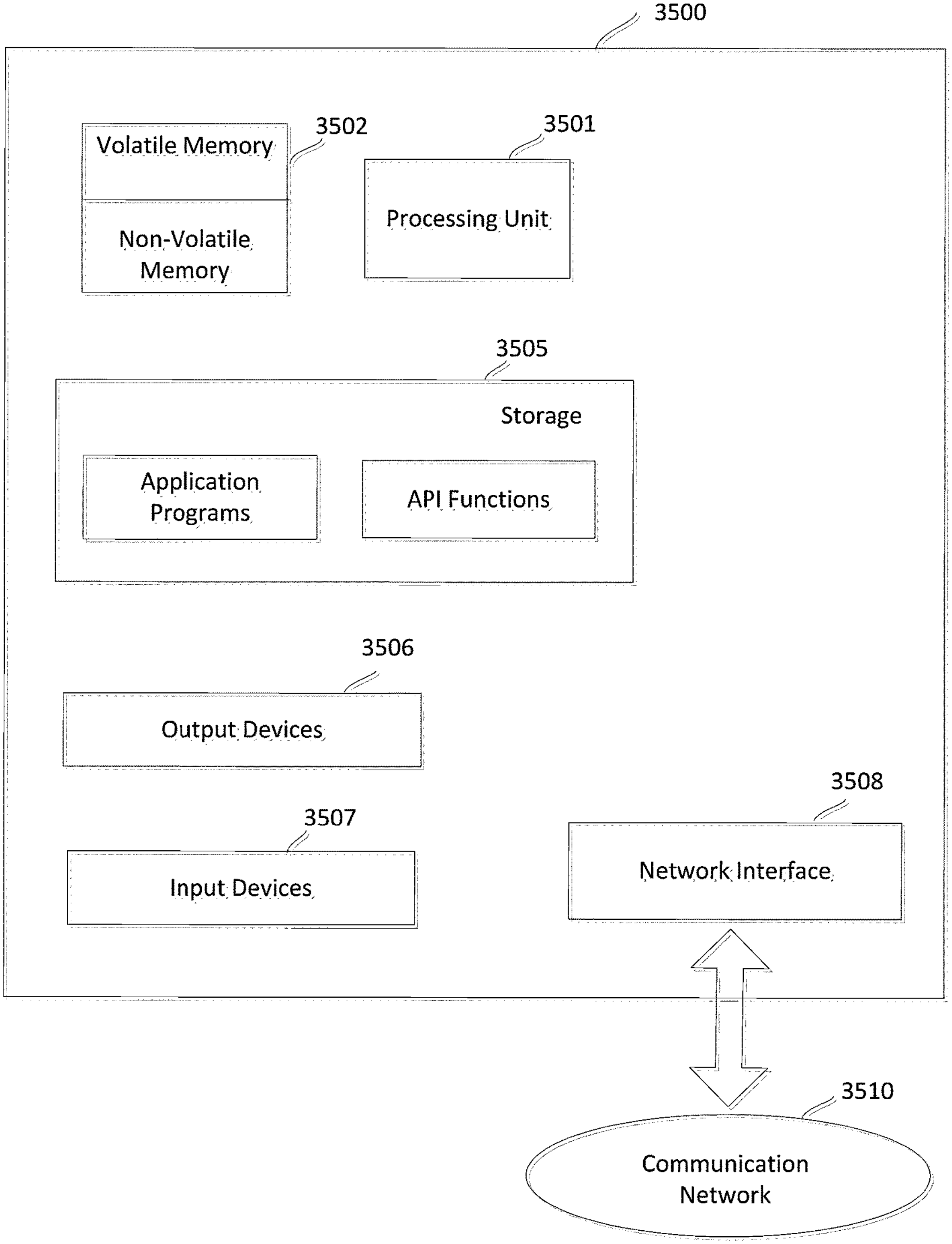
FIG. 35 shows, schematically, an illustrative computer 3500 on which any aspect of the technology described herein may be implemented.

In the embodiment shown in FIG. 35, the computer 3500 includes a processing unit 3501 having one or more processors and a non-transitory computer-readable storage medium 3502 that may include, for example, volatile and/or non-volatile memory. The memory 3502 may store one or more instructions to program the processing unit 3501 to perform any of the functions described herein. The computer 3500 may also include other types of non-transitory computer-readable medium, such as storage 3505 (e.g., one or more disk drives) in addition to the system memory 3502. The storage 3505 may also store one or more application programs and/or resources used by application programs (e.g., software libraries), which may be loaded into the memory 3502.

The computer 3500 may have one or more input devices and/or output devices, such as devices 3506 and 3507 illustrated in FIG. 35. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards and pointing devices, such as mice, touch pads, and digitizing tablets. As another example, the input devices 3507 may include a microphone for capturing audio signals, and the output devices 3506 may include a display screen for visually rendering, and/or a speaker for audibly rendering, recognized text.

As shown in FIG. 35, the computer 3500 may also comprise one or more network interfaces (e.g., the network interface 3508) to enable communication via various networks (e.g., the network 3510). Examples of networks include a local area network or a wide area network, such as an enterprise network or the Internet. Such networks may be based on any suitable technology and may operate according to any suitable protocol and may include wireless networks, wired networks or fiber optic networks.

In some embodiments, an active display may comprise an arrangement of active electro-optical elements whose actuation signals dynamically specify their various optical properties, for example light transmission in the case of an LCD element stacked between front and rear polarization layers.

In some embodiments, actuation signals may comprise a set of controllable variables that determine the optical behavior of elements in an optical stack. For example, pixel intensity values sent to a printer would be actuation signals determining light attenuation on a printed transparency; pixel (color) values sent to a color LCD panel without a backlight but including front and rear polarizers would be actuation signals determining light attenuation by the panel. Values of actuation signals may be determined using any of the techniques described herein. In some instances, the value of an actuation signal may be fixed.

In some embodiments, a light field may comprise the spatio-angular distribution of light in an environment. For example, the surface of a multi-layer optical stack may have a well-defined light-field, as would the natural environment surrounding a person.

In some embodiments, an optical stack may comprise a general arrangement of passive and active optical and electro-optical elements, including: LCDs, OLEDs, polarizers, wave retarders, backlights, other illumination sources, color filters, lenses, lenslet arrays, parallax barriers, optical splitters, optical combiners, diffractive elements, holographic elements, and optical films.

In some embodiments, a parametric display may comprise to a multi-view display wherein the mapping between actuation signals and the spatio-angular intensity distribution emitted from the display is non-linear (e.g., wherein the parameters are not readily interpretable as basis coefficients in a basis expansion of the spatio-angular intensity distribution).

In some embodiments, a passive display may refer to an arrangement of passive, fixed optical elements whose actuation signals specify their various optical properties, for example light transmission in the case of a printed transparent medium. A passive display may include an active (energy-consuming) or passive backlight.

In some embodiments, a multiplicative layer may comprise an optical element having a multiplicative effect on light intensity, where intensity is multiplied by some general nonlinear function of the associated actuation signal. For example, the non-linear function may incorporate a gamma curve or other perceptual intensity curve.

In some embodiments, a modulating layer may comprise to an active or passive optical element whose optical properties are controlled.

In some embodiments, a backlight may provide illumination for one or more transmissive components of a display device. The transmissive components may be optically closer to a viewer, compared to the backlight, which may be optically further from the viewer.

In some embodiments, "intensity" may refer to any measure of or related to intensity, energy, or power. For example, the "intensity" of light includes any of the following measures: irradiance, spectral irradiance, radiant energy, radiant flux, spectral power, radiant intensity, spectral intensity, radiance, spectral radiance, radiant exitance, radiant emittance, spectral radiant exitance, spectral radiant emittance, radiosity, radiant exposure and radiant energy density.

Aspects of the technology described herein may have the following configurations.

(1) An optimization-based multi-view display system, comprising two or more modulating layers.

(2) A parametric, multi-view display system, comprising two or more modulating layers.

(3) The system according to (1), wherein the viewer position is utilized in determining the optimization problem.

(4) The system of according to (1), wherein the ambient light intensity is utilized in determining the optimization problem.

(5) The system of according to (1), wherein the ambient light direction is utilized in determining the optimization problem.

(6) The system according to (1) wherein the number of viewers is utilized in determining the optimization problem.

(7) The system according to (1) wherein the content to be shown on the display is utilized in determining the optimization problem.
(8) The system according to (1) wherein the defects in one or more viewers' visual systems is utilized in determining the optimization problem.
(9) The system according to (1) wherein the interocular spacing of the viewer is utilized in determining the optimization problem.
(10) The system according to (1) wherein the display is integrated into a device, and wherein the power consumption requirement of said device is utilized in determining the optimization problem.
(11) The system according to (1) wherein the display is integrated into a device, and wherein the device orientation with respect to a viewer or viewers is utilized in determining the optimization problem.
(12) The system according to (2) wherein the viewer position is utilized in determining the parametric mapping.
(13) An optimization-based multi-view display system, comprising two or more modulating layers wherein the spatial sample rate, i.e. the spatial sample density, of the modulation patterns on the layers differs by at least one part in 1000.
(14) The system according to (13) wherein the spatial sample rate of the layers is selected so as to adjust the frequency of moiré interference observed by a viewer.
(15) The system according to (13) wherein the spatial sample rate of the layers is selected so as to reduce the computational cost of rendering content for the display.
(16) The system according to (1) wherein the image elements of each modulating layer are updated non-sequentially.
(17) The system according to (16) wherein the order of updates of the image elements of each modulating layer is the partial or final result of an optimization problem.
(18) The system according to (1) wherein the update rate of the displays is adjusted according to the spatio-temporal complexity of the content to be displayed.
(19) The system according to (1) wherein the displayed multi-view images are interpreted by a human viewer to represent one or more virtual objects that extend over a depth range in a region in front of the display, behind the display, or both; and wherein the modulating layers are spaced in depth at a distance between 30% and 40% of the maximum depth extent (i.e. the maximum achievable front-to-back scene depth, of a virtual object or virtual objects shown on the display).
(20) The system according to (1) wherein the displayed multi-view images are interpreted by a human viewer to represent one or more virtual objects that extend over a depth range in a region in front of the display, behind the display, or both; and wherein the modulating layers are spaced in depth at a distance less than 30% of the maximum depth extent, i.e. the maximum front-to-back scene depth, of a virtual object or virtual objects shown on the display.
(21) The system according to (1) wherein the displayed multi-view images are interpreted by a human viewer to represent one or more virtual objects that extend over a depth range in a region in front of the display, behind the display, or both; and wherein the optimization problem utilizes the temporal band limit of the human visual system in creating the actuation signals; and wherein the modulating layers are spaced in depth at a distance between 20% and 40% of the maximum depth extent, i.e. the maximum achievable front-to-back scene depth, of a virtual object or virtual objects shown on the display.
(22) The system according to (1) wherein the displayed multi-view images are interpreted by a human viewer to represent one or more virtual objects that extend over a depth range in a region in front of the display, behind the display, or both; and wherein the optimization problem utilizes the temporal band limit of the human visual system in creating the actuation signals; and wherein the modulating layers are spaced in depth at a distance less than 30% of the maximum depth extent, i.e. the maximum front-to-back scene depth, of a virtual object or virtual objects shown on the display.
(23) The system according to (1) wherein the modulating layers are spaced in depth at a distance less than 6 mm.
(24) The system according to (23) wherein the optimization problem utilizes a band-limited perceptual model, e.g. the spatial band limit of the human visual system, in creating the actuation signals
(25) The system according to (1) wherein there exists one or more preferred depths in a virtual scene, to be displayed on an optimized display, for high resolution text and graphics to be displayed; and wherein one or more of the physical display layers is placed at one or more of said preferred depths.
(26) The system according to (1) wherein color images are shown by means of attaching color filter arrays to the modulating elements of the modulating layers; and, wherein the color channels of the display are optimized jointly.
(27) The system according to (26) wherein a characterization of the crosstalk between color filters in the color filter arrays is utilized in the optimization algorithm.
(28) The system according to (26) wherein a wider color gamut is obtained in the displayed images as compared to a single-layer display.
(29) The system according to (26) wherein the color filters used in the color filter arrays are identical among the modulating layers.
(30) The system according to (26) wherein the color filters used in the color filter arrays of each layer of the multi-layer display have a full-width half-max response of 70 nm or more.
(31) The system according to (26) wherein the color filters used in the color filter arrays of each layer of the multi-layer display have a full-width half-max response of more than 100 nm.
(32) The system according to (1) wherein color images are shown by means of attaching color filter arrays to the modulating elements of only one modulating layer.
(33) The system according to (32) wherein the images to be shown are decomposed into a luminance channel that is sampled at the same sample rate as the modulators comprising the display layers, and a chrominance channel that is subsampled below the rate of said modulators.
(34) The system according to (1) wherein the reflected light path between the display layers is modeled in the optimization problem that creates the actuation signals.
(35) The system according to (34) wherein the displayed multi-view images are interpreted by a human viewer to represent one or more virtual objects that extend over a depth range in a region in front of the display, behind the display, or both; and wherein the reflected light path between layers is exploited to extend said depth range to a distance of at least 1.5 times the spacing between the layers.
(36) An optimization-based multi-view display system, comprising three or more modulating layers wherein diffusers are placed between the display layers; and wherein said diffusers have weights that determine a degree of optical blur; and wherein said diffuser weights are selected such that the degree of optical blur reduces the observed moiré interference.

(37) The system according to (1) wherein the optimization result is constrained to binary values (fully opaque or fully transparent).

(38) The system according to (37) wherein the modulating layers are made from LCD panels; and wherein the LCD panels are binary Pi cells.

(39) The system according to (37) wherein the modulating layers are made from LCD panels; and wherein the LCD panels are binary ferroelectric liquid crystal arrays.

(40) The system according to (37) wherein the modulating layers are made from MEMS shutter devices.

(41) The system according to (37) wherein the modulating layers are made from MEMS mirror devices with accompanying optical elements.

(42) The system according to (1) wherein the modulating elements of the modulating layers have fewer than 8-bits of precision (low bit depth); and wherein the final or intermediate solution to the optimization problem is quantized to the precision of the display devices.

(43) The system according to (42) wherein the modulating elements of the modulating layers have fewer than 8-bits of precision (low bit depth); and wherein at least one such low bit depth modulating layer is an LCD panel.

(44) The system according to (1) wherein the contrast of at least one of the modulating layers is less than 1:100.

(45) The system according to (44) wherein the layer with contrast below 1:100 is made from an LCD.

(46) The system according to (1) wherein at least one layer comprises an array of light emitting diodes; and wherein at least one layer comprises a light attenuating modulator; and wherein said layers comprising an array of light emitting diodes is placed behind at least one of said layers comprising a light attenuating modulator, from the perspective of a viewer.

(47) The system according to (1) wherein at least one of the modulating layers comprises a passive, patterned light attenuating material.

(48) The system according to (47) wherein said passive material comprises a transparent plastic sheet, patterned with ink.

(49) The system according to (48) wherein the ink is deposited by an inkjet printer

(50) The system according to (47) wherein said passive material comprises a transparent plastic sheet, patterned by toner, e.g. from a laser printer or other electrostatic printing method.

(51) The system according to (47) wherein said passive material comprises a glass sheet patterned by ink.

(52) The system according to (47) wherein said passive material comprises an optically-exposed film, e.g. a photomask.

(53) The system according to (47) wherein said passive material has been patterned using a chromogenic process.

(54) The system according to (1) wherein at least one of the modulating layers comprises a passive, machined layer.

(55) The system according to (54) wherein the machined layer is made from wood.

(56) The system according to (54) wherein the machined layer is made from metal.

(57) The system according to (54) wherein the machined layer is made from opaque plastic.

(58) The system according to (47) wherein the spacing between the modulating layers is less than 5 mm.

(59) The system according to (47) wherein the spacing between the modulating layers is less than 60 times the width of the smallest feature size of the modulating layer.

(60) An optimization-based multi-view display system, comprising at least one modulating layer, and at least one reflective layer.

(61) The system according to (60) wherein the position of an incident light source is utilized in the optimization; and wherein the position of the viewer is utilized in the optimization.

(62) The system according to (61) wherein the reflective layer has a diffuse lobe.

(63) The system according to (60) wherein the reflective layer is also a modulating layer.

(64) The system according to (63) wherein the reflective layer comprises an e-ink or e-paper display.

(65) The system according to (61) wherein the reflective layer is also transmissive.

(66) The system according to (65) wherein the reflective and transmissive layer comprises a transflective LCD.

(67) The system according to (1) wherein the display is illuminated by a backlight unit; and wherein the backlight unit emits more than 90% of the total light emitted by said backlight unit over the angular region containing the expected viewing locations of the display.

(68) The system according to (1) wherein the system provides a 3D dash display in a vehicle.

(69) The system according to (1) wherein the system provides a 3D instrument cluster in a vehicle.

(70) The system according to (1) wherein the system provides a 3D control surface in a vehicle.

(71) The system according to (1) wherein the system provides a 3D user interface on a smartphone.

(72) The system according to (1) wherein the system provides a 3D user interface on a tablet computer.

(73) The system according to (1) wherein the system provides a 3D user interface on a laptop computer.

(74) The system according to (1) wherein the system provides a 3D user interface on a desktop computer.

(75) The system according to (1) wherein the system provides a 3D user interface on a workstation computer.

(76) The system according to (1) wherein the system provides a 3D visualization on a CAD workstation.

(77) The system according to (1) wherein the system provides a 3D view of an architectural model.

(78) The system according to (1) wherein the system provides a 3D screen for watching stereoscopic video content.

(79) The system according to (1) wherein the system provides a 3D screen for watching multi-view television or other multi-view video content.

(80) The system according to (79) wherein the display is in a private home.

(81) The system according to (79) wherein the display is in a movie theater.

(82) The system according to (1) wherein the system provides a 3D gaming experience.

(83) The system according to (82) wherein the 3D gaming experience is on a mobile device.

(84) The system according to (82) wherein the 3D gaming experience is in a private home.

(85) The system according to (82) wherein the 3D gaming experience is on a desktop computer.

(86) The system according to (82) wherein the 3D gaming experience is on a console gaming system.

(87) The system according to (82) wherein the 3D gaming experience is in a public arcade.

(88) The system according to (1) wherein the system provides a 3D view of medical imaging data.
(89) The system according to (1) wherein the system provides a 3D view of volumetric medical scans.
(90) The system according to (1) wherein the system provides a 3D view medical chart data or vital patient data.
(91) The system according to (1) wherein the system provides a 3D view of seismic imaging data.
(92) The system according to (1) wherein the system provides a 3D view of microscopic structures.
(93) The system according to (1) wherein the system provides a 3D view of trends in large data sets.
(94) The system according to (1) wherein the system provides a 3D view of financial data.
(95) The system according to (1) wherein the system provides a 3D medium for artistic works.
(96) The system according to (1) wherein the system provides a 3D advertisement.
(97) The system according to (1) wherein the system provides a 3D announcement.
(98) The system according to (1) wherein the system provides a 3D visualization for remote vehicle operation.
(99) The system according to (98) wherein the vehicle is airborne.
(100) The system according to (98) wherein the vehicle is submersible.
(101) The system according to (98) wherein the vehicle travels over land.
(102) The system according to (98) wherein the vehicle operates in space.
(103) The system according to (98) wherein the vehicle works on extraplanetary bodies.
(104) The system according to (1) wherein the system provides a 3D visualization for controlling a fleet of autonomous vehicles.
(105) The system according to (1) wherein the system provides 3D teleconferencing.
(106) The system according to (1) wherein the system provides 3D telepresence.
(107) The system according to (1) wherein the system provides 3D teleoperation.
(108) The system according to (47) wherein the system provides a 3D graphic or text functioning as an indicator light.
(109) The system according to (47) wherein the system provides a 3D graphic or text functioning as an emblem in a control panel for an electronic system.
(110) The system according to (47) wherein the system provides a 3D graphic or text functioning as a label for or on a switch, button, capacitive-touch button, knob, slide control, optical proximity sensor or other physical control element or surface.
(111) The system according to (47) wherein the system provides a 3D graphic or text overlaid on an external light in a vehicle, e.g. a brake light, tail light or other external illuminated surface.
(112) The system according to (47) wherein the system provides a 3D advertisement.
(113) The system according to (47) wherein the system provides a 3D announcement.
(114) The system according to (47) wherein layers in the system are adhered to glass, e.g. a window.
(115) The system according to (1) wherein the displayed multi-view images are interpreted by a human viewer to represent one or more virtual objects; and wherein the said virtual objects appear to coexist with true objects in the physical world as perceived by a human viewer; and wherein the virtual objects appear to have 3D shape.
(116) The system according to (115) wherein the light emitted from the system is viewed by a viewer through a semi-reflective screen.
(117) The system according to (116) wherein said semi-reflective screen is the windshield of a car.
(118) The system according to (116) wherein said semi-reflective screen is the cockpit of an aircraft.
(119) The system according to (116) wherein said semi-reflective screen is the window of a building or structure.
(120) The system according to (116) wherein the light emitted from the modulating layers is transmitted through a lens.
(121) The system according to (116) wherein the light emitted from the modulating layers is transmitted through a catadioptric system.
(122) The system according to (116) wherein the light emitted from the modulating layers is transmitted through a system of curved mirrors.
(123) The system according to (2) wherein the viewer position is utilized in determining the parametric mapping.
(124) The system according to (2) wherein the ambient light intensity is utilized in determining the parametric mapping.
(125) The system according to (2) wherein the ambient light direction is utilized in determining the parametric mapping.
(126) The system according to (2) wherein the number of viewers is utilized in determining the parametric mapping.
(127) The system according to (2) wherein the content to be shown on the display is utilized in determining the parametric mapping.
(128) The system according to (2) wherein the defects in one or more viewers' visual systems is utilized in determining the parametric mapping.
(129) The system according to (2) wherein the interocular spacing of the viewer is utilized in determining the parametric mapping.
(130) The system according to (2) wherein the viewer position is utilized in determining the parametric mapping.
(131) An parametric multi-view display system, comprising two or more modulating layers wherein the spatial sample rate, i.e. the spatial sample density, of the modulation patterns on the layers differs by at least one part in 1000.
(132) The system according to (131) wherein the spatial sample rate of the layers is selected so as to adjust the frequency of moiré interference observed by a viewer.
(133) The system according to (131) wherein the spatial sample rate of the layers is selected so as to reduce the computational cost of rendering content for the display.
(134) The system according to (2) wherein the image elements of each modulating layer are updated non-sequentially.
(135) The system according to (134) wherein the order of updates of the image elements of each modulating layer is the partial or final result of an optimization problem.
(136) The system according to (2) wherein the update rate of the displays is adjusted according to the spatio-temporal complexity of the content to be displayed.
(137) The system according to (2) wherein the displayed multi-view images are interpreted by a human viewer to represent one or more virtual objects that extend over a depth range in a region in front of the display, behind the display, or both; and wherein the modulating layers are spaced in depth at a distance between 30% and 40% of the maximum depth extent, i.e. the maximum achievable front-to-back scene depth, of a virtual object or virtual objects shown on the display.

(138) The system according to (2) wherein the displayed multi-view images are interpreted by a human viewer to represent one or more virtual objects that extend over a depth range in a region in front of the display, behind the display, or both; and wherein the modulating layers are spaced in depth at a distance less than 30% of the maximum depth extent, i.e. the maximum front-to-back scene depth, of a virtual object or virtual objects shown on the display.

(139) The system according to (2) wherein the displayed multi-view images are interpreted by a human viewer to represent one or more virtual objects that extend over a depth range in a region in front of the display, behind the display, or both; and wherein the optimization problem utilizes the temporal band limit of the human visual system in creating the actuation signals; and wherein the modulating layers are spaced in depth at a distance between 20% and 40% of the maximum depth extent, i.e. the maximum achievable front-to-back scene depth, of a virtual object or virtual objects shown on the display.

(140) The system according to (2) wherein the modulating layers are spaced in depth at a distance less than 6 mm.

(141) The system according to (140) wherein the optimization problem utilizes a band-limited perceptual model, e.g. the spatial band limit of the human visual system, in creating the actuation signals.

(142) The system according to (2) wherein there exists one or more preferred depths in a virtual scene, to be displayed on a parametric display, for high resolution text and graphics to be displayed; and wherein one or more of the physical display layers is placed at one or more of said preferred depths.

(143) The system according to (2) wherein color images are shown by means of attaching color filter arrays to the modulating elements of the modulating layers; and wherein the parameters representing color channels of the display are considered jointly.

(144) The system according to (143) wherein a wider color gamut is obtained in the displayed images as compared to a single-layer display.

(145) The system according to (143) wherein the color filters used in the color filter arrays are identical among the modulating layers.

(146) The system according to (143) wherein the color filters used in the color filter arrays of each layer of the multi-layer display have a full-width half-max response of 70 nm or more.

(147) The system according to (143) wherein the color filters used in the color filter arrays of each layer of the multi-layer display have a full-width half-max response of more than 100 nm.

(148) The system according to (2) wherein color images are shown by means of attaching color filter arrays to the modulating elements of only one modulating layer.

(149) The system according to (148) wherein the images to be shown are decomposed into a luminance channel that is sampled at the same sample rate as the modulators comprising the display layers, and a chrominance channel that is subsampled below the rate of said modulators.

(150) The system according to (2) wherein the reflected light path between the display layers is included in the parameter space of the display.

(151) The system according to (150) wherein the displayed multi-view images are interpreted by a human viewer to represent one or more virtual objects that extend over a depth range in a region in front of the display, behind the display, or both; and wherein the reflected light path between layers is exploited to extend said depth range to a distance of at least 1.5 times the spacing between the layers.

(152) A parametric multi-view display system, comprising three or more modulating layers wherein diffusers are placed between the display layers; and wherein said diffusers have weights that determine a degree of optical blur; and wherein said diffuser weights are selected such that the degree of optical blur reduces the observed moiré interference.

(153) The system according to (2) wherein the optimization result is constrained to take on binary values (fully opaque or fully transparent).

(154) The system according to (153) wherein the modulating layers are made from LCD panels; and wherein the LCD panels are binary Pi cells.

(155) The system according to (153) wherein the modulating layers are made from LCD panels; and wherein the LCD panels are binary ferroelectric liquid crystal arrays.

(156) The system according to (153) wherein the modulating layers are made from MEMS shutter devices.

(157) The system according to (153) wherein the modulating layers are made from MEMS mirror devices with accompanying optical elements.

(158) The system according to (2) wherein the modulating elements of the modulating layers have fewer than 8-bits of precision (low bit depth); and wherein the parameter space is quantized to the precision of the display devices.

(159) The system according to (158) wherein the modulating elements of the modulating layers have fewer than 8-bits of precision (low bit depth); and wherein at least one such low bit depth modulating layer is an LCD panel.

(160) The system according to (2) wherein the contrast of at least one of the modulating layers is less than 1:100.

(161) The system according to (160) wherein the layer with contrast below 1:100 is made from an LCD.

(162) The system according to (2) wherein at least one layer comprises an array of light emitting diodes; and wherein at least one layer comprises a light attenuating modulator; and wherein said layers comprising an array of light emitting diodes is placed behind at least one of said layers comprising a light attenuating modulator, from the perspective of a viewer.

(163) The system according to (2) wherein at least one of the modulating layers comprises a passive, patterned light attenuating material.

(164) The system according to (163) wherein said passive material comprises a transparent plastic sheet, patterned with ink.

(165) The system according to (164) wherein the ink is deposited by an inkjet printer (166) The system according to (163) wherein said passive material comprises a transparent plastic sheet, patterned by toner, e.g. from a laser printer or other electrostatic printing method.

(167) The system according to (163) wherein said passive material comprises a glass sheet patterned by ink.

(168) The system according to (163) wherein said passive material comprises an optically-exposed film, e.g. a photomask.

(169) The system according to (163) wherein said passive material has been patterned using a chromogenic process.

(170) The system according to (2) wherein at least one of the modulating layers comprises a passive, machined layer.

(171) The system according to (170) wherein the machined layer is made from wood.

(172) The system according to (170) wherein the machined layer is made from metal.

(173) The system according to (170) wherein the machined layer is made from opaque plastic.
(174) The system according to (165) wherein the spacing between the modulating layers is less than 5 mm.
(175) The system according to (165) wherein the spacing between the modulating layers is less than 60 times the width of the smallest feature size of the modulating layer.
(176) A parametric multi-view display system, comprising at least one modulating layer, and at least one reflective layer.
(177) The system according to (176) wherein the position of an incident light source is known by the system; and wherein the position of the viewer is known by the system.
(178) The system according to (177) wherein the reflective layer has a diffuse lobe.
(179) The system according to (177) wherein the reflective layer is also a modulating layer.
(180) The system according to (177) wherein the reflective layer comprises an e-ink or e-paper display.
(181) The system according to (177) wherein the reflective layer is also transmissive.
(182) The system according to (181) wherein the reflective and transmissive layer comprises a transflective LCD.
(183) The system according to (2) wherein the display is illuminated by a backlight unit; and wherein the backlight unit emits more than 90% of the total light emitted by said backlight unit over the angular region containing the expected viewing locations of the display.
(184) The system according to (2) wherein the system provides a 3D dash display in a vehicle.
(185) The system according to (2) wherein the system provides a 3D instrument cluster in a vehicle.
(186) The system according to (2) wherein the system provides a 3D control surface in a vehicle.
(187) The system according to (2) wherein the system provides a 3D user interface on a smartphone.
(188) The system according to (2) wherein the system provides a 3D user interface on a tablet computer.
(189) The system according to (2) wherein the system provides a 3D user interface on a laptop computer.
(190) The system according to (2) wherein the system provides a 3D user interface on a desktop computer.
(191) The system according to (2) wherein the system provides a 3D user interface on a workstation computer.
(192) The system according to (2) wherein the system provides a 3D visualization on a CAD workstation.
(193) The system according to (2) wherein the system provides a 3D view of an architectural model.
(194) The system according to (2) wherein the system provides a 3D screen for watching stereoscopic video content.
(195) The system according to (2) wherein the system provides a 3D screen for watching multi-view television or other multi-view video content.
(196) The system according to (195) wherein the display is in a private home.
(197) The system according to (195) wherein the display is in a movie theater.
(198) The system according to (2) wherein the system provides a 3D gaming experience.
(199) The system according to (198) wherein the 3D gaming experience is on a mobile device.
(200) The system according to (198) wherein the 3D gaming experience is in a private home.
(201) The system according to (198) wherein the 3D gaming experience is on a desktop computer.
(202) The system according to (198) wherein the 3D gaming experience is on a console gaming system.
(203) The system according to (198) wherein the 3D gaming experience is in a public arcade.
(204) The system according to (2) wherein the system provides a 3D view of medical imaging data.
(205) The system according to (2) wherein the system provides a 3D view of volumetric medical scans.
(206) The system according to (2) wherein the system provides a 3D view medical chart data or vital patient data.
(207) The system according to (2) wherein the system provides a 3D view of seismic imaging data.
(208) The system according to (2) wherein the system provides a 3D view of microscopic structures.
(209) The system according to (2) wherein the system provides a 3D view of trends in large data sets.
(210) The system according to (2) wherein the system provides a 3D view of financial data.
(211) The system according to (2) wherein the system provides a 3D medium for artistic works.
(212) The system according to (2) wherein the system provides a 3D advertisement.
(213) The system according to (2) wherein the system provides a 3D announcement.
(214) The system according to (2) wherein the system provides a 3D visualization for remote vehicle operation.
(215) The system according to (214) wherein the vehicle is airborne.
(216) The system according to (214) wherein the vehicle is submersible.
(217) The system according to (214) wherein the vehicle travels over land.
(218) The system according to (214) wherein the vehicle operates in space.
(219) The system according to (214) wherein the vehicle works on extraplanetary bodies.
(220) The system according to (2) wherein the system provides a 3D visualization for controlling a fleet of autonomous vehicles.
(221) The system according to (2) wherein the system provides 3D teleconferencing.
(222) The system according to (2) wherein the system provides 3D telepresence.
(223) The system according to (2) wherein the system provides 3D teleoperation.
(224) The system according to (163) wherein the system provides a 3D graphic or text functioning as an indicator light.
(225) The system according to (163) wherein the system provides a 3D graphic or text functioning as an emblem in a control panel for an electronic system.
(226) The system according to (163) wherein the system provides a 3D graphic or text functioning as a label for or on a switch, button, capacitive-touch button, knob, slide control, optical proximity sensor or other physical control element or surface.
(227) The system according to (163) wherein the system provides a 3D graphic or text overlaid on an external light in a vehicle, e.g. a brake light, tail light or other external illuminated surface.
(228) The system according to (163) wherein the system provides a 3D advertisement.
(229) The system according to (163) wherein the system provides a 3D announcement.
(230) The system according to (163) wherein layers in the system are adhered to glass, e.g. a window.
(231) The system according to (2) wherein the displayed multi-view images are interpreted by a human viewer to represent one or more virtual objects; and wherein the said virtual objects appear to coexist with true objects in the physical world as perceived by a human viewer; and wherein the virtual objects appear to have 3D shape.

(232) The system according to (231) wherein the light emitted from the system is viewed by a viewer through a semi-reflective screen.

(233) The system according to (231) wherein said semi-reflective screen is the windshield of a car.

(234) The system according to (231) wherein said semi-reflective screen is the cockpit of an aircraft.

(235) The system according to (231) wherein said semi-reflective screen is the window of a building or structure.

(236) The system according to (231) wherein the light emitted from the modulating layers is transmitted through a lens.

(237) The system according to (231) wherein the light emitted from the modulating layers is transmitted through a catadioptric system.

(238) The system according to (231) wherein the light emitted from the modulating layers is transmitted through a system of curved mirrors.

(239) A system for optimizing actuation signals for use in an active optimized light field display, wherein a band-limited perceptual model is utilized in performing the optimization.

(240) A system for optimizing actuation signals for use in an active optimized light field display, wherein a band-limited perceptual model is utilized in performing the optimization, and wherein the associated optical stack contains two or more active multiplicative layers, each containing four or more individually-selectable pixels.

(241) A system for optimizing actuation signals for use in an active optimized light field display, wherein a band-limited perceptual model is utilized in performing the optimization, and wherein the associated optical stack contains two or more active multiplicative layers, each containing four or more individually-selectable pixels or preconfigured attenuation patterns.

(242) A system for optimizing actuation signals for use in a passive optimized light field display, wherein a band-limited perceptual model is utilized in performing the optimization.

(243) A system for optimizing actuation signals for use in a light field emitter used in curing a photosensitive resin in a three-dimensional printer, wherein a band-limited model of the material is utilized.

(244) A system for optimizing actuation signals for use in a light field emitter used in exposing a two-dimensional photographic medium, wherein a band-limited model of the medium is utilized.

(245) A system for optimizing actuation signals for use in a light field emitter used in exposing a biological tissue medium, wherein a band-limited model of the medium is utilized.

(246) A method for optimizing actuation signals where a band-limited perceptual model is utilized, wherein the associated computation is distributed across multiple computational threads or resources.

(247) A method for optimizing actuation signals where a band-limited perceptual model is utilized, wherein the associated computation is distributed across multiple computational threads or resources, and wherein each resource contributes in whole or in part to the optimization of actuation signals for a corresponding layer in the optical stack.

(248) A method for optimizing actuation signals where a band-limited perceptual model is utilized, wherein the distribution of computation described according to (247) is further distributed across multiple computational threads or resources, and wherein each further distributed resource contributes in whole or in part to the optimization of a corresponding perceived view of the display.

(249) A method for optimizing actuation signals where a band-limited perceptual model is utilized, wherein the optimization method updates the actuation signals iteratively, and wherein the updates for each iteration utilize a rule where previous values are multiplied by a dynamically-generated step to obtain values in the subsequent iteration.

(250) A system for caching, compositing and recalling optimized actuation signals for use in an optimized light field display, wherein the actuation signals may be stored, recalled and combined with other actuation signals to obtain those actuation signals that are controlling the display.

(251) A method for compositing actuation signals in a light-field display wherein gradual edge blurring is performed between the boundaries of the source signals.

(252) A method for compositing actuation signals in a light-field display wherein those portions of the source signals being selected depend on the location of the viewer.

(253) A method for compositing actuation signals in a multiplicative, multi-layer light-field display wherein one or more of the source signals are combined by modifying a single layer of the display.

(254) A method for compositing actuation signals in a multiplicative, multi-layer light-field display wherein one or more of the source signals are combined using an optimization algorithm.

(255) A method for performing calibration of an optimized light field display wherein a mobile device is utilized in performing the calibration.

(256) A method for performing calibration of an optimized light field display wherein a mobile device is utilized in performing the calibration, specifically utilizing an integrated camera, depth camera, or camera array in the mobile device in performing the calibration.

(257) A method for performing calibration of an optimized light field display wherein a mobile device is utilized in performing the calibration, specifically utilizing an accelerometer, gyroscope, compass or other related sensor in performing the calibration.

(258) A method for performing calibration of an optimized light field display wherein a mobile device is utilized in performing the calibration, and wherein a calibration pattern is displayed the optimized light field display being calibrated.

(259) A method for performing calibration of an optimized light field display wherein a mobile device is utilized in performing the calibration, and wherein a calibration pattern is displayed the mobile device used in calibration.

(260) A method for performing calibration of an optimized light field display in a manufacturing environment, using any such method that would follow by adaptation of the methods specified according to (255)-(259) for use on industrial equipment by a person having ordinary skill in the art.

Having thus described several aspects some embodiments, it is to be appreciated that various alterations, modifications, and improvements will readily occur to those skilled in the art. Such alterations, modifications, and improvements are intended to be within the spirit and scope of the present disclosure. Accordingly, the foregoing description and drawings are by way of example only.

The above-described embodiments of the present disclosure can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the concepts disclosed herein may be embodied as a non-transitory computer-readable medium (or multiple computer-readable media) (e.g., a computer memory, one or more floppy discs, compact discs, optical discs, magnetic tapes, flash memories, circuit configurations in Field Programmable Gate Arrays or other semiconductor devices, or other non-transitory, tangible computer storage medium) encoded with one or more programs that, when executed on one or more computers or other processors, perform methods that implement the various embodiments of the present disclosure discussed above. The computer-readable medium or media can be transportable, such that the program or programs stored thereon can be loaded onto one or more different computers or other processors to implement various aspects of the present disclosure as discussed above.

The terms "program" or "software" are used herein to refer to any type of computer code or set of computer-executable instructions that can be employed to program a computer or other processor to implement various aspects of the present disclosure as discussed above. Additionally, it should be appreciated that according to one aspect of this embodiment, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. The functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various features and aspects of the present disclosure may be used alone, in any combination of two or more, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the concepts disclosed herein may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

What is claimed is:

1. A method of manufacturing a light field print, the light field print comprising a first transparent layer and a second transparent layer, the method comprising:
- obtaining a first target pattern for the first transparent layer, wherein the first target pattern for the first transparent layer was generated using content to be displayed using the light field print;
- obtaining a second target pattern for the second transparent layer, wherein the second target pattern for the second transparent layer was generated using printing process information;
- printing the first target pattern on the first transparent layer by exposing a photo-sensitive material in or on the first transparent layer in accordance with the first target pattern; and
- printing the second target pattern on the second transparent layer by exposing a photo-sensitive material in or on the second transparent layer in accordance with the second target pattern.

2. The method of claim 1, wherein the transparent material of the first transparent layer or the second transparent layer further comprises a color filter material.

3. The method of claim 1, wherein the first transparent layer and the second transparent layer are two sides of a same photo-sensitive print medium, and wherein printing the first target pattern in or on the first transparent layer and printing the second target pattern in or on the second transparent layer comprises:
- printing the first target pattern in or on a first side of the photo-sensitive print medium by exposing the photo-sensitive material; and
- printing the second target pattern in or on a second side of the photo-sensitive print medium by exposing the photo-sensitive material.

4. The method of claim 1, wherein printing the first target pattern comprises exposing the first target pattern with a raster exposure process with a dot pitch of less than or equal to 0.0025 inches.

5. The method of claim 1, wherein the printing process information comprises information characterizing how much dot gain results from an exposure process, information indicating a maximum allowable optical density of the photo-sensitive material, and/or information indicating a dot pitch of the prints generated by a raster exposure process.

6. The method of claim 1, wherein the content to be displayed comprises a view of a synthetic scene.

* * * * *